US012688833B2

(12) United States Patent
No et al.

(10) Patent No.: US 12,688,833 B2
(45) Date of Patent: Jul. 21, 2026

(54) DRIVING CIRCUIT INCLUDING CONTROL CIRCUIT AND OUTPUT CIRCUIT CONTROLLED BY VOLTAGE LEVELS OF NODES OF THE CONTROL CIRCUIT

(71) Applicant: Samsung Display Co., LTD., Yongin-si (KR)

(72) Inventors: Sangyong No, Yongin-si (KR); Kyungho Kim, Yongin-si (KR); Nahyeon Cha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/031,750

(22) Filed: Jan. 18, 2025

(65) Prior Publication Data

US 2025/0279063 A1 Sep. 4, 2025

(30) Foreign Application Priority Data

Mar. 4, 2024 (KR) ........................ 10-2024-0030909

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2300/0842* (2013.01); *G09G 2310/0267* (2013.01); *G09G 2310/0286* (2013.01); *G09G 2310/08* (2013.01); *G09G 2330/021* (2013.01)

(58) Field of Classification Search
CPC ................... G09G 3/3266; G09G 3/32; G09G 2300/0842; G09G 2310/0267; G09G 2310/0286; G09G 2310/08; G09G 2330/021
See application file for complete search history.

(56) References Cited

U.S. PATENT DOCUMENTS

| | | | |
|---|---|---|---|
| 9,780,157 | B2 | 10/2017 | Kwon et al. |
| 9,824,771 | B2 | 11/2017 | Cho et al. |
| 10,152,910 | B2 | 12/2018 | Yoon et al. |

(Continued)

FOREIGN PATENT DOCUMENTS

| | | | |
|---|---|---|---|
| CN | 112927643 | B | 4/2022 |
| KR | 1020170080900 | A | 7/2017 |

(Continued)

*Primary Examiner* — Kwang-Su Yang
(74) *Attorney, Agent, or Firm* — CANTOR COLBURN LLP

(57) ABSTRACT

A driving circuit includes stages. Each stage includes: a first transistor connected between a first node and a first terminal to which a first voltage is input, and including a gate connected to a first input terminal to which a start signal is input; a second transistor connected between a second node and a second terminal to which a second voltage lower than the first voltage is input, and including a gate connected to the first node; a third transistor connected between the first terminal and the second node and comprising a gate connected to a second input terminal to which a carry signal is input; a fourth transistor connected between the first node and the second terminal and comprising a gate connected to the second node; and an output circuit controlled by voltage levels of the first node and the second node and output an output signal.

27 Claims, 67 Drawing Sheets

(56) References Cited

U.S. PATENT DOCUMENTS

| | | | | |
|---|---|---|---|---|
| 10,638,086 | B2 | 4/2020 | Ahn et al. | |
| 10,964,245 | B2 * | 3/2021 | Lai | G11C 19/287 |
| 2016/0217870 | A1 * | 7/2016 | Tseng | G11C 19/182 |
| 2018/0103231 | A1 * | 4/2018 | Ahn | G09G 5/005 |
| 2018/0190204 | A1 | 7/2018 | Shin et al. | |
| 2022/0199032 | A1 | 6/2022 | Hong | |
| 2022/0208113 | A1 | 6/2022 | Choi | |
| 2023/0031695 | A1 | 2/2023 | Ma et al. | |
| 2023/0206853 | A1 * | 6/2023 | Kim | G09G 3/3266 345/204 |
| 2024/0321215 | A1 | 9/2024 | Kim et al. | |
| 2024/0321217 | A1 | 9/2024 | Kim et al. | |
| 2025/0006136 | A1 | 1/2025 | No et al. | |

FOREIGN PATENT DOCUMENTS

| | | | |
|---|---|---|---|
| KR | 1020180081196 | A | 7/2018 |
| KR | 101967378 | B1 | 4/2019 |
| KR | 101992158 | B1 | 9/2019 |
| KR | 102244015 | B1 | 4/2021 |
| KR | 1020220074700 | A | 6/2022 |
| KR | 1020220087685 | A | 6/2022 |
| KR | 1020220096831 | A | 7/2022 |
| KR | 102471098 | B1 | 11/2022 |
| KR | 1020230020074 | A | 2/2023 |
| KR | 102518387 | B1 | 4/2023 |
| KR | 1020230051027 | A | 4/2023 |
| KR | 102556084 | B1 | 7/2023 |
| KR | 1020230101507 | A | 7/2023 |
| KR | 1020240144736 | A | 10/2024 |
| KR | 1020240144737 | A | 10/2024 |
| KR | 1020250004489 | | 1/2025 |

* cited by examiner

DRIVING CIRCUIT INCLUDING CONTROL CIRCUIT AND OUTPUT CIRCUIT CONTROLLED BY VOLTAGE LEVELS OF NODES OF THE CONTROL CIRCUIT

This application claims priority to Korean Patent Application No. 10-2024-0030909, filed on Mar. 4, 2024, and all the benefits accruing therefrom under 35 U.S.C. § 119, the content of which in its entirety is herein incorporated by reference.

BACKGROUND

1. Field

One or more embodiments relate to a driving circuit and a display apparatus including the same.

2. Description of the Related Art

A driving circuit includes a plurality of stages connected to signal lines, respectively, and the stages supply output signals through the signal lines connected thereto in response to signals received from a controller.

SUMMARY

One or more embodiments include a driving circuit having a small size and capable of stably outputting an output signal and a display apparatus including the driving circuit. However, technical aspects to be achieved by the disclosure are not limited thereto, and other unmentioned technical aspects will be apparent to one of ordinary skill in the art to which the disclosure pertains from the following description.

Additional aspects will be set forth in part in the description which follows and, in part, will be apparent from the description, or may be learned by practice of the presented embodiments.

According to one or more embodiments, a driving circuit includes a plurality of stages. Each of the plurality of stages includes: a first transistor connected between a first terminal, to which a first voltage is input, and a first node, where the first transistor includes a gate connected to a first input terminal to which a start signal is input; a second transistor connected between a second node and a second terminal to which a second voltage lower than the first voltage is input, where the second transistor includes a gate connected to the first node; a third transistor connected between the first terminal and the second node and including a gate connected to a second input terminal to which a carry signal is input; a fourth transistor connected between the first node and the second terminal and including a gate connected to the second node; and an output circuit configured to be controlled by voltage levels of the first node and the second node and output an output signal.

Each of the plurality of stages may further include a fifth transistor connected between the first terminal and the first node and including a gate connected to the second node.

Each of the plurality of stages may further include a capacitor connected to the first terminal and the first node.

Each of the plurality of stages may further include a sixth transistor connected between the first terminal and the second node and including a gate connected to the first node.

Each of the plurality of stages may further include a reset transistor connected between the first terminal and the second node and including a gate configured to receive a reset signal.

Each of the second transistor and the fourth transistor may include a back gate connected to a third terminal to which a third voltage lower than the second voltage is input.

The output circuit may include: a seventh transistor connected between an output terminal and a clock terminal to which a clock signal is input, where the seventh transistor includes a gate connected to a third node; an eighth transistor connected between the first terminal and the output terminal and including a gate connected to the first node; and a transfer transistor connected between the second node and the third node and including a gate connected to the second terminal.

The output circuit may further include a capacitor connected to the output terminal and the third node.

The start signal may be an output signal output from a previous stage, and the carry signal may be an output signal output from a next stage.

The output circuit may include a plurality of sub-output circuits connected in parallel, each of the plurality of sub-output circuits may include: a seventh transistor connected between an output terminal and a clock terminal and including a gate connected to a sub-node, an eighth transistor connected between the first terminal and the output terminal and including a gate connected to the first node, and a transfer transistor connected between the second node and the sub-node and including a gate connected to the second terminal, clock signals input to the clock terminals of the plurality of sub-output circuits, respectively, may be sequentially shifted signals, and the output terminals of the plurality of sub-output circuits may be configured to sequentially output output signals at intervals corresponding to shift intervals of the clock signals.

Each of the plurality of sub-output circuits may further include a capacitor connected to the output terminal and the sub-node.

The start signal may be one of output signals output from a previous stage, and the carry signal may be one of output signals output from a next stage.

Each of the first transistor and the third transistor may be a first conductivity-type transistor, and each of the second transistor and the fourth transistor may be a second conductivity-type transistor.

According to one or more embodiments, a driving circuit includes a plurality of stages. Each of the plurality of stages includes: a first transistor connected between a first input terminal, to which a start signal is input, and a first node; a second transistor connected between a first terminal, to which a first voltage is input, and a second node, where the second transistor includes a gate connected to the first node; a third transistor connected between the second node and a second terminal, to which a second voltage lower than the first voltage is input, or a third terminal, to which a third voltage lower than the first voltage and higher than the second voltage is input, where the third transistor includes a gate connected to the first node, and an output circuit configured to be controlled by voltage levels of the first node and the second node and output an output signal, and the third transistor further includes a back gate connected to a fourth terminal, to which a fourth voltage lower than the second voltage is input.

Each of the plurality of stages may further include a fourth transistor connected between the first terminal and the first node and including a gate connected to a second input terminal to which a carry signal is input, where a gate of the first transistor may be connected to the first input terminal.

The start signal may be an output signal output from a previous stage, and the carry signal may be an output signal output from a next stage.

The output circuit may include: a seventh transistor connected between an output terminal and a clock terminal to which a clock signal is input, where the seventh transistor includes a gate connected to a third node; an eighth transistor connected between the first terminal and the output terminal and including a gate connected to the second node; and a transfer transistor connected between the first node and the third node and including a gate connected to the second terminal.

The output circuit may further include a capacitor connected to the output terminal and the third node.

The output circuit may include a plurality of sub-output circuits connected in parallel. Each of the plurality of sub-output circuits may include: a seventh transistor connected between an output terminal and a clock terminal to which a clock signal is input, where the seventh transistor includes a gate connected to a sub-node; an eighth transistor connected between the first terminal and the output terminal and including a gate connected to the second node; and a transfer transistor connected between the first node and the sub-node and including a gate connected to the second terminal, clock signals input to the clock terminals of the plurality of sub-output circuits, respectively, may be sequentially shifted signals, and the output terminals of the plurality of sub-output circuits may be configured to sequentially output output signals at intervals corresponding to shift intervals of the clock signals.

Each of the plurality of sub-output circuits may further include a capacitor connected to the output terminal and the sub-node.

The start signal may be one of output signals output from a previous stage, and the carry signal may be one of output signals output from a next stage.

The output circuit may include: a seventh transistor connected between an output terminal and a first clock terminal to which a first clock signal is input, where the seventh transistor includes a gate connected to a third node; an eighth transistor connected between the first terminal and the output terminal and including a gate connected to the second node; and a transfer transistor connected between the first node and the third node and including a gate connected to the second terminal, and a gate of the first transistor may be connected to a second clock terminal to which a second clock signal is input, and the second clock signal may be input by shifting the first clock signal. The start signal may be an output signal output from a previous stage.

The output circuit may further include a capacitor connected to the output terminal and the third node.

The output circuit may include a plurality of sub-output circuits connected in parallel. Each of the plurality of sub-output circuits may include: a seventh transistor connected between an output terminal and a first clock terminal to which a first clock signal is input, where the seventh transistor includes a gate connected to a sub-node; an eighth transistor connected between the first terminal and the output terminal and including a gate connected to the second node; and a transfer transistor connected between the first node and the sub-node and including a gate connected to the second terminal. A gate of the first transistor may be connected to a second clock terminal to which a second clock signal is input, the second clock signal may be a signal shifted from the first clock signals, first clock signals input to the first clock terminals of the plurality of sub-output circuits, respectively, may be sequentially shifted signals, and the output terminals of the plurality of sub-output circuits may be configured to sequentially output output signals at intervals corresponding to shift intervals of the first clock signals.

Each of the plurality of sub-output circuits may further include a capacitor connected to the output terminal and the sub-node.

Each of the first transistor and the second transistor may be a first conductivity-type transistor, and the third transistor may be a second conductivity-type transistor.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Figure 1:
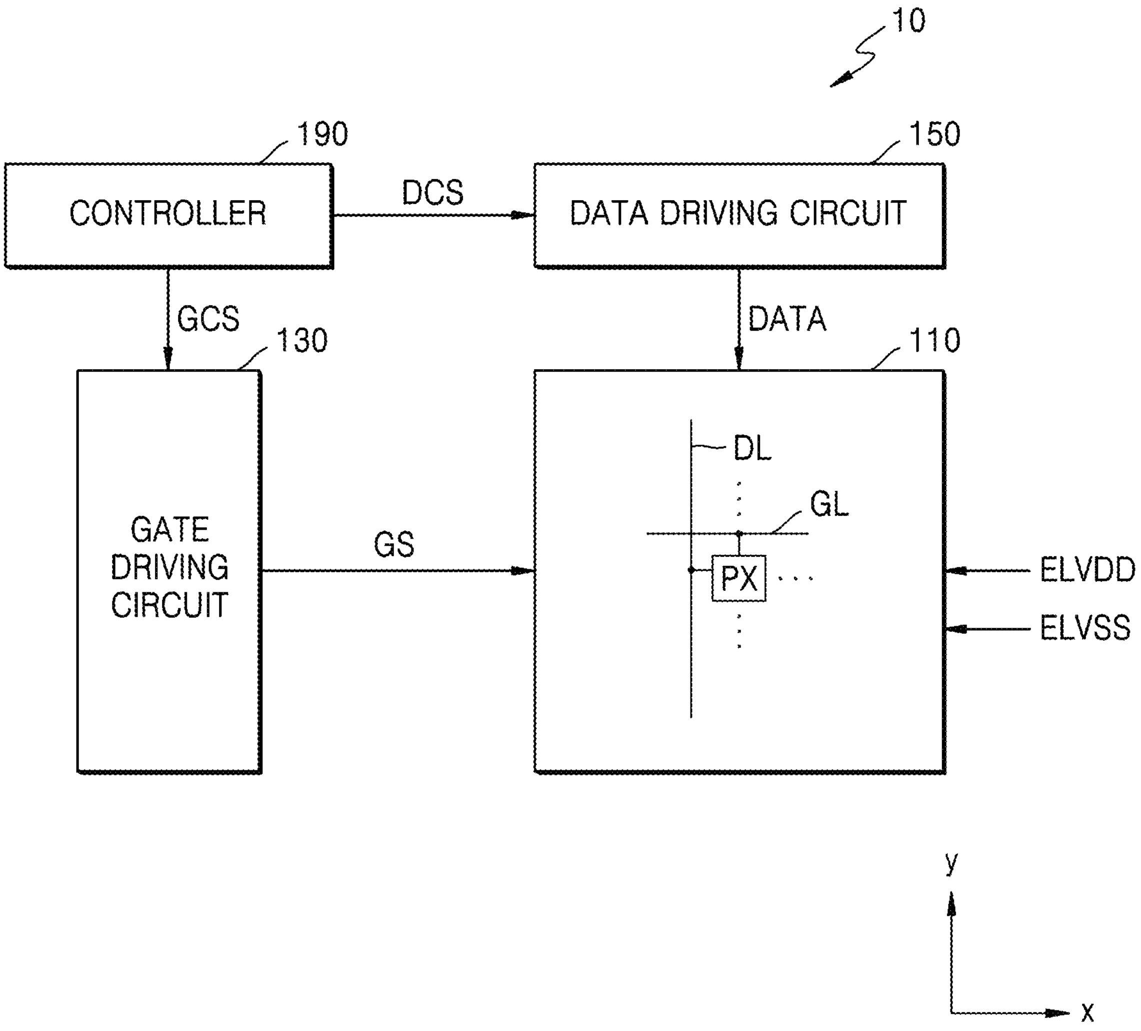
FIG. 1 is a diagram schematically illustrating a display apparatus, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the disclosure is not limited to the following embodiments and may be embodied in various forms.

Although the terms "first," "second," etc. may be used to describe various elements, these elements should not be limited by these terms. These terms are only used to distinguish one element from another.

As used herein, the singular forms "a," "an," and "the" are intended to include the plural forms as well, unless the context clearly indicates otherwise.

It will be understood that the terms "including," and "having," are intended to indicate the existence of the features or elements described in the specification, and are not intended to preclude the possibility that one or more other features or elements may exist or may be added.

It will be further understood that, when a layer, region, or element is referred to as being "on" another layer, region, or element, it may be directly on the other layer, region, or element, or may be indirectly on the other layer, region, or element with intervening layers, regions, or elements therebetween.

Sizes of elements in the drawings may be exaggerated or reduced for convenience of explanation. For example, because sizes and thicknesses of elements in the drawings are arbitrarily illustrated for convenience of explanation, the disclosure is not limited thereto.

"A and/or B" is used herein to select only A, select only B, or select both A and B. Also, "at least one of A and B" is used herein to select only A, select only B, or select both A and B.

In the following embodiments, when X and Y are connected to each other, it may include a case where X and Y are physically connected to each other, a case where X and Y are functionally connected to each other, and a case where X and Y are electrically connected to each other. Also, when X and Y are connected to each other, it may include a case where X and Y are directly connected to each other or a case where X and Y are indirectly connected to each other with other elements therebetween. Here, X and Y may be elements (e.g., apparatuses, devices, circuits, wirings, electrodes, terminals, films, layers, and regions).

For example, when X and Y are electrically connected to each other, it may include a case where X and Y are directly electrically connected to each other and/or a case where X and Y are indirectly electrically connected to each other with other elements therebetween. For example, when X and Y are indirectly connected, one or more elements (e.g., switches, transistors, capacitors, inductors, resistors, or diodes) that enable electrical connection between X and Y may be connected between X and Y. Accordingly, a connection relationship is not limited to a certain connection relationship, for example, a connection relationship shown in the drawings or the detailed description, and may include other connection relationships than the connection relationship shown in the drawings or the detailed description.

In the following embodiments, the term "on" used in association with a device state may refer to a state in which a device is activated, and the term "off" may refer to a state in which a device is deactivated. The term "on" used in association with a signal received by a device may refer to a signal for activating a device, and the term "off" may refer to a signal for deactivating a device. A device may be activated by a high-level voltage or a low-level voltage. For example, a P-type transistor (P-channel transistor) is activated by a low-level voltage, and an N-type transistor (N-channel transistor) is activated by a high-level voltage. Accordingly, it should be understood that "on" voltages for the P-type transistor and the N-type transistor have opposite (high and low) voltage levels. Hereinafter, a voltage for activating (turning on) a transistor is referred to as a gate-on voltage, and a voltage for deactivating (turning off) a transistor is referred to as a gate-off voltage.

FIG. 1 is a diagram schematically illustrating a display apparatus, according to an embodiment;

A display apparatus 10 according to an embodiment may be a display apparatus such as an organic light-emitting display apparatus, an inorganic light-emitting display apparatus (or an inorganic electroluminescent ("EL") display apparatus), or a quantum dot light-emitting display apparatus.

Referring to FIG. 1, the display apparatus 10 according to an embodiment may include a pixel area 110, a gate driving circuit 130, a data driving circuit 150, and a controller 190.

The pixel area 110 may be provided in a display area. In a peripheral area around the display area, various conductive lines that transmit an electrical signal to be applied to the display area, outer driving circuits electrically connected to pixel circuits, and pads to which a printed circuit board or a driver integrated circuit ("IC") chip is attached may be located. In an embodiment, for example, in the peripheral area, the gate driving circuit 130, the data driving circuit 150, and the controller 190 may be provided.

In the pixel area 110, a plurality of gate lines GL, a plurality of data lines DL, and a plurality of pixels PX connected to the gate lines GL and the data lines DL may be located. The plurality of pixels PX may be repeatedly arranged in a first direction (an x-direction or a row direction) and a second direction (a y-direction or a column direction). The plurality of pixels PX may be arranged in any of various forms such as a stripe arrangement, a PENTILE® arrangement, a diamond arrangement, or a mosaic arrangement, to display an image. Each of the plurality of pixels PX may include an organic light-emitting diode as a display element, and the organic light-emitting diode may be connected to a pixel circuit. The pixel circuit may include a plurality of transistors and at least one capacitor. Each pixel PX may emit light, for example, red light, green light, blue light, or white light, through the organic light-emitting diode OLED. Each pixel PX may be connected to a corresponding gate line from among the plurality of gate lines GL and a corresponding data line from among the plurality of data lines DL.

In an embodiment, the plurality of transistors included in the pixel area 110 may be P-channel silicon transistors. The silicon transistor may include a silicon semiconductor, and the silicon semiconductor may include amorphous silicon or polysilicon. In an embodiment, for example, the silicon transistor may be a low-temperature polycrystalline silicon ("LTPS") thin-film transistor.

In another embodiment, the plurality of transistors included in the pixel circuit may be N-channel oxide transistors. The oxide transistor may include an oxide semiconductor, and the oxide semiconductor may include a Zn oxide-based material such as Zn oxide, In—Zn oxide, or In—Ga—Zn oxide. In some embodiments, the oxide semiconductor may be an In—Ga—Zn—O ("IGZO") semiconductor. In some embodiments, the oxide semiconductor may be an In—Sn—Ga—Zn—O ("ITGZO") semiconductor. In an embodiment, for example, the oxide transistor may be a low-temperature polycrystalline oxide ("LTPO") thin-film transistor. In another embodiment, some of the plurality of transistors included in the pixel circuit may be P-channel silicon transistors and others may be N-channel oxide transistors.

Each of the gate lines GL may extend in the x-direction (row direction) and may be connected to the pixels PX located in the same row. Each of the gate lines GL may transmit gate signals to the pixels PX in the same row. Each of the data lines DL may extend in the y-direction (column direction) and may be connected to the pixels PX located in the same column. Each of the data lines DL may transmit data signals to the pixels PX in the same column in synchronization with gate signals.

The gate driving circuit 130 may be connected to the plurality of gate lines GL, may generate gate signals GS in response to a gate driving control signal GCS from the controller 190, and may sequentially supply the gate signals GS to the gate lines GL. The gate line GL may be connected to a gate of a transistor included in the pixel PX, and the gate signal GS may be a gate control signal for controlling turn-on and turn-off a transistor to which the gate line is connected. The gate signal GS may include a gate-on voltage at which a transistor may be turned on and a gate-off voltage at which the transistor may be turned off. The gate driving circuit 130 may include a shift register for sequentially generating and outputting the gate signals GS.

The data driving circuit 150 may be connected to the plurality of data lines DL, and may supply a data signal DATA to the data lines DL in response to a data driving control signal DCS from the controller 190. The data signal DATA supplied to the data lines DL may be supplied to the pixels PX to which the gate signals are supplied. The data driving circuit 150 may convert input image data having a gray level input from the controller 190 into the data signal DATA in the form of a voltage or current.

When the display apparatus is an organic light-emitting display apparatus, a first power supply voltage ELVDD and a second power supply voltage ELVSS may be supplied to the pixels PX of the pixel area 110. The first power supply voltage ELVDD may be a high-level voltage provided to one terminal of a driving transistor connected to a first electrode (a pixel electrode or an anode) of an organic light-emitting diode of each pixel PX. The second power supply voltage ELVSS may be a low-level voltage provided to a second electrode (a counter electrode or cathode) of an organic light-emitting diode connected to the other terminal of the driving transistor. The first power supply voltage ELVDD and the second power supply voltage ELVSS may be driving voltages for causing the plurality of pixels PX to emit light.

The controller 190 may generate the gate driving control signal GCS and the data driving control signal DCS based on signals input from the outside. The controller 190 may supply the gate riving control signal GCS to the gate driving circuit 130 and may supply the data driving control signal DCS to the data driving circuit 150. The gate driving control signal GCS may include a plurality of clock signals and a start signal. The data driving control signal DCS may include a plurality of clock signals and a start signal.

The display apparatus 10 may include a display panel, and the display panel may include a substrate. The pixels PX may be located in the display area of the substrate. A part or the whole of the gate driving circuit 130 may be directly formed in the peripheral area of the substrate during a process of forming a transistor constituting a pixel circuit in the display area of the substrate. The data driving circuit 150 and the controller 190 may each be formed as a separate integrated circuit chip or one integrated circuit chip and may be located on a flexible printed circuit board ("FPCB") electrically connected to a pad located on a side of the substrate. In another embodiment, the data driving circuit 150 and the controller 190 may be directly located on the substrate by using a chip-on-glass ("COG") or chip-on-plastic ("COP") method.

Figure 2:
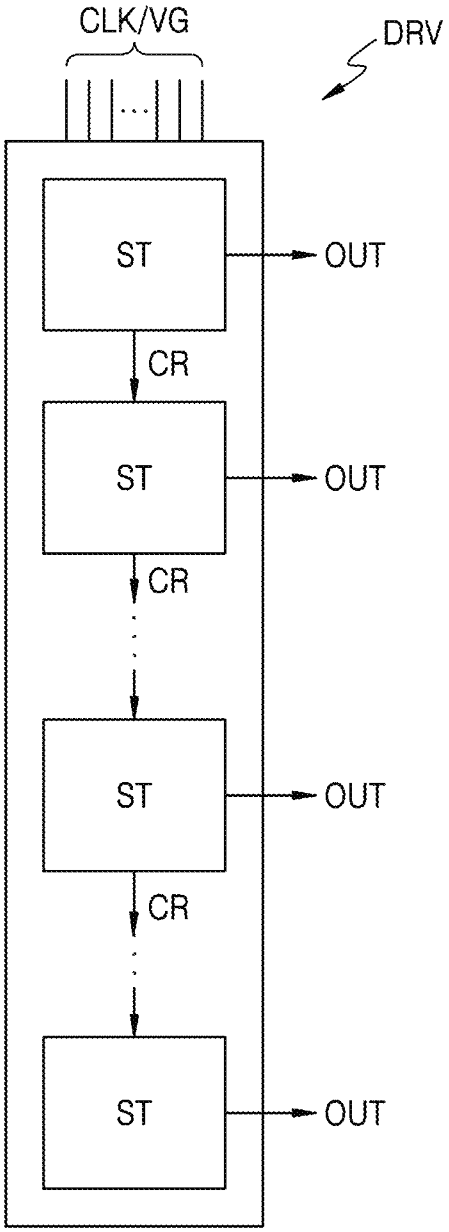
FIG. 2 is a diagram schematically illustrating a driving circuit, according to an embodiment.
Figure 3A:
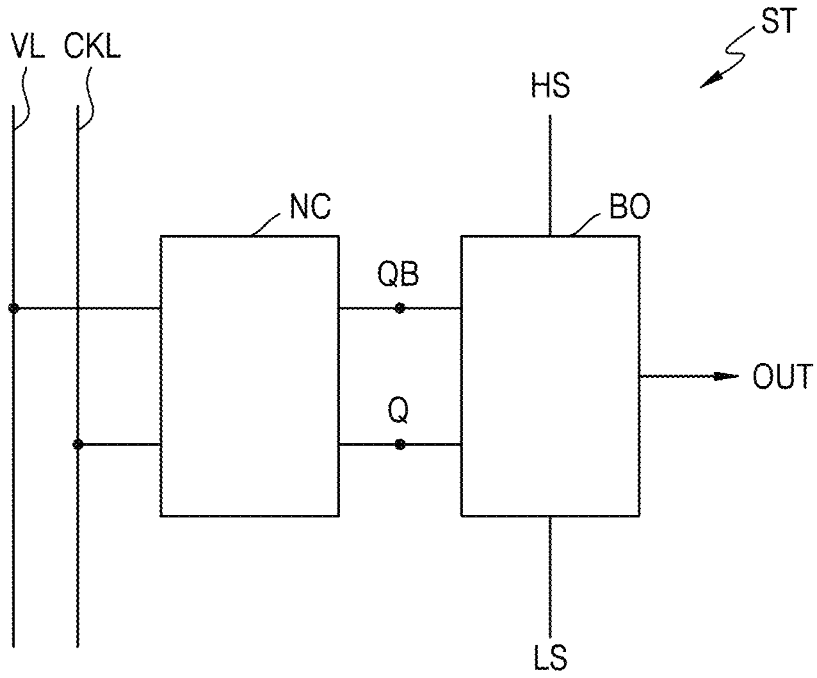
FIGS. 3A and 3B are diagrams schematically illustrating an arbitrary stage constituting a driving circuit, according to an embodiment.
Figure 3B:
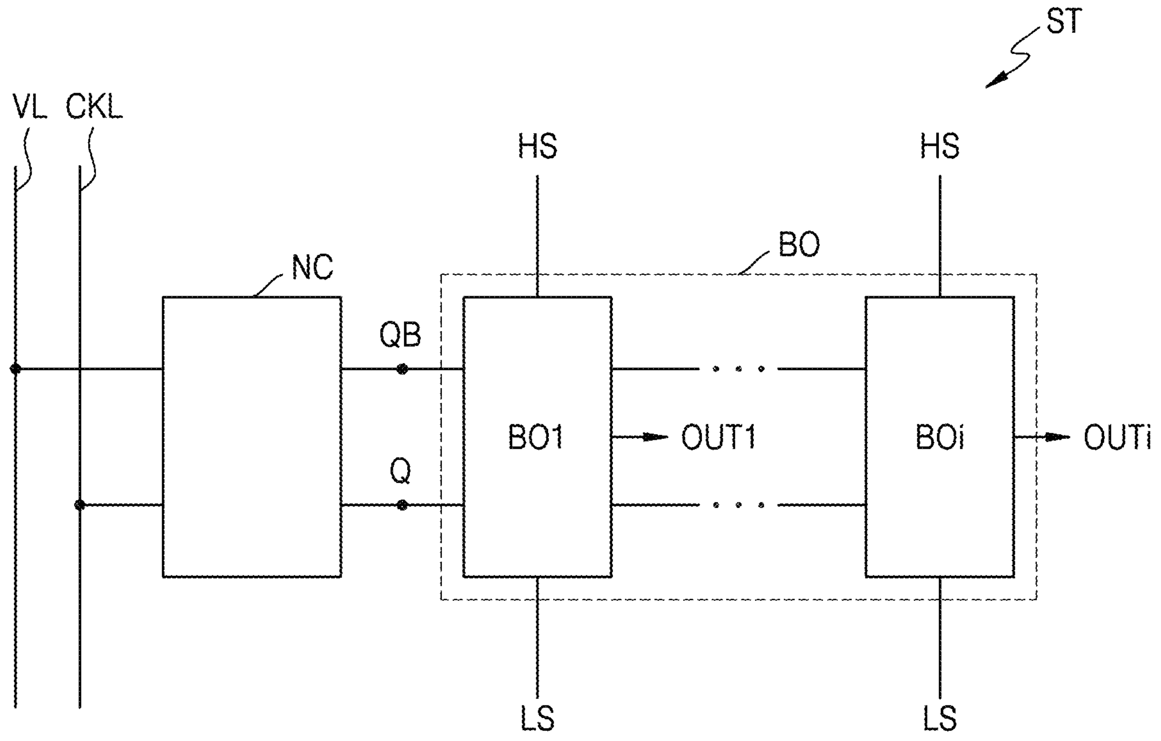

FIG. 2 is a diagram schematically illustrating a driving circuit, according to an embodiment. FIGS. 3A and 3B are diagrams schematically illustrating an arbitrary stage constituting a driving circuit, according to an embodiment.

A driving circuit DRV may include a plurality of stages ST, and each stage of the plurality of stages ST may receive at least one signal and may generate at least one output signal OUT. The at least one signal may include at least one clock signal CLK and at least one voltage signal VG. Each stage ST may further output a carry signal CR. The carry signal CR may be a signal output from a current stage to a previous stage and/or a next stage.

The stage ST may include an output circuit BO and a control circuit NC for controlling voltage levels of nodes (e.g., nodes Q and QB) connected to the output circuit BO. The control circuit NC may receive at least one clock signal CLK from at least one clock line CKL and may receive at least one voltage signal VG from at least one voltage line VL. The output circuit BO may receive a first signal HS and a second signal LS and may output at least one output signal OUT of a first level voltage or a second level voltage to at least one corresponding signal line. The first level voltage may be a voltage higher than the second level voltage.

As shown in FIG. 3A, each stage ST may output one output signal OUT to one corresponding signal line. Alternatively, as shown in FIG. 3B, each stage ST may output two or more output signals OUT to two or more corresponding signal lines. In this case, the output circuit BO may include a plurality of sub-output circuits BO1 to BOi and may output a plurality of output signals OUT (e.g., output signals OUT1 to OUTi) from the plurality of sub-output circuits BO1 to BOi.

In an embodiment, the driving circuit DRV may be the gate driving circuit 130 (see FIG. 1), a signal line may be a gate line, and the output signals OUT (e.g., the output signals OUT1 to OUTi) may be the gate signals GS. Each of the plurality of stages ST may generate at least one gate signal GS corresponding to at least one row and may output the gate signal GS to at least one corresponding gate line GL. The driving circuit DRV applied to the gate driving circuit 130 will be described, and an output signal and a gate signal may be interchangeably used.

Figure 4:
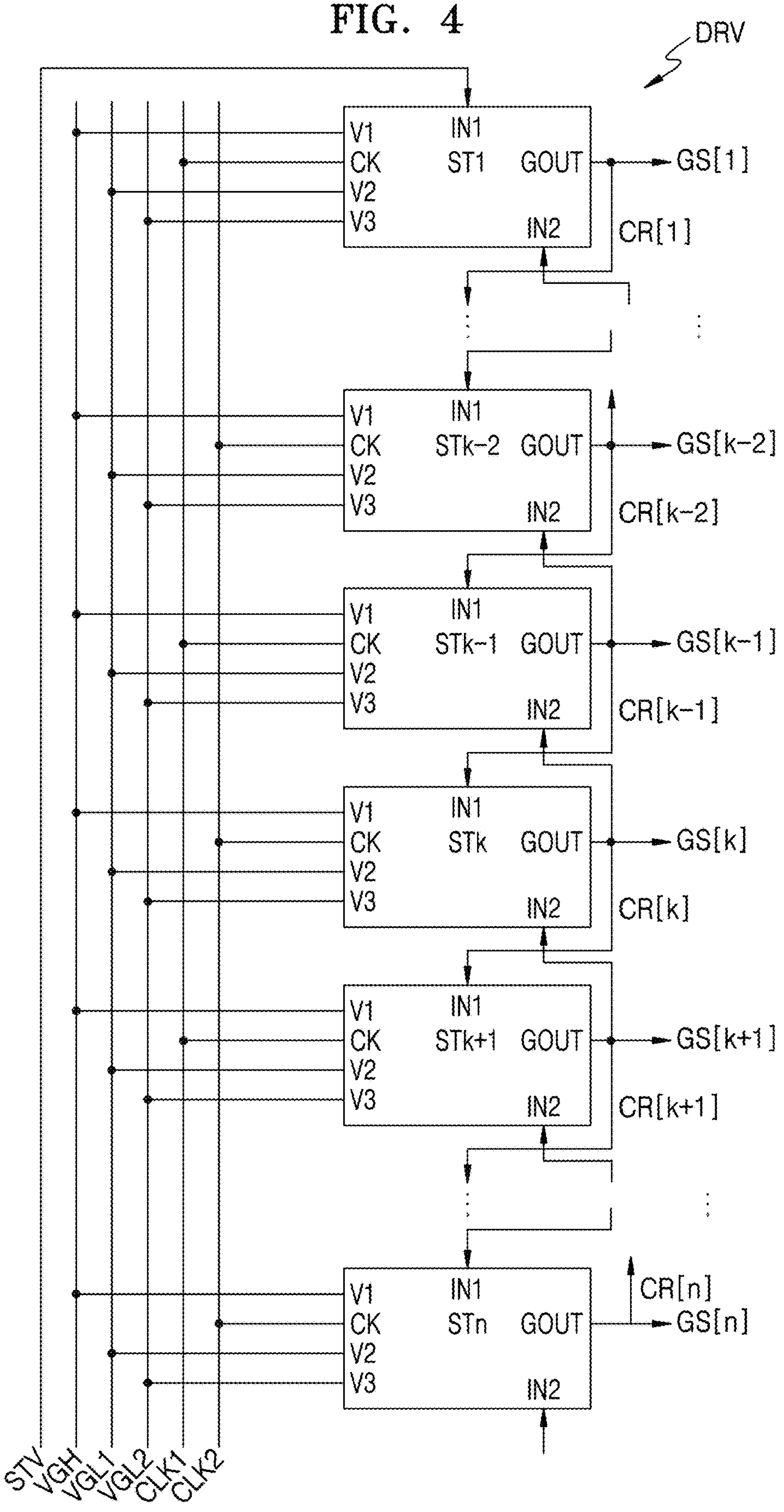
FIG. 4 is a diagram schematically illustrating a driving circuit, according to an embodiment.
Figure 5:
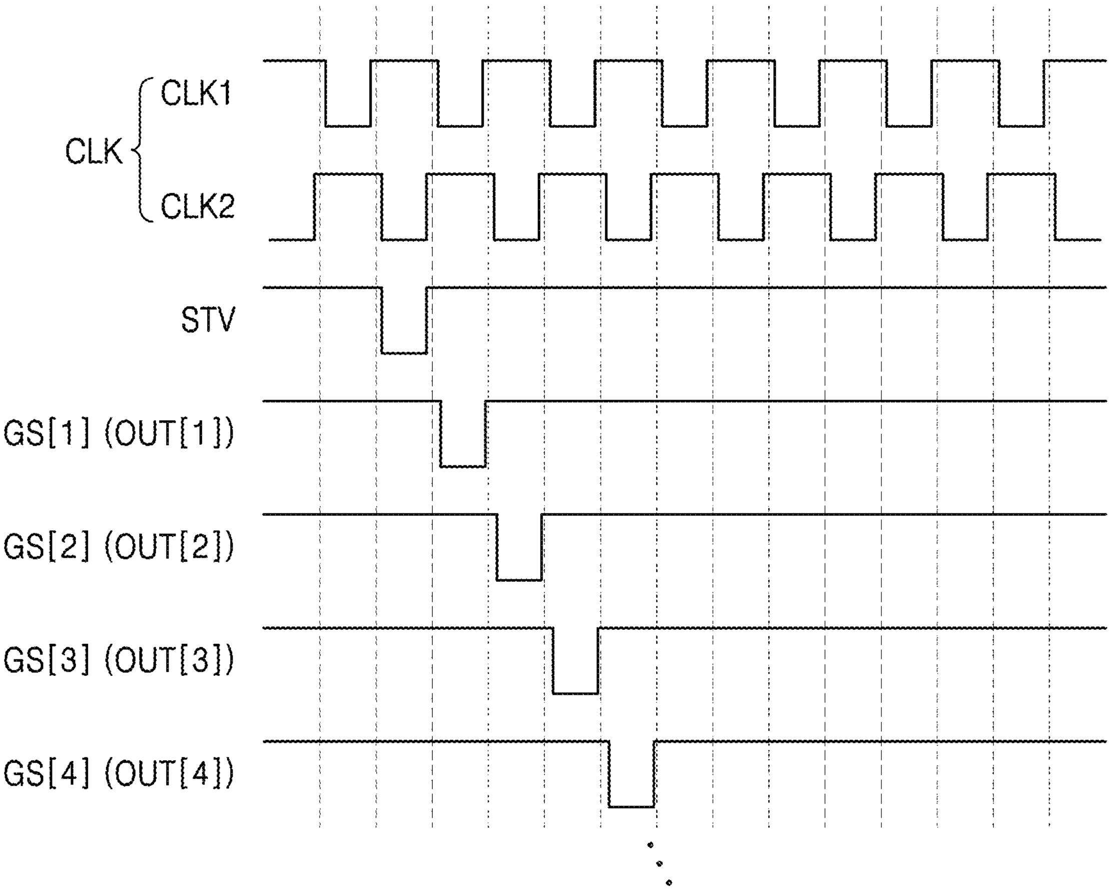
FIG. 5 is a diagram illustrating signals input to and signals output from stages of the driving circuit of FIG. 4.

FIG. 4 is a diagram schematically illustrating a driving circuit, according to an embodiment. FIG. 5 is a diagram illustrating signals input to and signals output from stages of the driving circuit of FIG. 4. FIG. 5 illustrates a $k^{th}$ stage STK of the driving circuit of FIG. 4.

Referring to FIG. 4, the driving circuit DRV may include a plurality of stages (e.g., stages ST1 to STn), where n is a positive integer. The plurality of stages (e.g., stages ST1 to STn) may sequentially output gate signals GS[1] to GS[n] to gate lines, respectively. The number of stages provided in the driving circuit DRV may vary according to the number of rows (horizontal lines) provided in the pixel area 110 (see FIG. 1).

The driving circuit DRV of FIG. 4 is an embodiment in which each of the plurality of stages (e.g., stages ST1 to STn) may generate a gate signal and may output the gate signal to a gate line of a corresponding row. In this case, the number of stages may be the same as the number of rows provided in the pixel area 110. The plurality of stages (e.g., stages ST1 to STn) may sequentially output gate signals.

Each of the plurality of stages (e.g., stages ST1 to STn) may include a plurality of terminals to which a plurality of signals are input or output. The plurality of signals may include a clock signal and a voltage signal. The plurality of terminals may include a first input terminal IN1, a second input terminal IN2, a first voltage input terminal V1, a second voltage input terminal V2, a third voltage input terminal V3, a clock terminal CK, and an output terminal GOUT.

Each of the plurality of stages (e.g., stages ST1 to STn) may generate a carry signal CR and may supply the carry signal CR to the first input terminal IN1 of a next stage and the second input terminal IN2 of a previous stage.

A start signal may be input (supplied) to the first input terminal IN1. The "start signal" may be an external signal STV or a carry signal output from a previous stage (hereinafter, referred to as a 'previous carry signal'). In an embodiment, the external signal STV may be input as a start signal to the first input terminal IN1 of a first stage ST1, and a previous carry signal may be input as a start signal to the first input terminal IN1 of each of second to $n^{th}$ stages ST2 to STn. A previous stage may be a stage located at least one before a current stage. In FIG. 4, a previous stage is a stage located immediately before a current stage. In an embodiment, for example, a $k-1^{th}$ carry signal CR[k−1] output from a $k-1^{th}$ stage STk−1 may be input as a start signal to the first input terminal IN1 of the $k^{th}$ stage STK, where k is a positive integer smaller than n. In an embodiment, a duration during which a low level of the external signal STV is maintained may be the same as a duration during which a low level of a clock signal is maintained. In an embodiment, a duration during which a low level of the external signal STV is maintained may be longer than a duration during which a low level of a clock signal is maintained.

A carry signal output from a next stage (hereinafter, referred to as a 'next carry signal') may be input to the second input terminal IN2. A next stage may be a stage located at least one after a current stage. In FIG. 4, a next stage is a stage located immediately after a current stage. A $k+1^{th}$ carry signal CR[k+1] output from a $k+1^{th}$ stage STk+1 may be input as a next carry signal to the second input terminal IN2 of the $k^{th}$ stage STk. For example, an $n^{th}$ carry signal CR[n] output from an $n^{th}$ stage STn may be input as a next carry signal to the second input terminal IN2 of the $n-1^{th}$ stage.

A first voltage VGH may be input to the first voltage input terminal V1, a second voltage VGL1 may be input to the second voltage input terminal V2, and a third voltage VGL2 may be input to the third voltage input terminal V3. The second voltage VGL1 may be a voltage lower than the first voltage VGH. The third voltage VGL2 may be a voltage lower than the second voltage VGL1. Hereinafter, the first voltage VGH may be referred to as a first level voltage, the second voltage VGL1 may be referred to as a second level voltage, and the third voltage VGL2 may be referred to as a third level voltage. The first voltage VGH, the second voltage VGL1, and the third voltage VGL2 are global signals and may be input from the controller 190 of FIG. 1 or a power supply circuit (not shown).

A clock signal CLK may be input to the clock terminal CK. The clock signal CLK may include a first clock signal CLK1 and a second clock signal CLK2. One of the first clock signal CLK1 and the second clock signal CLK2 may be input to the clock terminal CK. In an embodiment, for example, as shown in FIG. 4, the first clock signal CLK1 may be input to the clock terminal CK of an odd-numbered stage, and the second clock signal CLK2 may be input to the clock terminal CK of an even-numbered stage. In another embodiment, the second clock signal CLK2 may be input to the clock terminal CK of an odd-numbered stage, and the first clock signal CLK1 may be input to the clock terminal CK of an even-numbered stage.

Referring to FIG. 5, the first clock signal CLK1 and the second clock signal CLK2 may be square wave signals in which a high-level voltage and a low-level voltage are repeated. In an embodiment, a high-level voltage of each of the first clock signal CLK1 and the second clock signal CLK2 may be the first voltage VGH. A low-level voltage of each of the first clock signal CLK1 and the second clock signal CLK2 may be the second voltage VGL1, or a voltage lower than the first voltage VGH and higher than the second voltage VGL1. The first clock signal CLK1 and the second clock signal CLK2 may have the same waveform and the same cycle (period) and may be phase-shifted (phase-delayed) signals from each other. In an embodiment, for example, the second clock signal CLK2 may be phase-shifted by ½ cycle from the first clock signal CLK1 and then input to the driving circuit DRV. In an embodiment, in the first clock signal CLK1 and the second clock signal CLK2, a duration during which a low-level voltage is maintained for one cycle may be shorter than a duration during which a high-level voltage is maintained. In an embodiment, in the first clock signal CLK1 and the second clock signal CLK2, a duration during which a low-level voltage is maintained for one cycle may be the same as a duration during which a high-level voltage is maintained.

A gate signal may be output as an output signal from the output terminal GOUT. As shown in FIGS. 4 and 5, an output signal of a low level may be output from the output terminal GOUT of an odd-numbered stage in synchronization with an output timing of a low-level voltage of the first clock signal CLK1. An output signal of a low level may be output from the output terminal GOUT of an even-numbered stage in synchronization with an output timing of a low-level voltage of the second clock signal CLK2. A duration during which a low level of an output signal is maintained may be the same as a duration during which a low level of a clock signal is maintained.

Gate signals GS[1], GS[2], . . . , and GS[n] may be output as output signals OUT[1], OUT[2], . . . , and OUT[n] to the output terminals GOUT of the plurality of stages (e.g., stages ST1 to STn). As shown in FIG. 5, the gate signals GS[1], GS[2], . . . , and GS[n] output from the output terminals GOUT of the plurality of stages (e.g., stages ST1 to STn) may be sequentially shifted from each other by a certain interval. In an embodiment, the plurality of stages (e.g., stages ST1 to STn) may shift, by ½ cycle of the clock signal CLK, and sequentially output the gate signals GS[1], GS[2], . . . , and GS[n] of a low-level voltage. In an embodiment, a high-level voltage and a low-level voltage of output signals may be the first voltage VGH and a low-level voltage of the clock signal CLK, respectively.

In an embodiment, transistors included in a circuit of each of the plurality of stages (e.g., stages ST1 to STn) may be the same transistors constituting a pixel circuit of the pixel PX. In an embodiment, for example, transistors included in a circuit of each of the plurality of stages (e.g., stages ST1 to STn) may be a P-channel silicon transistor and/or an N-channel oxide transistor.

Although not shown, the driving circuit DRV may further include at least one dummy stage at a rear end of the $n^{th}$ stage STn. The dummy stage may receive a carry signal output from a previous stage as a start signal, may generate a carry signal, and may output the carry signal to the previous stage. In an embodiment, for example, the driving circuit DRV may include one dummy stage, and the dummy stage may generate a carry signal in response to a carry signal output from the $n^{th}$ stage STn and may supply the generated carry signal to the second input terminal IN2 of the $n^{th}$ stage STn.

Figure 6:
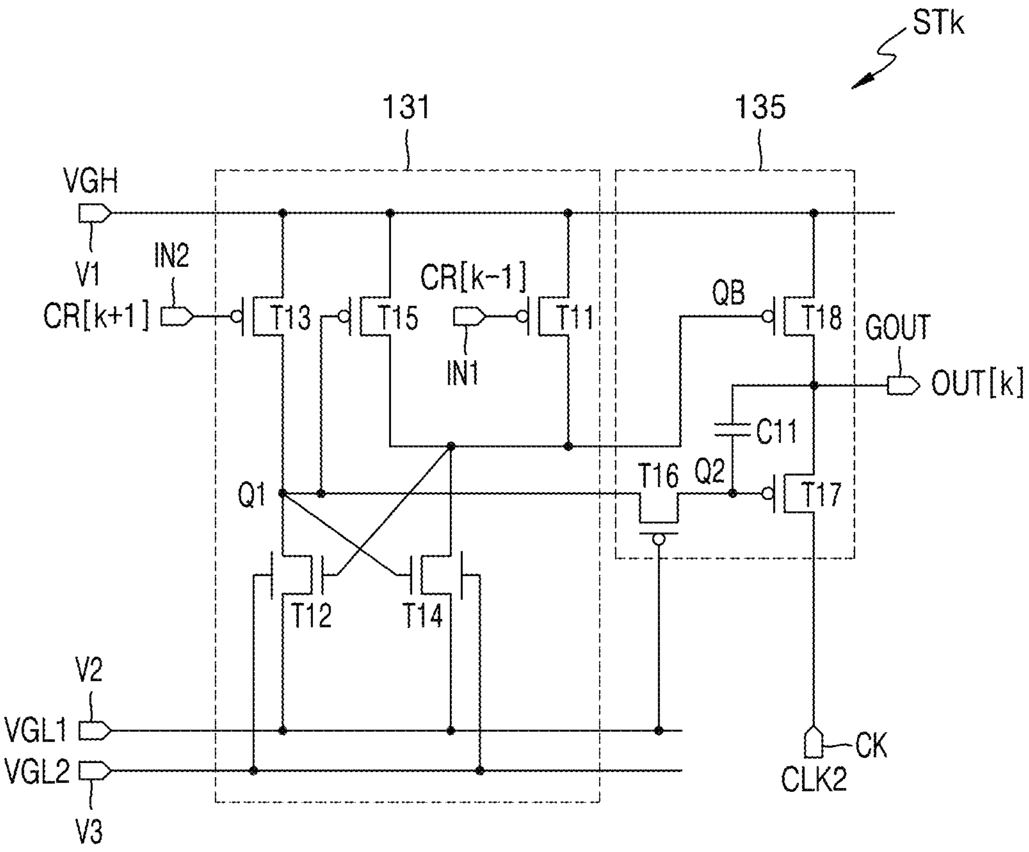
FIG. 6 is a circuit diagram illustrating an example of a stage included in the driving circuit of FIG. 4
Figure 7:
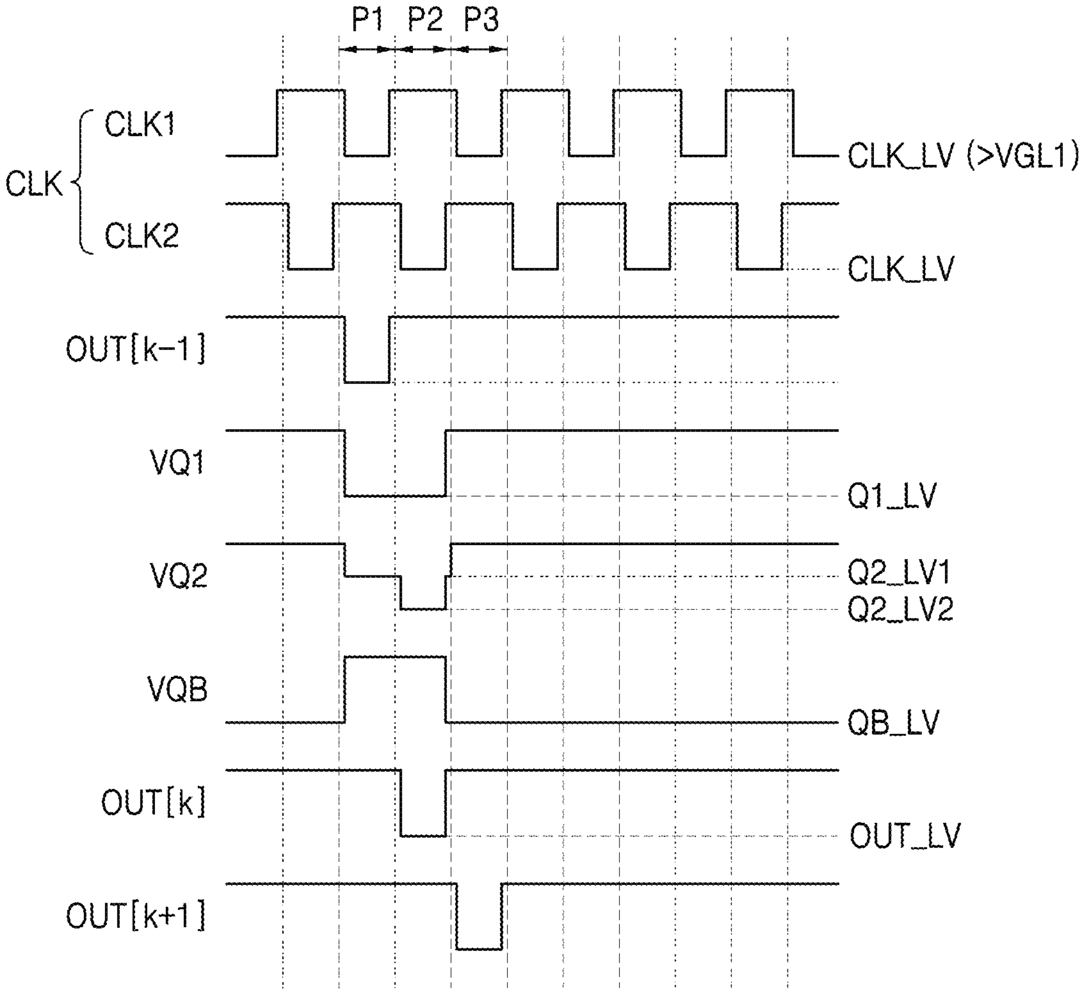
FIG. 7 is a timing diagram for describing an operation of the stage of FIG. 6.

FIG. 6 is a circuit diagram illustrating an example of a stage included in the driving circuit of FIG. 4. FIG. 7 is a timing diagram for describing an operation of the stage of FIG. 6.

Hereinafter, a $k^{th}$ stage STK corresponding to a $k^{th}$ row of the pixel area 110 will be described as an example. For convenience of explanation, the following will be described assuming that the $k^{th}$ stage STk is an even-numbered stage and the second clock signal CLK2 is input to the clock terminal CK. The $k^{th}$ stage STK, which is a current stage, may receive a $k-1^{th}$ carry signal CR[k−1] from a $k-1^{th}$ stage STk−1, which is a previous stage, and a $k+1^{th}$ carry signal CR[k+1] from a $k+1^{th}$ stage STk+1, which is a next stage, and may output a $k^{th}$ gate signal GS[k] as an output signal OUT[k] to a gate line of the $k^{th}$ row.

Referring to FIG. 6, the $k^{th}$ stage STK may include a control circuit 131 and an output circuit 135. Each of the control circuit 131 and the output circuit 135 may include at least one transistor.

The control circuit 131 may control voltages of a third node QB and a first node Q1 in response to signals input to the first input terminal IN1 and the second input terminal IN2. In an embodiment, for example, the control circuit 131 may control voltages of a third node QB and the first node Q1 in response to the previous carry signal CR[k−1] and the next carry signal CR[k+1]. The control circuit 131 may include first to fifth transistors T11 to T15. The first to fifth transistors T11 to T15 may be different impurity conductivity-type transistors. In an embodiment, for example, each of the first transistor T11, the third transistor T13, and the fifth transistor T15 may be a P-channel transistor (a first conductivity-type transistor), and each of the second transistor T12 and the fourth transistor T14 may be an N-channel transistor (a second conductivity-type transistor).

The first transistor T11 may be connected between the first voltage input terminal V1 and the third node QB. A gate of the first transistor T11 may be connected to the first input terminal IN1. The first transistor T11 may be turned on when the previous carry signal CR[k−1] of a low level is supplied and may transmit the first voltage VGH to the third node QB. The previous carry signal CR[k−1] may be an output signal OUT[k−1] (a previous output signal) output from the $k-1^{th}$ stage STk−1.

The second transistor T12 may be connected between the first node Q1 and the second voltage input terminal V2. A gate of the second transistor T12 may be connected to the third node QB. The second transistor T12 may be turned on when a voltage of the third node QB is at a high level, and may transmit the second voltage VGL1 to the first node Q1.

The third transistor T13 may be connected between the first voltage input terminal V1 and the first node Q1. A gate of the third transistor T13 may be connected to the second input terminal IN2. The third transistor T13 may be turned on when the next carry signal CR[k+1] of a low level is supplied and may transmit the first voltage VGH to the first node Q1. The next carry signal CR[k+1] may be an output signal OUT[k+1] (a next output signal) output from the $k+1^{th}$ stage STk+1.

The fourth transistor T14 may be connected between the third node QB and the second voltage input terminal V2. A gate of the fourth transistor T14 may be connected to the first node Q1. The fourth transistor T14 may be turned on when a voltage of the first node Q1 is at a high level, and may transmit the second voltage VGL1 to the third node QB.

Each of the second transistor T12 and the fourth transistor T14 may further include a back gate connected to the third voltage input terminal V3. Each of the second transistor T12 and the fourth transistor T14 may be a dual gate transistor including a gate (a first gate or a top gate) located over a semiconductor layer and a back gate (a second gate or a bottom gate) located under the semiconductor layer. As the third voltage VGL2 of a low level is input to the back gate of each of the second transistor T12 and the fourth transistor T14 which are oxide transistors, a threshold voltage of each of the second transistor T12 and the fourth transistor T14 may be positively shifted, thereby minimizing leakage current.

The fifth transistor T15 may be connected between the first voltage input terminal V1 and the third node QB. A gate of the fifth transistor T15 may be connected to the first node Q1. The fifth transistor T15 may be turned on when the first node Q1 is at a low level, and may transmit the first voltage VGH to the third node QB. The fifth transistor T15 may stably maintain a voltage of the third node QB at a high level when a voltage of the first node Q1 is at a low level. In another embodiment, the gate of the fifth transistor T15 may be connected to the second node Q2.

The output circuit 135 may be connected between the first voltage input terminal V1 and the clock terminal CK and may output a low-level voltage or a high-level voltage according to voltages of the first node Q1 and the third node QB. The output circuit 135 may include a sixth transistor T16, a seventh transistor T17, and an eighth transistor T18. The output circuit 135 may further include a capacitor C11. The capacitor C11 may be omitted. The sixth transistor T16, the seventh transistor T17, and the eighth transistor T18 may be P-channel transistors.

The sixth transistor T16 may be connected between the first node Q1 and a second node Q2. A gate of the sixth transistor T16 may be connected to the second voltage input terminal V2. The sixth transistor T16 may always be in a turned-on state due to the second voltage VGL1. A voltage of the second node Q2 may be linked to a voltage of the first node Q1 by the sixth transistor T16, and a voltage level of a voltage of the second node Q2 may substantially follow a voltage level of a voltage of the first node Q1. The sixth transistor T16 may be a transfer transistor for transmitting a voltage of the first node Q1 to the second node Q2.

In another embodiment, the gate of the sixth transistor T16 may be connected to the third voltage input terminal V3. In this case, when a voltage of the first node Q1 is at a low level, a voltage of the second node Q2 may be a lower level voltage than a voltage of the second node Q2 when the gate of the sixth transistor T16 is connected to the second voltage input terminal V2.

The seventh transistor T17 may be connected between the output terminal GOUT and the clock terminal CK. A gate of the seventh transistor T17 may be connected to the second node Q2. The seventh transistor T17 may be turned on when a voltage of the second node Q2 is at a low level, and may transmit the second clock signal CLK2 input to the clock terminal CK to the output terminal GOUT. The seventh transistor T17 may be a pull-down transistor that transmits a low-level voltage to the output terminal GOUT.

The eighth transistor T18 may be connected between the first voltage input terminal V1 and the output terminal GOUT. A gate of the eighth transistor T18 may be connected to the third node QB. The eighth transistor T18 may be turned on when a voltage of the third node QB is at a low level, and may transmit the first voltage VGH input to the first voltage input terminal V1 to the output terminal GOUT. The eighth transistor T18 may be a pull-up transistor that transmits a high-level voltage to the output terminal GOUT.

The capacitor C11 may be connected between the output terminal GOUT and the second node Q2. A voltage between the output terminal GOUT and the second node Q2 may be stored in the capacitor C11. A voltage of the second node Q2 may vary according to a voltage variation of the output terminal GOUT due to coupling of the capacitor C11.

When the sixth transistor T16 is omitted and the gate of the seventh transistor T17 is directly connected to the first node Q1, stress on transistors connected to the first node Q1 may be very high due to a voltage variation of the first node Q1 due to coupling of the capacitor C11. On the other hand, when the sixth transistor T16 is connected between the first node Q1 and the second node Q2, a voltage difference between the first node Q1 and the second node Q2 during a voltage variation of the second node Q2 may be reduced. Accordingly, stress on the transistors connected to the first node Q1 may be reduced.

In another embodiment, when the second voltage VGL1 is a very low level voltage, even when the sixth transistor T16 is omitted, the stress effect on transistors may be minimized.

In the present embodiment, because the first node Q1 and the second node Q2 are charged by the second transistor T12 with the second voltage VGL1 lower than a low-level voltage of a clock signal, a gate-source voltage of the seventh transistor T17 may increase, thereby improving driving capability. Accordingly, because the size of the seventh transistor T17 may be reduced without output loss, the size of a non-display area may be reduced.

Figure 15:
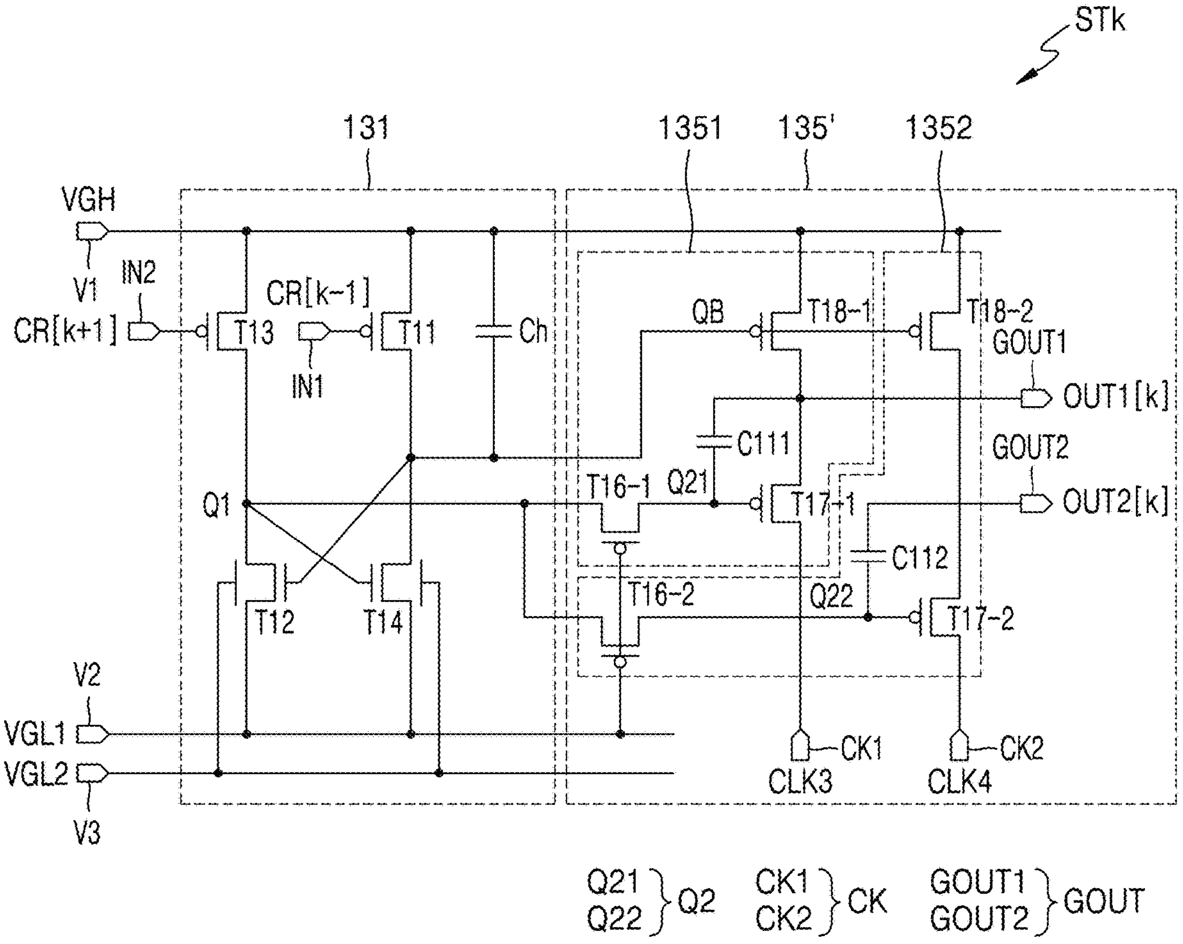
FIGS. 15 to 18 are circuit diagrams illustrating an example of a stage included in a gate driving unit of FIG. 9.
Figure 16:
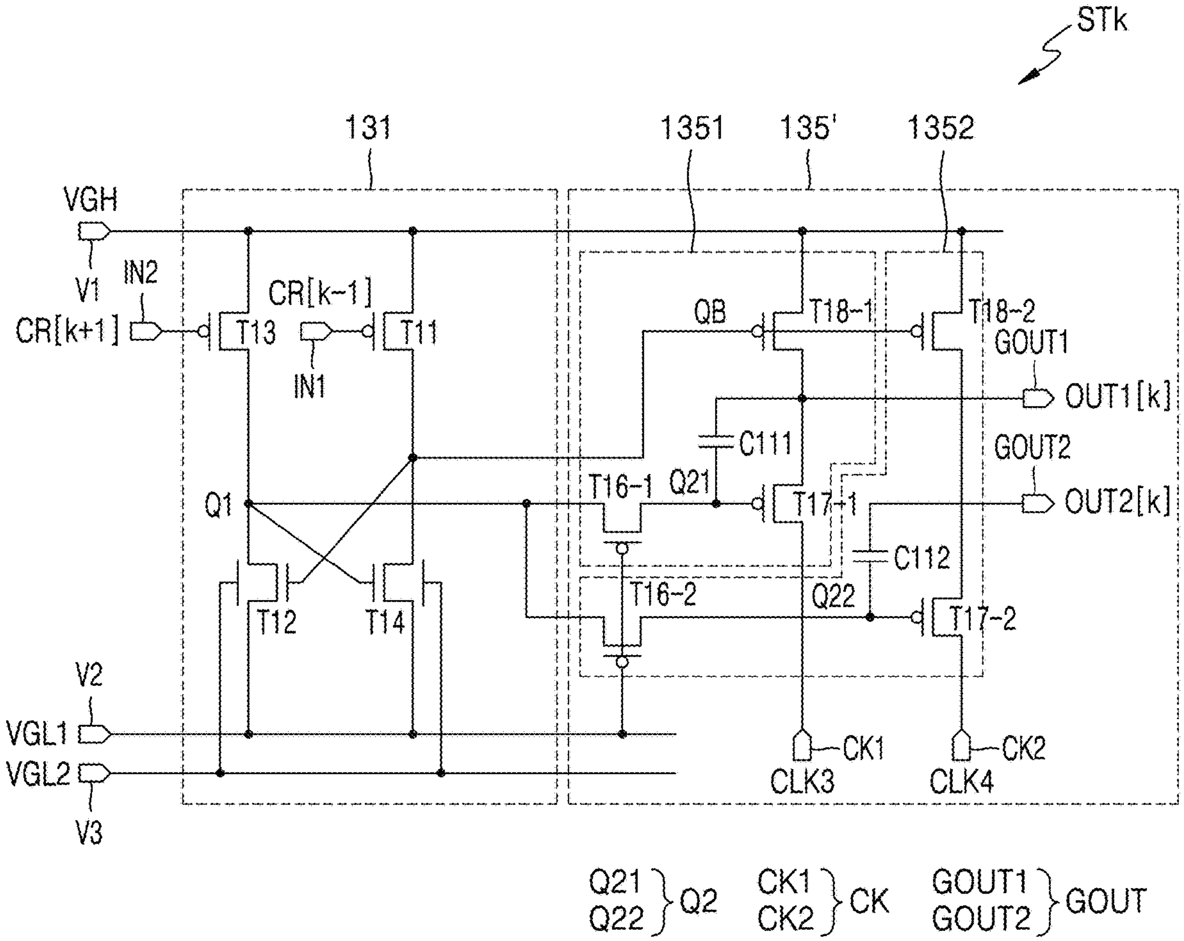
Figure 17:
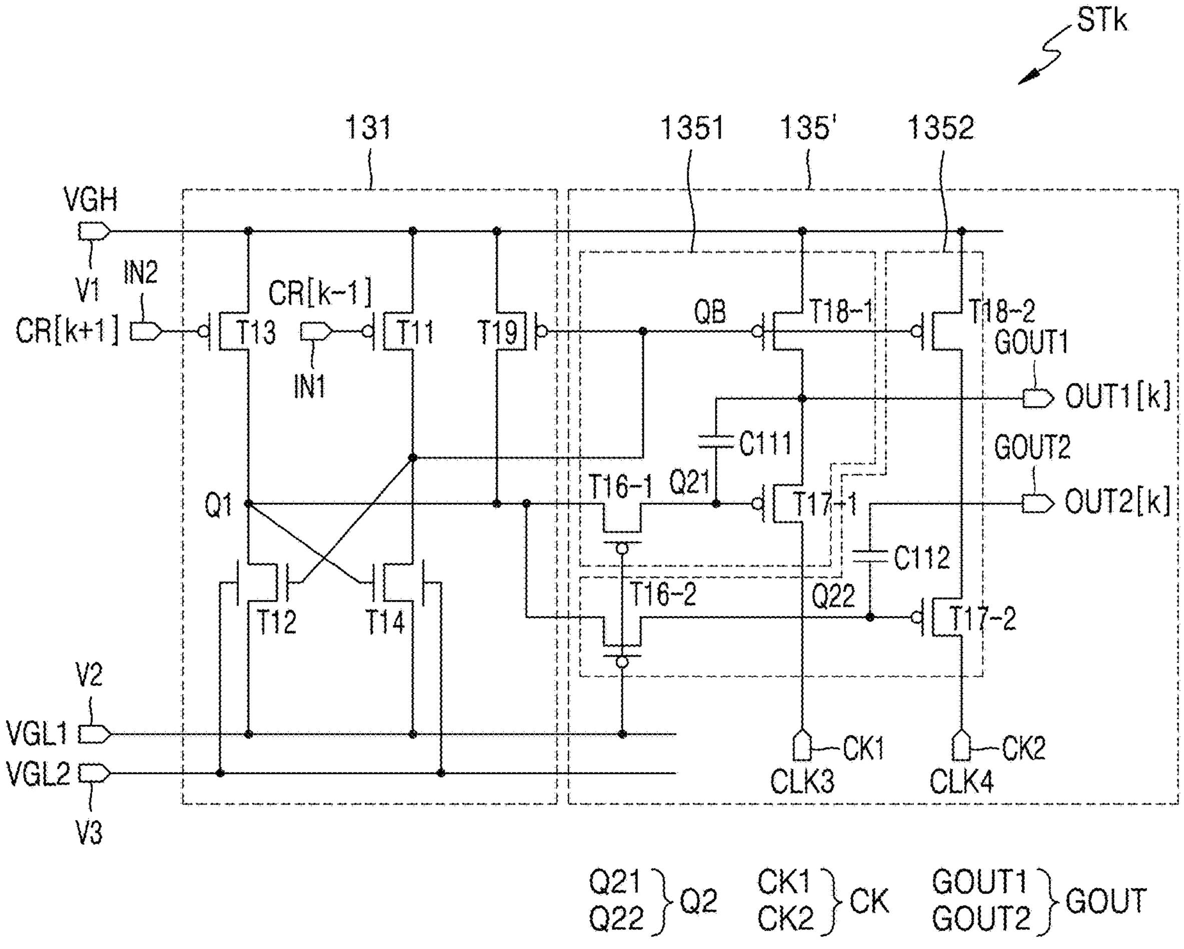
Figure 18:
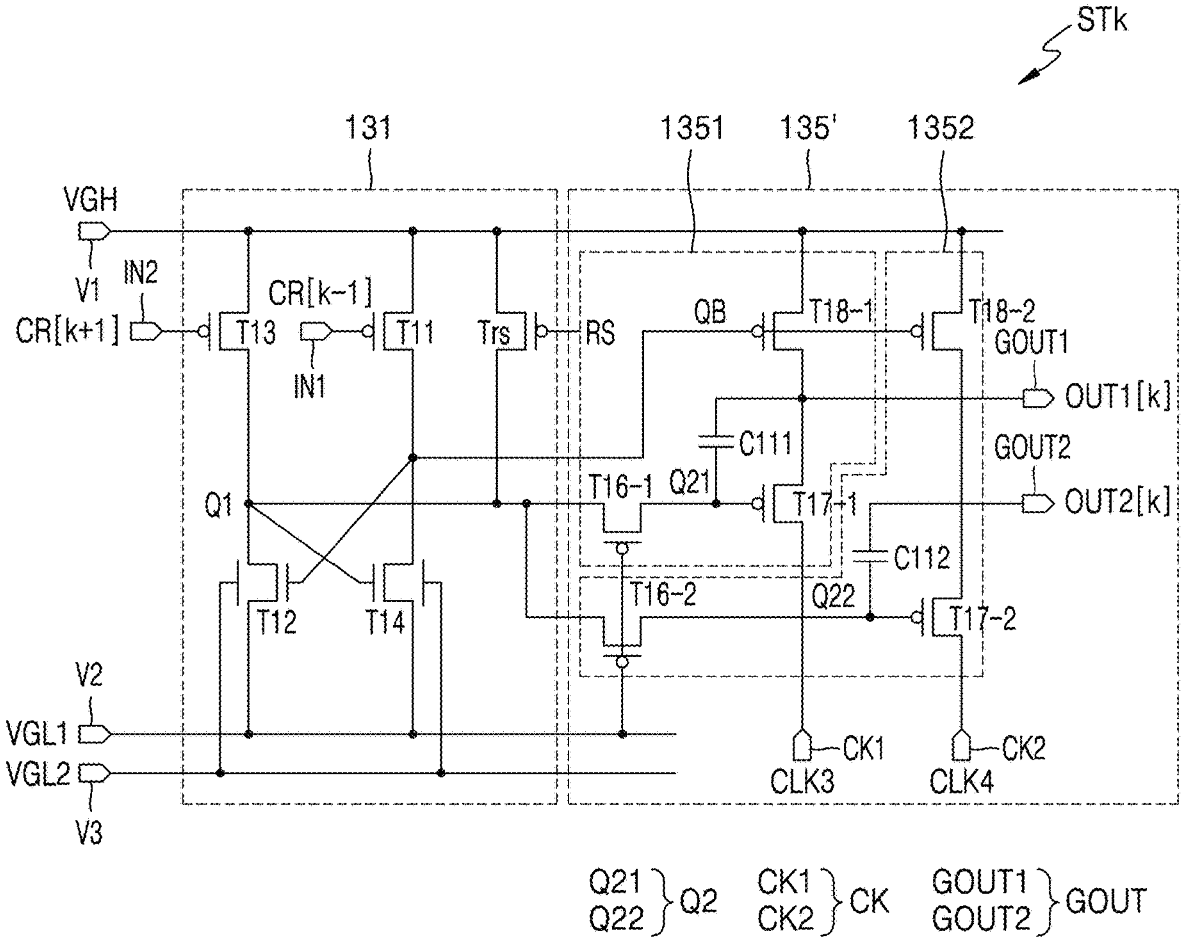

In another embodiment, as shown in FIG. 15 described below, the fifth transistor T15 may be omitted from the control circuit 131 of the $k^{th}$ stage STK, and a hold capacitor Ch may be added. In another embodiment, as shown in FIG. 16 described below, the fifth transistor T15 and the hold capacitor Ch may be omitted from the control circuit 131 of the $k^{th}$ stage STK. In another embodiment, as shown in FIG. 17 described below, the fifth transistor T15 may be omitted from the control circuit 131 of the $k^{th}$ stage STK, and a ninth transistor T19 of a P-channel may be added. In another embodiment, as shown in FIG. 18 described below, the fifth transistor T15 may be omitted from the control circuit 131 of the $k^{th}$ stage STK, and a reset transistor Trs of a P-channel may be added.

Hereinafter, an operation of the $k^{th}$ stage STK of FIG. 6 will be described with reference to FIG. 7.

A low-level voltage Q1_LV of a voltage of the first node Q1 (a first node voltage VQ1) may be about the second voltage VGL1. A low-level voltage CLK_LV of the clock signal CLK may be higher than the second voltage VGL1. A first low-level voltage Q2_LV1 of a voltage of the second node Q2 (a second node voltage VQ2) may be lower than the low-level voltage CLK_LV of the clock signal and may be higher than the low-level voltage Q1_LV of the first node voltage VQ1. A second low-level voltage Q2_LV2 of the second node voltage VQ2 may be lower than the low-level voltage Q1_LV of the first node voltage VQ1. A low-level voltage QB_LV of a voltage of the third node QB (a third node voltage VQB) may be about the second voltage VGL1. A low-level voltage OUT_LV of an output signal may be about the low-level voltage CLK_LV of the clock signal.

In a first section P1, the previous output signal OUT[k−1] of a low level may be input to the first input terminal IN1, the next output signal OUT[k+1] of a high level may be input to the second input terminal IN2, and the second clock signal CLK2 of a high level may be input to the clock terminal CK.

The first transistor T11 may be turned on by the previous output signal OUT[k−1] of a low level, the first voltage VGH may be transmitted to the third node QB, and the third node voltage VQB may be a high-level voltage. The second transistor T12 with the gate connected to the third node QB may be turned on, the second voltage VGL1 may be transmitted to the first node Q1, and the first node voltage VQ1 may be a low-level voltage. Due to the turned-on sixth transistor T16, the second node voltage VQ2 may be a low level voltage, similar to the first node voltage VQ1. In an embodiment, the second node voltage VQ2 may be a low-level voltage higher than the first node voltage VQ1.

The seventh transistor T17 with the gate connected to the second node Q2 may be turned on and the second clock signal CLK2 may be transmitted to the output terminal GOUT. Accordingly, the output signal OUT[k] of a high level may be output from the output terminal GOUT. A voltage difference between the output terminal GOUT and the second node Q2 may be stored in the capacitor C11.

In a second section P2, the previous output signal OUT [k−1] may be changed from a low level to a high level, the next output signal OUT[k+1] of a high level may be input, and the second clock signal CLK2 of a low level may be input.

The first transistor T11 may be turned off by the previous output signal OUT[k−1] of a high level, and voltages of the first node Q1 and the second node Q2 may maintain low-level voltages due to the capacitor C11. The second clock signal CLK2 of a low level may be transmitted to the output terminal GOUT by the turned-on seventh transistor T17, and the output signal OUT[k] of a low level may be output from the output terminal GOUT. In this case, when a voltage of the output terminal GOUT falls from a high level to a low level, the second node voltage VQ2 may fall to a low-level voltage lower than a voltage in the first section P1 due to coupling of the capacitor C11.

Due to the fifth transistor T15 turned on by the gate connected to the first node Q1, the first voltage VGH may be transmitted to the third node QB, and a voltage of the third node QB may be stably maintained at a high level.

In a third section P3, the previous output signal OUT[k−1] of a high level may be input, the next output signal OUT [k+1] may be changed from a high level to a low level, and the second clock signal CLK2 of a high level may be input.

The third transistor T13 may be turned on by the next output signal OUT[k+1] of a low level, the first voltage VGH may be transmitted to the first node Q1, and the first node voltage VQ1 may be changed to a high level. Due to the turned-on sixth transistor T16, the second node voltage VQ2 may be a high-level voltage, similar to the first node voltage VQ1.

The fourth transistor T14 with the gate connected to the first node Q1 may be turned on, the second voltage VGL1 may be transmitted to the third node QB, and the third node voltage VQB may be changed to a low level. The eighth transistor T18 with the gate connected to the third node QB may be turned on, and the first voltage VGH of a high level may be transmitted to the output terminal GOUT. Accordingly, the output signal OUT[k] of a high level may be output from the output terminal GOUT.

The stage of FIG. 6 may be an example of a stage that outputs one output signal as shown in FIG. 3A. In another embodiment, a stage may output a plurality of output signals as shown in FIG. 3B.

Figure 8:
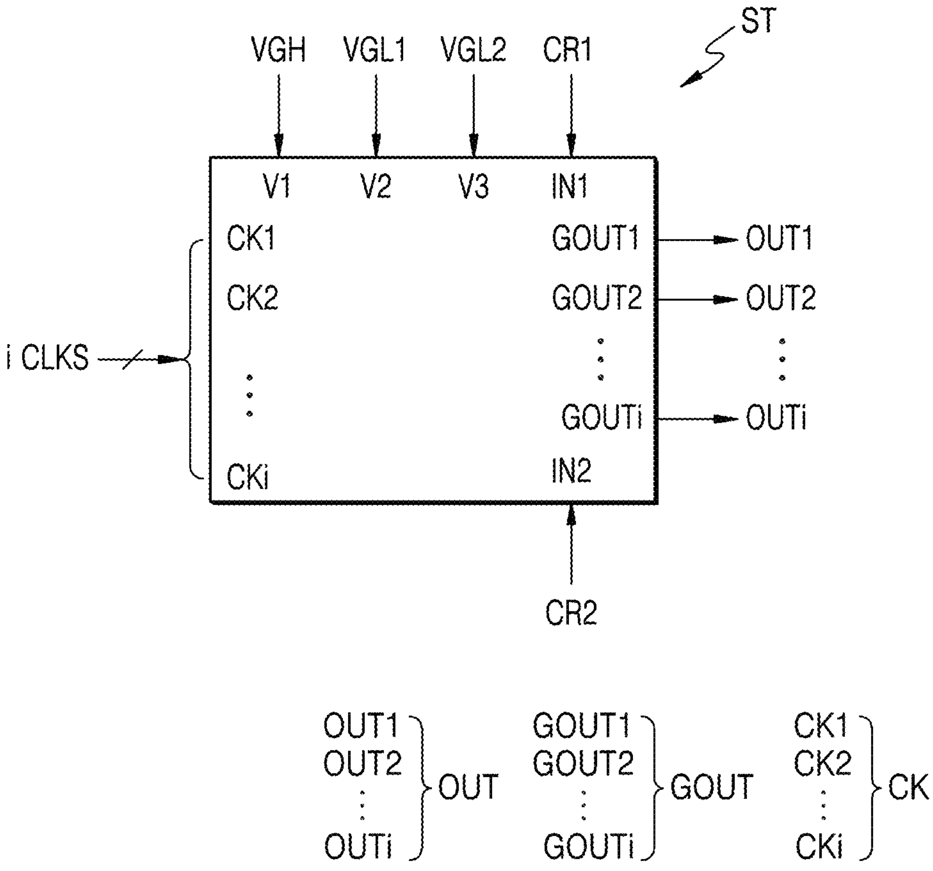
FIG. 8 is a diagram schematically illustrating one stage of a driving circuit, according to an embodiment.

FIG. 8 is a diagram schematically illustrating one stage of a driving circuit, according to an embodiment;

Referring to FIG. 8, each of a plurality of stages ST may receive a first carry signal CR1, which is a previous carry signal, through a first input terminal IN1 and may receive a second carry signal CR2, which is a next carry signal, through the second input terminal IN2.

Each of the plurality of stages ST may include a plurality of clock terminals CK. One of a plurality of clock signals CLK may be input to a corresponding one of the plurality of clock terminals CK. In an embodiment, for example, each of the plurality of stages ST may include i clock terminals (e.g., clock terminals CK1 to CK i) and may receive i clock signals CLK from among 2i clock signals CLK. Here, i may be an integer equal to or greater than 2.

Each of the plurality of stages ST may include a plurality of output terminals GOUT. The number of output terminals GOUT may be the same as the number of clock signals CLK input to each stage. In an embodiment, for example, each of the plurality of stages ST may include i output terminals (e.g., output terminals GOUT1 to GOUTi) and may sequentially shift and output i output signals (e.g., output signals OUT1 to OUTi) by a certain interval.

Figure 9:
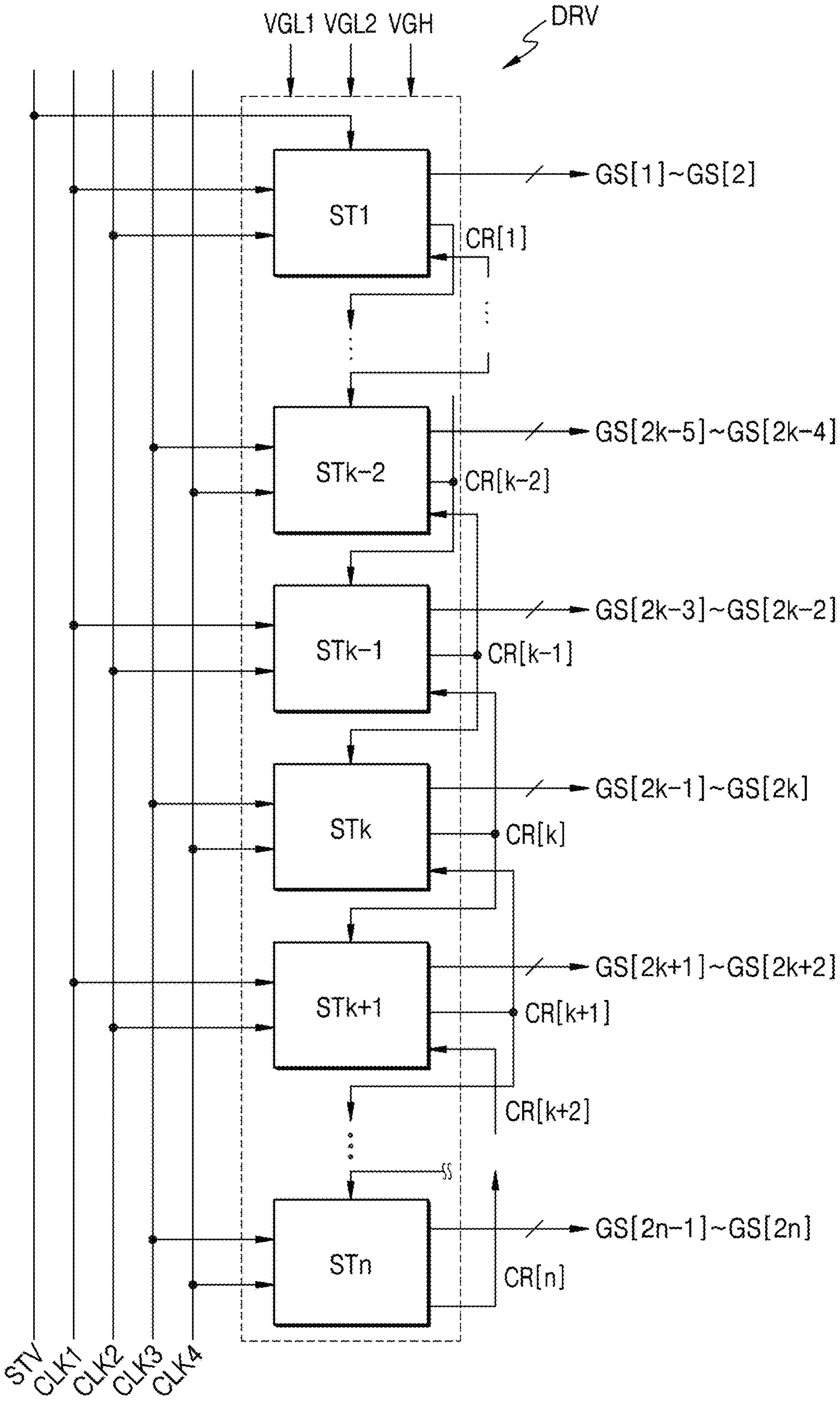
FIG. 9 is a diagram schematically illustrating a driving circuit, according to an embodiment.
Figure 10:
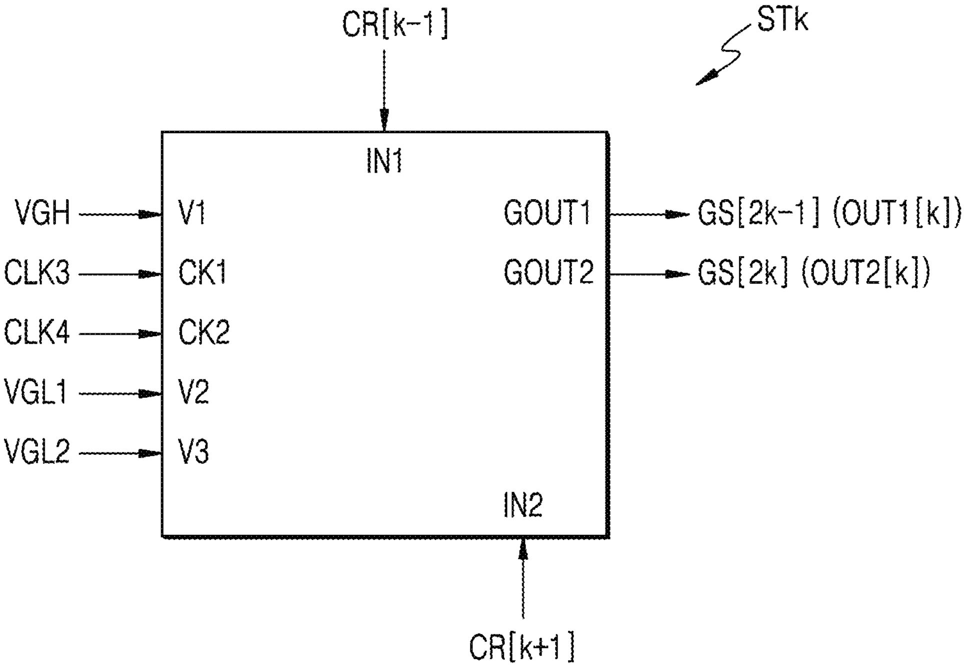
FIG. 10 is a diagram schematically illustrating one stage of the driving circuit of FIG. 9.
Figure 11:
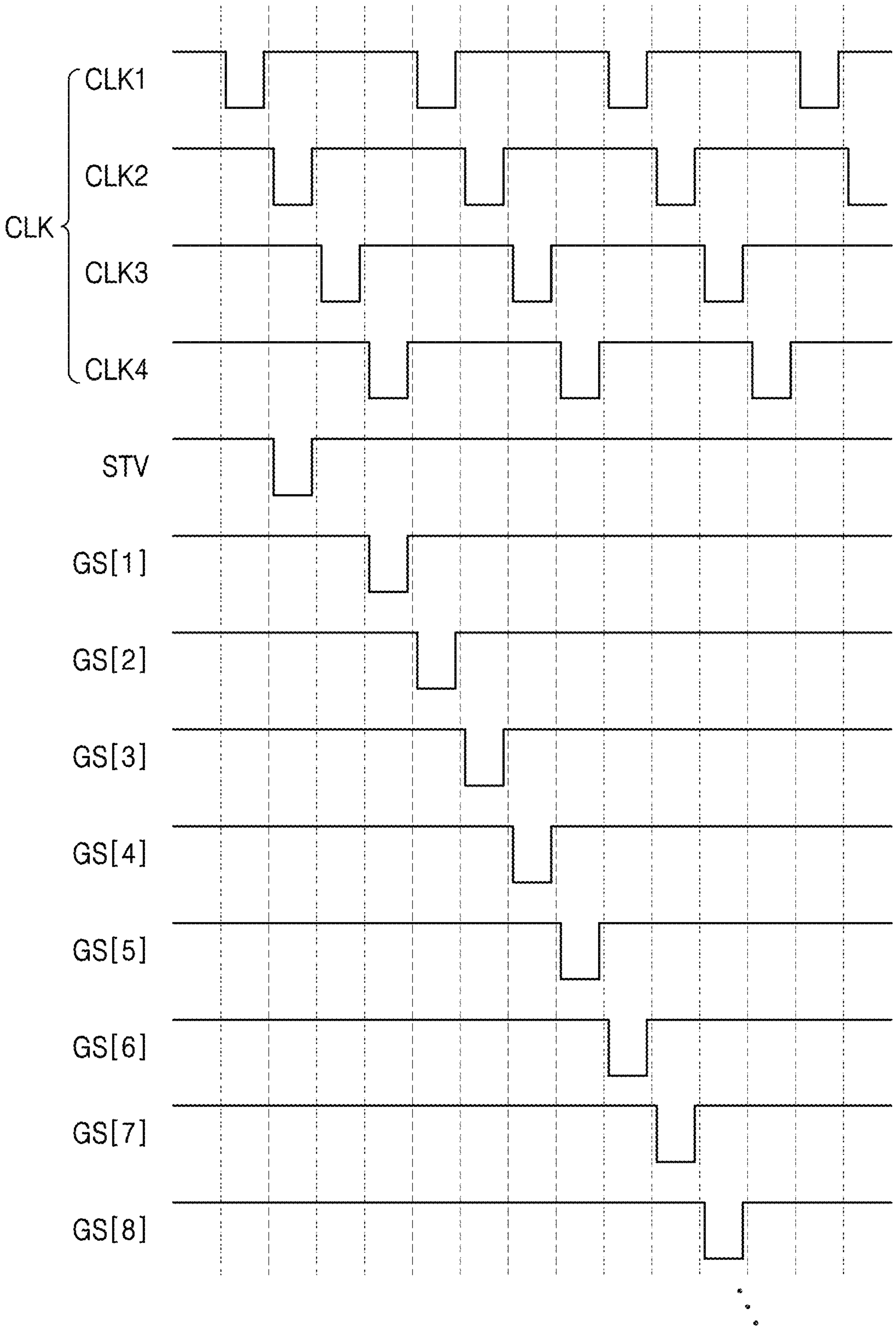
FIG. 11 is a diagram illustrating signals input to and signals output from stages of the driving circuit of FIG. 9.
Figure 12:
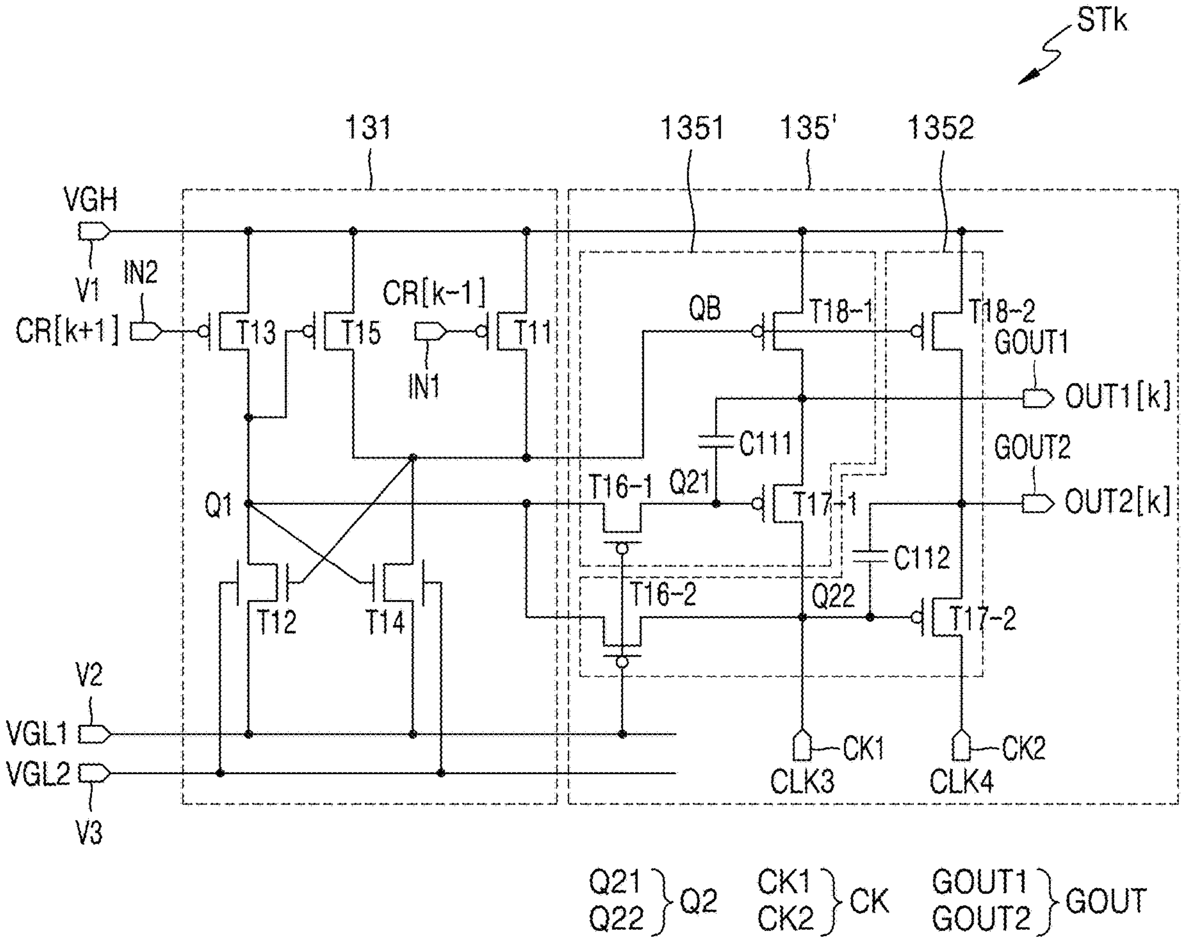
FIG. 12 is a circuit diagram illustrating an example of a stage included in the driving circuit of FIG. 9.
Figure 13:
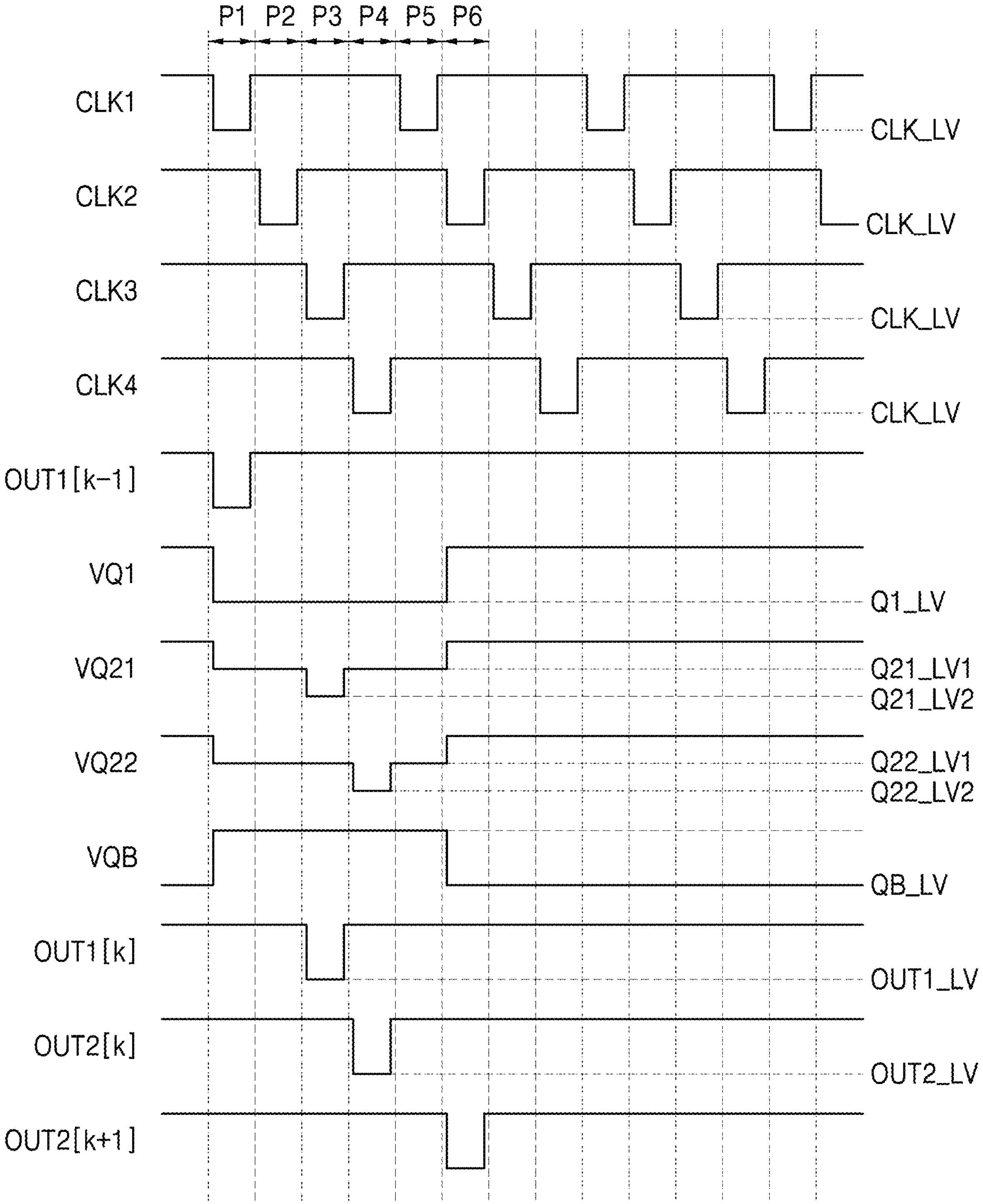
FIGS. 13 and 14 are timing diagrams for describing an operation of the stage of FIG. 12.
Figure 14:
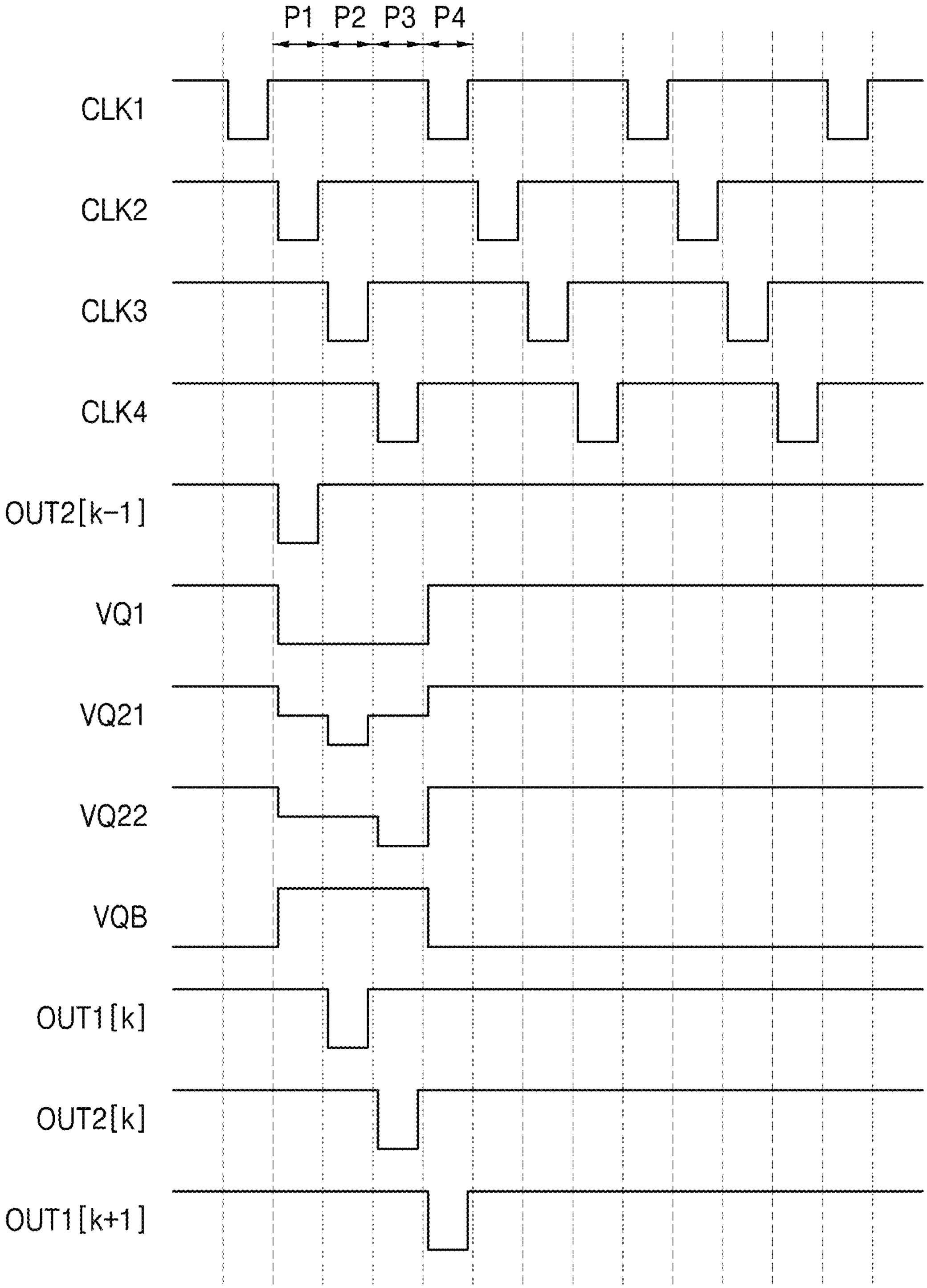

FIG. 9 is a diagram schematically illustrating a driving circuit, according to an embodiment. FIG. 10 is a diagram schematically illustrating one stage of the driving circuit of FIG. 9. FIG. 11 is a diagram illustrating signals input to and signals output from stages of the driving circuit of FIG. 9. FIG. 12 is a circuit diagram illustrating an example of a stage included in the driving circuit of FIG. 9. FIGS. 13 and 14 are timing diagrams for describing an operation of the stage of FIG. 12. FIGS. 10 and 12 illustrate a $k^{th}$ stage STK of the driving circuit of FIG. 9, and the following will be described assuming that the $k^{th}$ stage STk is an even-numbered stage.

The driving circuit DRV of FIG. 9 is an embodiment in which each of a plurality of stages (e.g., stages ST1 to STn) generates two gate signals and outputs the gate signals to gate lines of two corresponding rows. In this case, the number of stages may be ½ of the number of rows provided in the pixel area 110. Each of the plurality of stages (e.g., stages ST1 to STn) may sequentially output two gate signals. In an embodiment, for example, a $k-2^{th}$ stage STK−2 may output a $2k-5^{th}$ gate signal GS[2*k*−5] to a gate line of a $2k-5^{th}$ row and may output a $2k-4^{th}$ gate signal GS[2*k*−4] to a gate line of a $2k-4^{th}$ row.

A detailed description of the same configuration and operation as those in FIGS. 4 to 7 will be omitted, and a difference will be mainly described.

Referring to FIGS. 9 and 10, each of the plurality of stages (e.g., stages ST1 to STn) may include a first input terminal IN1, a second input terminal IN2, a first voltage input terminal V1, a second voltage input terminal V2, a third voltage input terminal V3, a first clock terminal CK1, a second clock terminal CK2, a first output terminal GOUT1, and a second output terminal GOUT2.

Each of the plurality of stages (e.g., stages ST1 to STn) may generate a carry signal and may supply the carry signal to the first input terminal IN1 of a next stage and the second input terminal IN2 of a previous stage.

A start signal may be input to the first input terminal IN1. The start signal may be an external signal STV or a previous carry signal. In an embodiment, the external signal STV may be input as a start signal to the first input terminal IN1 of a first stage ST1, and a previous carry signal may be input as a start signal to the first input terminal IN1 of each of second to $n^{th}$ stages ST2 to STn. In an embodiment, for example, as shown in FIG. 10, a $k-1^{th}$ carry signal CR[k−1] output from a $k-1^{th}$ stage STk−1 may be input as a start signal to the first input terminal IN1 of a $k^{th}$ stage STK.

A next carry signal may be input to the second input terminal IN2. In an embodiment, for example, as shown in FIG. 10, a k+1$^{th}$ carry signal CR[k+1] output from a k+1$^{th}$ stage may be input to the second input terminal IN2 of the k$^{th}$ stage STK.

A first voltage VGH may be input to the first voltage input terminal V1, a second voltage VGL1 may be input to the second voltage input terminal V2, and a third voltage VGL2 may be input to the third voltage input terminal V3.

Two of first to fourth clock signals CLK1 to CLK4 may be input to the first clock terminal CK1 and the second clock terminal CK2. In an embodiment, for example, as shown in FIG. 9, the first clock signal CLK1 and the second clock signal CLK2 may be input to the first clock terminal CK1 and the second clock terminal CK2 of an odd-numbered stage, respectively, and the third clock signal CLK3 and the fourth clock signal CLK4 may be input to the first clock terminal CK1 and the second clock terminal CK2 of an even-numbered stage, respectively. In another embodiment, the third clock signal CLK3 and the fourth clock signal CLK4 may be input to the first clock terminal CK1 and the second clock terminal CK2 of an odd-numbered stage, respectively, and the first clock signal CLK1 and the second clock signal CLK2 may be input to the first clock terminal CK1 and the second clock terminal CK2 of an even-numbered stage, respectively. FIG. 10 illustrates that the third clock signal CLK3 and the fourth clock signal CLK4 are input to the first clock terminal CK1 and the second clock terminal CK2 of the k$^{th}$ stage STK that is an even-numbered stage, respectively.

Referring to FIG. 11, the first to fourth clock signals CLK1 to CLK4 may be square wave signals in which a high-level voltage and a low-level voltage are repeated. In an embodiment, a high-level voltage of each of the first to fourth clock signals CLK1 to CLK4 may be the first voltage VGH. A low-level voltage of each of the first to fourth clock signals CLK1 to CLK4 may be the second voltage VGL1, or a voltage lower than the first voltage VGH and higher than the second voltage VGL1. The first to fourth clock signals CLK1 to CLK4 may have the same waveform and the same cycle and may be phase-shifted (phase-delayed) signals from each other. The first to fourth clock signals CLK1 to CLK4 may be sequentially phase-shifted by ¼ cycle from each other and then input to the driving circuit DRV. In the first to fourth clock signals CLK1 to CLK4, a duration during which a low-level voltage is maintained for one cycle may be equal to or shorter than a duration during which a high-level voltage is maintained.

A first output signal may be output from the first output terminal GOUT1, and a second output signal may be output from the second output terminal GOUT2. The first output signal may be a gate signal output to a gate line provided in one of two rows corresponding to a current stage. The second output signal may be a gate signal output to a gate line provided in the other of the two rows corresponding to the current stage. In an embodiment, for example, a 2k−1$^{th}$ gate signal GS[2*k*−1] may be output as a first output signal OUT1[*k*] from the first output terminal GOUT1 of the k$^{th}$ stage STK of FIG. 10, and a 2k$^{th}$ gate signal GS[2*k*] may be output as a second output signal OUT2[*k*] from the second output terminal GOUT2. A high-level voltage and a low-level voltage of the first output signal OUT1[*k*] and the second output signal OUT2[*k*] may be the first voltage VGH and a low-level voltage of a clock signal, respectively.

As shown in FIG. 11, gate signals GS[1], GS[2], GS[3], GS[4], . . . output from the first output terminal GOUT1 and the second output terminal GOUT2 of the plurality of stages (e.g., stages ST1 to STn) may be sequentially shifted from each other by a certain interval. In an embodiment, the plurality of stages (e.g., stages ST1 to STn) may shift, by ¼ cycle of a clock signal, and sequentially output the gate signals GS[1], GS[2], GS[3], GS[4], . . . of a low-level voltage.

The driving circuit DRV may further include at least one dummy stage at a rear end of the n$^{th}$ stage STn.

An operation of the k$^{th}$ stage STK corresponding to a 2k−1$^{th}$ row and a 2k$^{th}$ row of the pixel area 110 will be described. For convenience of explanation, the following will be described assuming that the k$^{th}$ stage STK is an even-numbered stage, and the third clock signal CLK3 is supplied to the first clock terminal CK1 and the fourth clock signal CLK4 is supplied to the second clock terminal CK2. The k$^{th}$ stage STK, which is a current stage may receive the k−1$^{th}$ carry signal CR[k−1] from the k−1$^{th}$ stage STk−1, which is a previous stage, and may receive the k+1$^{th}$ carry signal CR[k+1] from the k+1$^{th}$ stage STk+1, which is a next stage. In the k$^{th}$ stage STK, the 2k−1$^{th}$ gate signal GS[2*k*−1] may be output as the first output signal OUT1[*k*] to a gate line of the 2k−1$^{th}$ row, and the 2k$^{th}$ gate signal GS[2*k*] may be output as the second output signal OUT2[*k*] to a gate line of the 2k$^{th}$ row.

Referring to FIG. 12, the k$^{th}$ stage STK may include a control circuit 131 and an output circuit 135'. Each of the control circuit 131 and the output circuit 135' may include at least one transistor.

The control circuit 131 may control voltages of a third node QB and a first node Q1 in response to signals input to the first input terminal IN1 and the second input terminal IN2. The control circuit 131 is the same as the control circuit 131 of FIG. 6, and thus, a detailed description thereof will be omitted.

The previous carry signal CR[k−1] may be a first output signal OUT1[*k*−1] (a previous first output signal) or a second output signal OUT2[*k*−1] (a previous second output signal) output from the k−1$^{th}$ stage STk−1. The next carry signal CR[k+1] may be a second output signal OUT2[*k*+1] (a next second output signal) or a first output signal OUT1 [*k*+1] (a next first output signal) output from the k+1$^{th}$ stage STk+1.

The output circuit 135' may be connected between the first voltage input terminal V1 and the clock terminal CK and may output a low-level voltage and a high-level voltage of a clock signal and a high-level voltage of the first voltage VGH according to voltages of a second node Q2 and the third node QB. The second node Q2 may include a plurality of sub-nodes. The number of sub-nodes may be the same as the number of sub-output circuits. The second node Q2 may include a first sub-node Q21 and a second sub-node Q22.

In FIG. 12, a gate of the fifth transistor T15 may be connected to the first node Q1. In another embodiment, the gate of the fifth transistor T15 may be connected to the first sub-node Q21 or the second sub-node Q22.

The output circuit 135' may include a plurality of sub-output circuits that are connected in parallel. The output circuit 135' may have a structure in which a plurality of output circuits 135 of FIG. 6 are connected in parallel. The sub-output circuits may include a first sub-output circuit 1351 and a second sub-output circuit 1352. Each of the first sub-output circuit 1351 and the second sub-output circuit 1352 may be the same as the output circuit 135 of FIG. 6.

The first sub-output circuit 1351 may include a sixth transistor T16-1, a seventh transistor T17-1, and an eighth transistor T18-1. The first sub-output circuit 1351 may further include a capacitor C111.

The sixth transistor T16-1 may be connected between the first node Q1 and the first sub-node Q21. A gate of the sixth transistor T16-1 may be connected to the second voltage input terminal V2. The sixth transistor T16-1 may always be in a turned-on state due to the second voltage VGL1. In another embodiment, the gate of the sixth transistor T16-1 may be connected to the third voltage input terminal V3. In another embodiment, when the second voltage VGL1 is a very low-level voltage, the sixth transistor T16-1 may be omitted.

The seventh transistor T17-1 may be connected between the first output terminal GOUT1 and the first clock terminal CK1. A gate of the seventh transistor T17-1 may be connected to the first sub-node Q21. The seventh transistor T17-1 may be turned on when a voltage of the first sub-node Q21 is at a low level, and may transmit a clock signal input to the first clock terminal CK1, that is, the third clock signal CLK3, to the first output terminal GOUT1. The seventh transistor T17-1 may be a pull-down transistor that transmits a low-level voltage to the first output terminal GOUT1.

The eighth transistor T18-1 may be connected between the first voltage input terminal V1 and the first output terminal GOUT1. A gate of the eighth transistor T18-1 may be connected to the third node QB. The eighth transistor T18-1 may be turned on when a voltage of the third node QB is at a low level, and may transmit the first voltage VGH input to the first voltage input terminal V1 to the first output terminal GOUT1. The eighth transistor T18-1 may be a pull-up transistor that transmits a high-level voltage to the first output terminal GOUT1.

The capacitor C111 may be connected between the first output terminal GOUT1 and the first sub-node Q21. The capacitor C111 may be omitted.

The second sub-output circuit 1352 may include a sixth transistor T16-2, a seventh transistor T17-2, and an eighth transistor T18-2. The second sub-output circuit 1352 may further include a capacitor C112.

The sixth transistor T16-2 may be connected between the first node Q1 and the second sub-node Q22. A gate of the sixth transistor T16-2 may be connected to the second voltage input terminal V2. The sixth transistor T16-2 may be always in a turned-on state due to the second voltage VGL1. In another embodiment, the gate of the sixth transistor T16-2 may be connected to the third voltage input terminal V3. In another embodiment, when the second voltage VGL1 is a very low-level voltage, the sixth transistor T16-2 may be omitted.

The seventh transistor T17-2 may be connected between the second output terminal GOUT2 and the second clock terminal CK2. A gate of the seventh transistor T17-2 may be connected to the second sub-node Q22. The seventh transistor T17-2 may be turned on when a voltage of the second sub-node Q22 is at a low level, and may transmit a clock signal input to the second clock terminal CK2, that is, the fourth clock signal CLK4, to the second output terminal GOUT2. The seventh transistor T17-2 may be a pull-down transistor that transmits a low-level voltage to the second output terminal GOUT2.

The eighth transistor T18-2 may be connected between the first voltage input terminal V1 and the second output terminal GOUT2. A gate of the eighth transistor T18-2 may be connected to the third node QB. The eighth transistor T18-2 may be turned on when a voltage of the third node QB is at a low level, and may transmit the first voltage VGH input to the first voltage input terminal V1 to the second output terminal GOUT2. The eighth transistor T18-2 may be a pull-up transistor that transmits a high-level voltage to the second output terminal GOUT2.

The capacitor C112 may be connected between the second output terminal GOUT2 and the second sub-node Q22. The capacitor C112 may be omitted.

An operation of the $k^{th}$ stage STK of FIG. 12 will be described with reference to FIGS. 13 and 14.

A low-level voltage Q1_LV of a first node voltage VQ1 may be about the second voltage VGL1. A low-level voltage CLK_LV of each of the first to fourth clock signals CLK1 to CLK4 may be higher than the second voltage VGL1. A first low-level voltage Q21_LV1 of a first sub-node voltage VQ21 and a first low-level voltage Q22_LV1 of a second sub-node voltage VQ22 may be lower than the low-level voltage CLK_LV of the clock signal and may be higher than the low-level voltage Q1_LV of the first node voltage VQ1. A second low-level voltage Q21_LV2 of the first sub-node voltage VQ21 and a second low-level voltage Q22_LV2 of the second sub-node voltage VQ22 may be lower than the low-level voltage Q1_LV of the first node voltage VQ1. A low-level voltage QB_LV of a third node voltage VQB may be the second voltage VGL1. A low-level voltage OUT1_LV of a first output signal OUT1[*k*] and a low-level voltage OUT2_LV of a second output signal OUT2[*k*] may be about the low-level voltage CLK_LV of the clock signal.

FIG. 13 is a timing diagram illustrating that the previous carry signal CR[k−1] is a previous first output signal OUT1[*k*−1] and the next carry signal CR[k+1] is the next second output signal OUT2[*k*+1]. A low-level input timing of the external signal STV shown in FIG. 11 is an example applied to an embodiment in which the previous carry signal CR[k−1] is the previous first output signal OUT1[*k*−1] and the next carry signal CR[k+1] is the next second output signal OUT2[*k*+1].

In a first section P1, the previous first output signal OUT1[*k*−1] of a low level may be input to the first input terminal IN1, the next second output signal OUT2[*k*+1] of a high level may be input to the second input terminal IN2, the third clock signal CLK3 of a high level may be input to a first clock terminal CK1, and the fourth clock signal CLK4 of a high level may be input to the second clock terminal CK2.

The first transistor T11 may be turned on by the previous first output signal OUT1[*k*−1] of a low level, the first voltage VGH may be transmitted to the third node QB, and the third node voltage VQB may be a high-level voltage. The second transistor T12 with the gate connected to the third node QB may be turned on, the second voltage VGL1 may be transmitted to the first node Q1, and the first node voltage VQ1 may be a low-level voltage.

The seventh transistor T17-1 with the gate connected to the first sub-node Q21 may be turned on, and the third clock signal CLK3 of a high level may be transmitted to the first output terminal GOUT1. Accordingly, the first output signal OUT1[*k*] of a high level may be output from the first output terminal GOUT1. A voltage difference between the first output terminal GOUT1 and the first sub-node Q21 may be stored in the capacitor C111. The seventh transistor T17-2 with the gate connected to the second sub-node Q22 may be turned on, and the fourth clock signal CLK4 of a high level may be transmitted to the second output terminal GOUT2. Accordingly, the second output signal OUT2[*k*] of a high level may be output from the second output terminal GOUT2. A voltage difference between the second output terminal GOUT2 and the second sub-node Q22 may be stored in the capacitor C112.

In a second section P2, the previous first output signal OUT1[k−1] may be changed from a low level to a high level, the next second output signal OUT2[k+1] of a high level may be input, the third clock signal CLK3 of a high level may be input, and the fourth clock signal CLK4 of a high level may be input.

The first transistor T11 may be turned off by the previous first output signal OUT1[k−1] of a high level, and the first node voltage VQ1, the first sub-node voltage VQ21, and the second sub-node voltage VQ22 may be maintained at a low level by the capacitors C111 and C112. The turned-on seventh transistors T17-1 and T17-2 may be maintained in a turned-on state, and the third clock signal CLK3 and the fourth clock signal CLK4 of a high level may be transmitted to the first output terminal GOUT1 and the second output terminal GOUT2, respectively. Accordingly, the first output signal OUT1[k] of a high level may be output from the first output terminal GOUT1, and the second output signal OUT2[k] of a high level may be output from the second output terminal GOUT2. Due to the fifth transistor T15 turned on by the gate connected to the first node Q1, the first voltage VGH may be transmitted to the third node QB, and a voltage of the third node QB may be stably maintained in a high-level state.

In a third section P3, the previous first output signal OUT1[k−1] and the next second output signal OUT2[k+1] of a high level may be input, the third clock signal CLK3 of a low level may be input, and the fourth clock signal CLK4 of a high level may be input.

Due to the previous first output signal OUT1[k−1] of a high level, the first transistor T11 may be maintained in a turned-off state, and the first node voltage Q1, the first sub-node voltage VQ21, and the second sub-node voltage VQ22 may be maintained at a low level by the capacitors C111 and C112.

Due to the turned-on seventh transistor T17-1, the third clock signal CLK3 of a low level may be input to the first output terminal GOUT1, and the first output signal OUT1[k] of a low level may be output from the first output terminal GOUT1. In this case, as a voltage of the first output terminal GOUT1 falls from a high level to a low level, the first sub-node voltage VQ21 may fall to a voltage level lower than a voltage level in the second section P2 due to coupling of the capacitor C111.

Due to the turned-on seventh transistor T17-2, the fourth clock signal CLK4 of a high level may be transmitted to the second output terminal GOUT2, and the second output signal OUT2[k] of a high level may be output from the second output terminal GOUT2.

A voltage of the third node QB may be maintained in a high-level state by the fifth transistor T15 turned on by the gate connected to the first node Q1.

In a fourth section P4, the previous first output signal OUT1[k−1] and t the next second output signal OUT2[k+1] of a high level may be input, the third clock signal CLK3 of a high level may be input, and the fourth clock signal CLK4 of a low level may be input.

Due to the previous first output signal OUT1[k−1] of a high level, the first transistor T11 may be maintained in a turned-off state, and the first node voltage VQ1, the first sub-node voltage VQ21 and the second sub-node voltage VQ22 may maintain a low-level voltage due to the capacitors C111 and C112.

Due to the turned-on seventh transistor T17-1, the third clock signal CLK3 of a high level may be transmitted to the first output terminal GOUT1, and the first output signal OUT1[k] of a high level may be output from the first output terminal GOUT1. As a voltage of the first output terminal GOUT1 rises from a low level to a high level, the first sub-node voltage VQ21 may rise to a low level (e.g., about a voltage level in the second section P2) higher than a voltage level in the third section P3 due to coupling of the capacitor C111.

Due to the turned-on seventh transistor T17-2, the fourth clock signal CLK4 of a low level may be transmitted to the second output terminal GOUT2, and the second output signal OUT2[k] of a low level may be output from the second output terminal GOUT2. In this case, as a voltage of the second output terminal GOUT2 falls from a high level to a low level, the second sub-node voltage VQ22 may fall to a voltage level lower than a voltage level in the third section P3 due to coupling of the capacitor C112.

A voltage of the third node QB may be maintained in a high-level state by the fifth transistor T15 turned on by the gate connected to the first gate Q1.

In a fifth section P5, the previous first output signal OUT1[k−1] and the next second output signal OUT2[k+1] of a high level may be input, the third clock signal CLK3 of a high level may be input, and the fourth clock signal CLK4 of a high level may be input.

Like in the second section P2, in the fifth section P5, the first output signal OUT1[k] of a high level may be output from the first output terminal GOUT1, and the second output signal OUT2[k] of a high level may be output from the second output terminal GOUT2. In this case, as a voltage of the second output terminal GOUT2 rises from a low level to a high level, the second sub-node voltage VQ22 may rise to a low level (e.g., about a voltage level in the third section P3) higher than a voltage level in the fourth section P4 due to coupling of the capacitor C112. A voltage of the third node QB may be maintained in a high-level state by the fifth transistor T15 turned on by the gate connected to the first node Q1.

In a sixth section P6, the previous first output signal OUT1[k−1] of a high level may be input, the next second output signal OUT2[k+1] may be changed from a high level to a low level, the third clock signal CLK3 of a high level may be input, and the fourth clock signal CLK4 of a high level may be input.

The third transistor T13 may be turned on by the next second output signal OUT2[k+1] of a low level, the first voltage VGH may be transmitted to the first node Q1, and the first node voltage VQ1 may be changed to a high level. Due to the turned-on sixth transistors T16-1 and T16-2, the first sub-node voltage VQ21 and the second sub-node voltage VQ22 may be changed to a high level, similar to the first node voltage VQ1.

The fourth transistor T14 with the gate connected to the first node Q1 may be turned on, the second voltage VGL1 may be transmitted to the third node QB, and the third node voltage VQB may be changed to a low level. The eighth transistor T18-1 with the gate connected to the third node QB may be turned on, and the first voltage VGH of a high level may be transmitted to the first output terminal GOUT1. Accordingly, the first output signal OUT1[k] of a high level may be output from the first output terminal GOUT1. Likewise, the eighth transistor T18-2 with the gate connected to the third node QB may be turned on, and the first voltage VGH of a high level may be transmitted to the second output terminal GOUT2. Accordingly, the second output signal OUT2[k] of a high level may be output from the second output terminal GOUT2.

FIG. 14 is a timing diagram illustrating that the previous carry signal CR[k−1] is the previous second output signal OUT2[k−1] and the next carry signal CR[k+1] is the next first output signal OUT1[k+1].

In a first section P1, the previous second output signal OUT2[k−1] of a low level may be input to the first input terminal IN1, the next first output signal OUT1[k+1] of a high level may be input to the second input terminal IN2, the third clock signal CLK3 of a high level may be input to the first clock terminal CK1, and the fourth clock signal CLK4 of a high level may be input to the second clock terminal CK2.

The first transistor T11 may be turned on by the previous second output signal OUT2[k−1] of a low level, the first voltage VGH may be transmitted to the third node QB, and the third node voltage VQB may be at a high level. The second transistor T12 with the gate connected to the third node QB may be turned on, the second voltage VGL1 may be transmitted to the first node Q1, and the first node voltage VQ1 may be at a low level. Due to the turned-on sixth transistors T16-1 and T16-2, each of the first sub-node voltage VQ21 and the second sub-node voltage VQ22 may be a low-level voltage higher than the first node voltage VQ1.

The seventh transistor T17-1 with the gate connected to the first sub-node Q21 may be turned on, and the third clock signal CLK3 of a high level may be transmitted to the first output terminal GOUT1. Accordingly, the first output signal OUT1[k] of a high level may be output from the first output terminal GOUT1. A voltage difference between the first output terminal GOUT1 and the first sub-node Q21 may be stored in the capacitor C111. The seventh transistor T17-2 with the gate connected to the second sub-node Q22 may be turned on, and the fourth clock signal CLK4 of a high level may be transmitted to the second output terminal GOUT2. Accordingly, the second output signal OUT2[k] of a high level may be output from the second output terminal GOUT2. A voltage difference between the second output terminal GOUT2 and the second sub-node Q22 may be stored in the capacitor C112.

In a second section P2, the previous second output signal OUT2[k−1] may be changed from a low level to a high level, the next first output signal OUT1[k+1] of a high level may be input, the third clock signal CLK3 of a low level may be input, and the fourth clock signal CLK4 of a high level may be input.

Due to the previous second output signal OUT2[k−1] of a high level, the first transistor T11 may be maintained in a turned-off state, and the first node voltage VQ1, the first sub-node voltage VQ21, and the second sub-node voltage VQ22 may be maintained at a low level by the capacitors C111 and C112.

Due to the turned-on seventh transistor T17-1, the third clock signal CLK3 of a low level may be transmitted to the first output terminal GOUT1, and the first output signal OUT1[k] of a low level may be output from the first output terminal GOUT1. In this case, as a voltage of the first output terminal GOUT1 falls from a high level to a low level, a first sub-node voltage VQ21 may fall to a voltage level lower than a voltage level in the second section P2 due to coupling of the capacitor C111.

Due to the turned-on seventh transistor T17-2, the fourth clock signal CLK4 of a high level may be transmitted to the second output terminal GOUT2, and the second output signal OUT2[k] of a high level may be output from the second output terminal GOUT2.

A voltage of the third node QB may be maintained at a high level by the fifth transistor T15 turned on by the gate connected to the first node Q1.

In a third section P3, the previous second output signal OUT2[k−1] and the next first output signal OUT1[k+1] of a high level may be input, the third clock signal CLK3 of a high level may be input, and the fourth clock signal CLK4 of a low level may be input.

Due to the previous second output signal OUT2[k−1] of a high level, the first transistor T11 may be maintained in a turned-off state, and the first node voltage VQ1, the first sub-node voltage VQ21, and the second sub-node voltage VQ22 may be maintained at a low level by the capacitors C111 and C112.

Due to the turned-on seventh transistor T17-1, the third clock signal CLK3 of a high level may be transmitted to the first output terminal GOUT1, and the first output signal OUT1[k] of a high level may be output from the first output terminal GOUT1. In this case, as a voltage of the first output terminal GOUT1 rises from a low level to a high level, the first sub-node voltage VQ21 may rise to a low level (e.g., about a voltage level in the first section P1) higher than a voltage level in the second section P2 due to coupling of the capacitor C111.

Due to the turned-on seventh transistor T17-2, the fourth clock signal CLK4 of a low level may be transmitted to the second output terminal GOUT2, and the second output signal OUT2[k] of a low level may be output from the second output terminal GOUT2. In this case, as a voltage of the second output terminal GOUT2 falls from a high level to a low level, the second sub-node voltage VQ22 may fall to a voltage level lower than a voltage level in the second section P2 due to coupling of the capacitor C112.

A voltage of the third node QB may be maintained in a high-level state by the fifth transistor T15 turned on by the gate connected to the first node Q1.

In a fourth section P4, the previous second output signal OUT2[k−1] of a high level may be input, the next first output signal OUT1[k+1] may be changed from a high level to a low level, the third clock signal CLK3 of a high level may be input, and the fourth clock signal CLK4 of a high level may be input.

The third transistor T13 may be turned on by the next first output signal OUT1[k+1] of a low level, the first voltage VGH may be transmitted to the first node Q1, and the first node voltage VQ1 may be changed from a low level to a high level. Due to the turned-on sixth transistors T16-1 and T16-2, the first sub-node voltage VQ21 and the second sub-node voltage VQ22 may be changed from a low level to a high level similar to the first node voltage VQ1.

The fourth transistor T14 with the gate connected to the first node Q1 may be turned on, the second voltage VGL1 may be transmitted to the third node QB, and the third node voltage VQB may be changed from a high level to a low level. The eighth transistor T18-1 with the gate connected to the third node QB may be turned on, and the first voltage VGH of a high level may be transmitted to the first output terminal GOUT1. Accordingly, the first output signal OUT1[k] of a high level may be output. Likewise, the eighth transistor T18-2 with the gate connected to the third node QB may be turned on, and the first voltage VGH of a high level may be transmitted to the second output terminal GOUT2. Accordingly, the second output signal OUT2[k] of a high level may be output from the second output terminal GOUT2.

FIGS. 15 to 18 are circuit diagrams illustrating an example of a stage included in a gate driving unit of FIG. 9. Hereinafter, a difference from the stage of FIG. 12 will be mainly described.

A $k^{th}$ stage STK of FIG. 15 is different from the $k^{th}$ stage STK of FIG. 12 in that the fifth transistor T15 is omitted and a hold capacitor Ch is added, and other configurations and operations are the same as those of the $k^{th}$ stage STK of FIG. 12.

The hold capacitor Ch may be connected between the first voltage input terminal V1 and the third node QB. Voltages of the third node QB and the first node Q1 may be stabilized by the hold capacitor Ch. In another embodiment, as shown in FIG. 16, in a $k^{th}$ stage STK, both the fifth transistor T15 and the hold capacitor Ch may be omitted.

A $k^{th}$ stage STK of FIG. 17 is different from the $k^{th}$ stage STK of FIG. 12 in that the fifth transistor T15 is omitted and a ninth transistor T19 of a P-channel is added, and other configurations and operations are the same as those of the $k^{th}$ stage STK of FIG. 12.

The ninth transistor T19 may be connected between the first voltage input terminal V1 and the first node Q1. A gate of the ninth transistor T19 may be connected to the third node QB. The ninth transistor T19 may be turned on when a voltage of the third node QB is at a low level, and the first voltage VGH may be transmitted to the first node Q1. Accordingly, when a first output signal and a second output signal are maintained at a high level for a long time, voltage drop and stage malfunction of the first node Q1 due to leakage current of the second transistor T12 may be prevented (minimized).

A $k^{th}$ stage STK of FIG. 18 is different from the $k^{th}$ stage STK of FIG. 12 in that the fifth transistor T15 is omitted and a reset transistor Trs of a P-channel is added, and other configurations and operations are the same as those of the $k^{th}$ stage STK of FIG. 12.

The reset transistor Trs may be connected between the first voltage input terminal V1 and the first node Q1. A gate of the reset transistor Trs may be connected to a reset terminal to which a reset signal RS is input. The reset signal RS may be input in the form of a pulse having a low level at a certain timing, and may be input as a high-level voltage at other times. In an embodiment, for example, when an operation error occurs in a device and thus a forced reset of the driving circuit DRV is required, the reset signal RS of a low level may be input to the reset terminal. The reset transistor Trs may be turned on when the reset signal RS is at a low level, and may transmit the first voltage VGH to the first node Q1. The reset transistor Trs may forcibly reset (initiate) the first node Q1 to a high level based on the reset signal RS of a low level.

FIGS. 19 to 22 are circuit diagrams illustrating an example of a stage included in the driving circuit of FIG. 4. FIG. 23 is a timing diagram for describing an operation of the stage of FIGS. 19 to 22. A difference from a configuration and an operation of the stage of FIG. 6 will be mainly described based on FIGS. 4 and 5.

Figure 19:
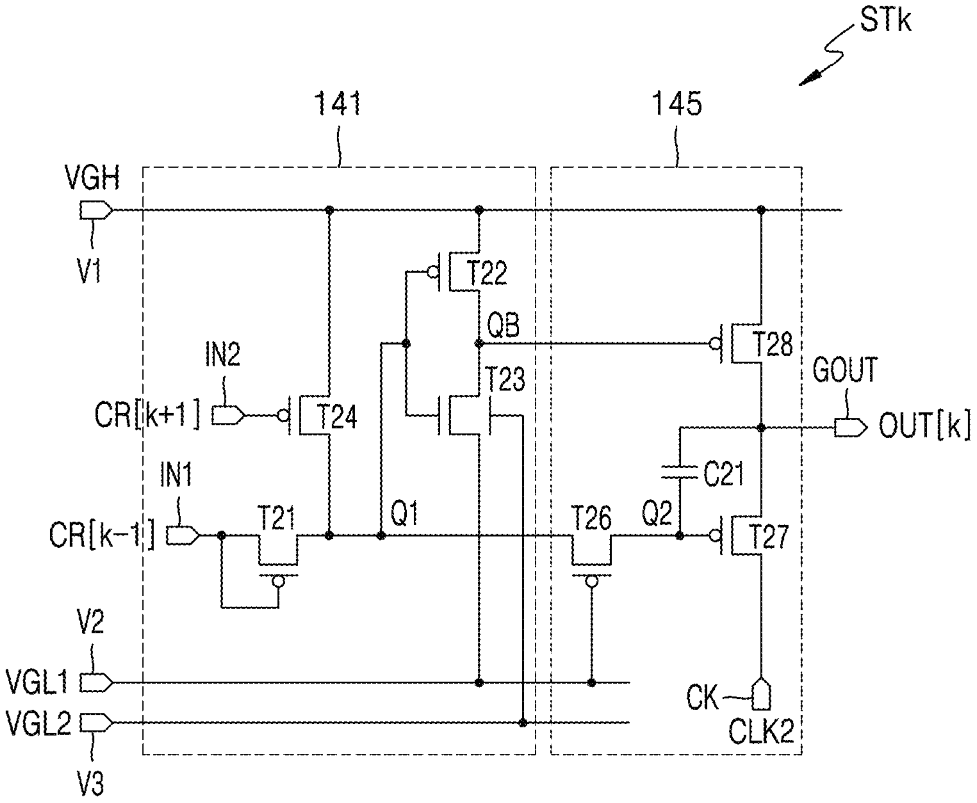
FIGS. 19 to 22 are circuit diagrams illustrating an example of a stage included in the driving circuit of FIG. 4.

Referring to FIG. 19, each of a plurality of stages (e.g., stages ST1 to STn) may include a first input terminal IN1, a second input terminal IN2, a first voltage input terminal V1, a second voltage input terminal V2, a third voltage input terminal V3, a clock terminal CK, and an output terminal GOUT.

A start signal may be input to the first input terminal IN1. The start signal may be an external signal STV or a previous carry signal. A next carry signal output from a next stage may be input to the second input terminal IN2. In an embodiment, for example, a k−$1^{th}$ carry signal CR[k−1] output from a k−$1^{th}$ stage STk−1 may be input as a start signal to the first input terminal IN1 of a $k^{th}$ stage STK. A k+$1^{th}$ carry signal CR[k+1] output from a k+$1^{th}$ stage may be input to the second input terminal IN2 of the $k^{th}$ stage STK.

A first voltage VGH may be input to the first voltage input terminal V1, a second voltage VGL1 may be input to the second voltage input terminal V2, and a third voltage VGL2 may be input to the third voltage input terminal V3.

As shown in FIG. 4, a first clock signal CLK1 may be input to the clock terminal CK of an odd-numbered stage, and a second clock signal CLK2 may be input to a clock terminal CK of an even-numbered stage. In another embodiment, the second clock signal CLK2 may be input to the clock terminal CK of an odd-numbered stage, and the first clock signal CLK1 may be input to the clock terminal CK of an even-numbered stage. FIGS. 19 to 22 illustrate an example where the second clock signal CLK2 is input to the clock terminal CK of the $k^{th}$ stage STK that is an even-numbered stage.

A gate signal of a low level may be output as an output signal in synchronization with a low-level voltage output timing of the first clock signal CLK1 from the output terminal GOUT of an odd-numbered stage. A gate signal of a low level may be output as an output signal in synchronization with a low-level voltage output timing of the second clock signal CLK2 from the output terminal GOUT of an even-numbered stage.

Referring to FIG. 19, the $k^{th}$ stage STK may include a control circuit 141 and an output circuit 145. Each of the control circuit 141 and the output circuit 145 may include at least one transistor.

The control circuit 141 may control voltages of a first node Q1 and a third node QB in response to signals input to the first input terminal IN1 and the second input terminal IN2. In an embodiment, for example, the control circuit 141 may control voltages of the first node Q1 and the third node QB in response to the previous carry signal CR[k−1] and the next carry signal CR[k+1]. The control circuit 141 may include first to fourth transistors T21 to T24. Each of the first transistor T21, the second transistor T22, and the fourth transistor T24 may be a P-channel transistor, and the third transistor T23 may be an N-channel transistor.

The first transistor T21 may be connected between the first input terminal IN1 and the first node Q1. A gate of the first transistor T21 may be connected to the first input terminal IN1. The first transistor T21 may be a diode-connected transistor with the gate connected to one terminal. Because the first transistor T21 is implemented as a diode-connected transistor and thus a transistor controlled by a clock signal is not provided in the control circuit, power consumption of the driving circuit DRV may be effectively minimized.

The first transistor T21 may be turned on when the previous carry signal CR[k−1] of a low level is input, and may transmit the previous carry signal CR[k−1] of a low level to the first node Q1. In an embodiment, the previous carry signal CR[k−1] may be an output signal OUT[k−1] (a previous output signal) output from the k−$1^{th}$ stage STk−1.

The second transistor T22 may be connected between the first voltage input terminal V1 and the third node QB. A gate of the second transistor T22 may be connected to the first node Q1. The second transistor T22 may be turned on when a voltage of the first node Q1 is at a low level, and may transmit the first voltage VGH to the third node QB.

The third transistor T23 may be connected between the third node QB and the second voltage input terminal V2. A gate of the third transistor T23 may be connected to the first node Q1. The third transistor T23 may be turned on when a voltage of the first node Q1 is at a high level, and may transmit the second voltage VGL1 to the third node QB.

The third transistor T23 may further include a back gate connected to the third voltage input terminal V3. The third transistor T23 may be a dual gate transistor including a gate (a first gate or a top gate) located over a semiconductor layer and a back gate (a second gate or a bottom gate) located under the semiconductor layer. As the third voltage VGL2 of a low level is input to the back gate of the third transistor T23 that is an oxide transistor, a threshold voltage of the third transistor T23 may be positively shifted, thereby minimizing leakage current.

Figure 21:
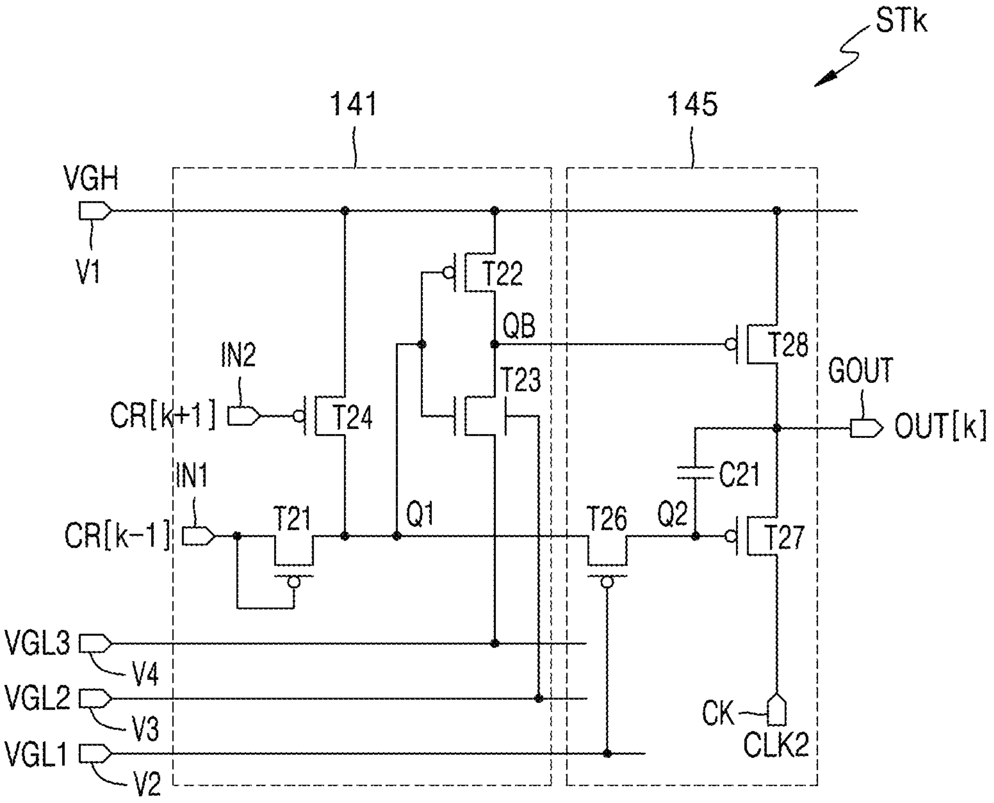
Figure 22:
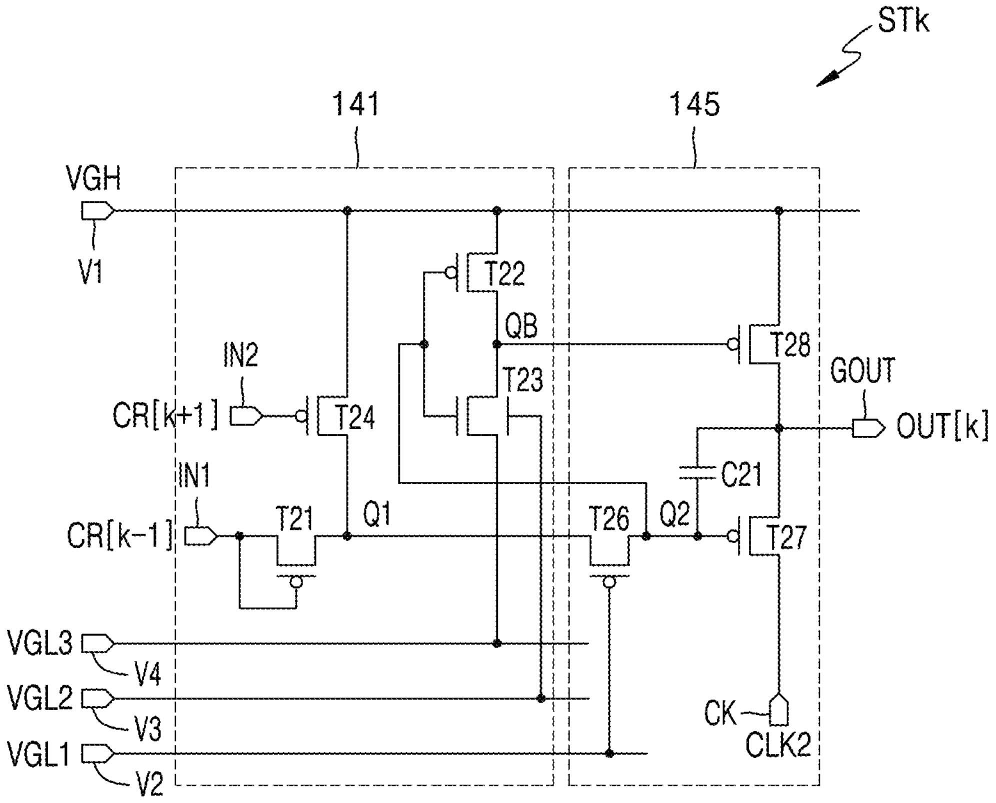
Figure 23:
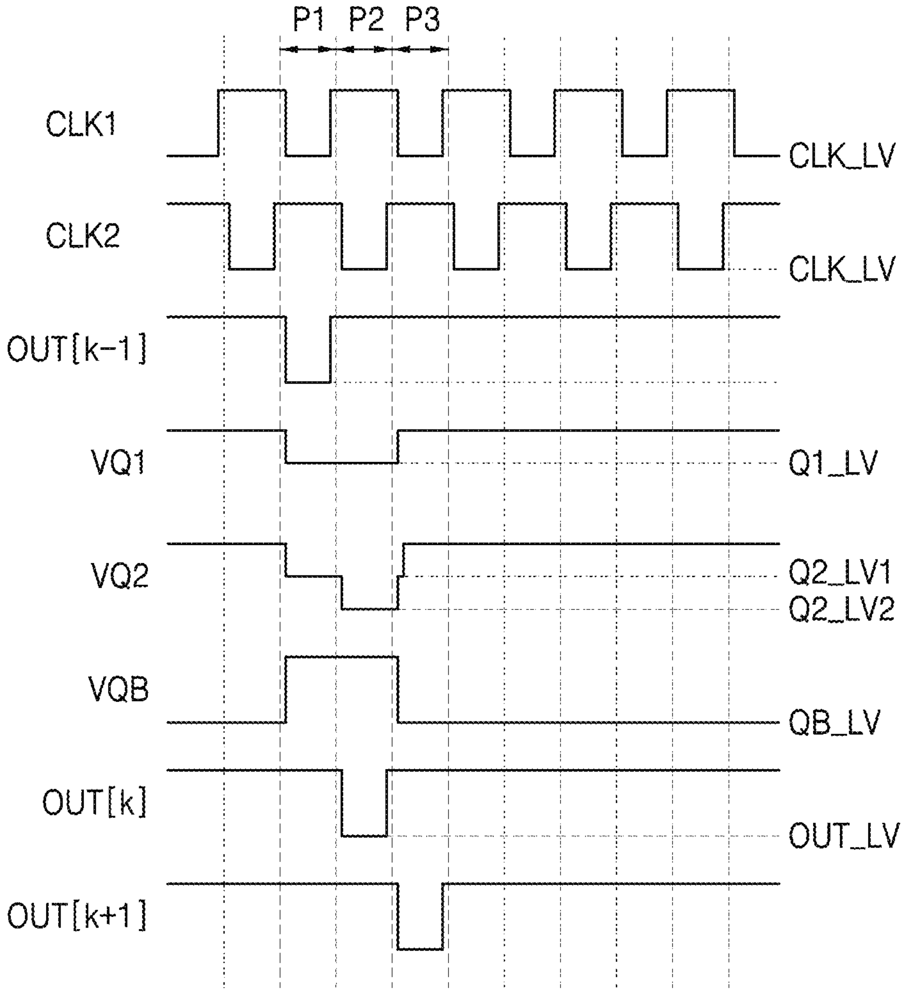
FIG. 23 is a timing diagram for describing an operation of the stage of FIGS. 19 to 22.

In another embodiment, as shown in FIGS. 21 and 22, the third transistor T23 may be connected between the third node QB and the fourth voltage input terminal V4. A gate of the third transistor T23 may be connected to the first node Q1. The third transistor T23 may be turned on when a voltage of the first node Q1 is at a high level, and may transmit the fourth voltage VGL3 to the third node QB. The fourth voltage VGL3 may be a low-level voltage higher than the second voltage VGL1. A gate-source voltage of the third transistor T23 may be reduced by connecting the third transistor T23 to the fourth voltage input terminal V4. Accordingly, in a first section P1 of FIG. 23, even when a low-level voltage Q1_LV of a first node voltage VQ1 is higher than the second voltage VGL1, a turned-off state of the third transistor T23 may be maintained, thereby stably maintaining a third node voltage VQB at a high level.

Figure 20:
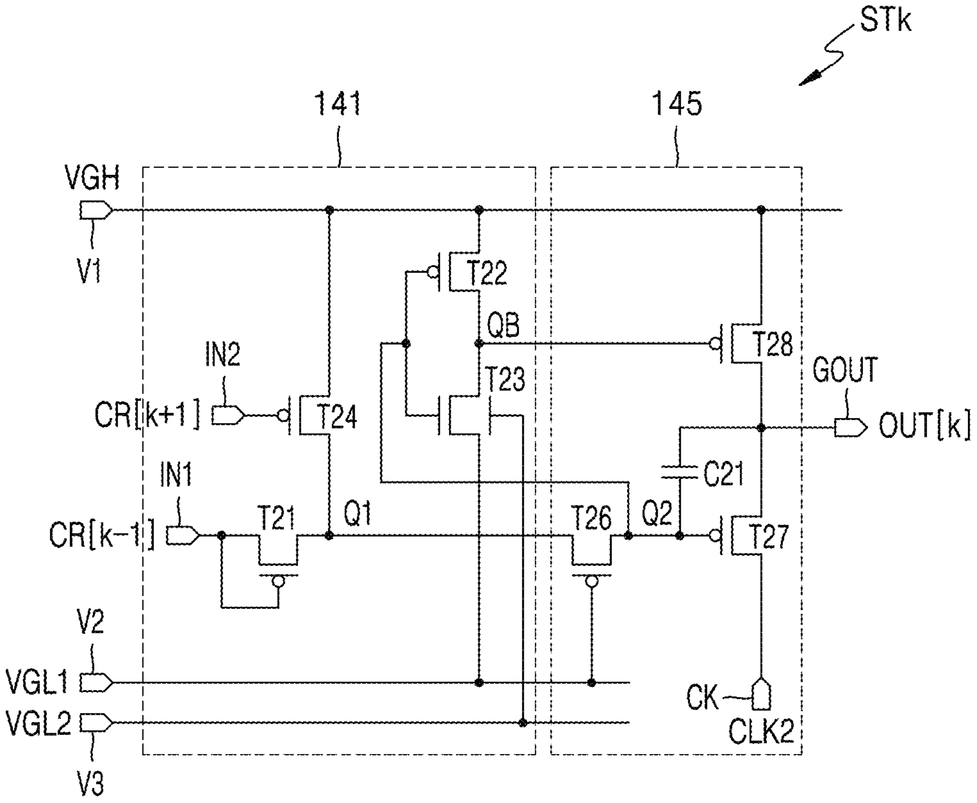

In another embodiment, as shown in FIGS. 20 and 22, the gate of the second transistor T22 and the gate of the third transistor T23 may be connected to a second node Q2. The second transistor T22 may be turned on when a voltage of the second node Q2 is at a low level, and may transmit the first voltage VGH to the third node QB. The third transistor T23 may be turned on when a voltage of the second node Q2 is at a high level, and may transmit the second voltage VGL1 to the third node QB.

The second transistor T22 and the third transistor T23 may control a voltage level of the third node QB according to a voltage level of the second node Q2 or the first node Q1, and thus, may function as an inverter or a level shifter.

The fourth transistor T24 may be connected between the first voltage input terminal V1 and the first node Q1. A gate of the fourth transistor T24 may be connected to the second input terminal IN2. The fourth transistor T24 may be turned on when the next carry signal CR[k+1] of a low level is input, and may transmit the first voltage VGH to the first node Q1. The next carry signal CR[k+1] may be an output signal OUT[k+1] (a next output signal) output from the $k+1^{th}$ stage STk+1.

The output circuit 145 may be connected between the first voltage input terminal V1 and the clock terminal CK and may output a high-level voltage and a low-level voltage according to voltages of the first node Q1 and the third node QB. The output circuit 145 may include a sixth transistor T26, a seventh transistor T27, and an eighth transistor T28. The output circuit 145 may further include a capacitor C21.

The sixth transistor T26 may be connected between the first node Q1 and the second node Q2. A gate of the sixth transistor T26 may be connected to the second voltage input terminal V2. The sixth transistor T26 may always be in a turned-on state due to the second voltage VGL1. In another embodiment, a gate of the sixth transistor T26 may be connected to the third voltage input terminal V3. In another embodiment, when the second voltage VGL1 is a very low-level voltage, the sixth transistor T26 may be omitted.

The seventh transistor T27 may be connected between the output terminal GOUT and the clock terminal CK. A gate of the seventh transistor T27 may be connected to the second node Q2. The seventh transistor T27 may be turned on when a voltage of the second node Q2 is at a low level, and may transmit the second clock signal CLK2 input to the clock terminal CK to the output terminal GOUT. The seventh transistor T27 may be a pull-down transistor that transmits a low-level voltage to the output terminal GOUT.

The eighth transistor T28 may be connected between the first voltage input terminal V1 and the output terminal GOUT. A gate of the eighth transistor T28 may be connected to the third node QB. The eighth transistor T28 may be turned on when a voltage of the third node QB is at a low level, and may transmit the first voltage VGH input to the first voltage input terminal V1 to the output terminal GOUT. The eighth transistor T28 may be a pull-up transistor that transmits a high-level voltage to the output terminal GOUT.

The capacitor C21 may be connected between the output terminal GOUT and the second node Q2. The capacitor C21 may be omitted.

An operation of the $k^{th}$ stage STK of FIGS. 19 to 22 will be described with reference to FIG. 23.

A low-level voltage OUT_LV of an output signal may be about a low-level voltage CLK_LV of a clock signal. The low-level voltage Q1_LV of the first node voltage VQ1 may be lower than the low-level voltage OUT_LV of the output signal. A first low-level voltage Q2_LV1 of a second node voltage VQ2 may be about the low-level voltage Q1_LV of the first node voltage VQ1. A second low-level voltage Q2_LV2 of the second node voltage VQ2 may be lower than the low-level voltage Q1_LV of the first node voltage VQ1. A low-level voltage QB_LV of a third node voltage VQB may be about the low-level voltage CLK_LV of the clock signal.

In a first section P1, the previous output signal OUT[k−1] of a low level may be input to the first input terminal IN1, the next output signal OUT[k+1] of a high level may be input to the second input terminal IN2, and the second clock signal CLK2 of a high level may be input to the clock terminal CK.

The first transistor T21 may be turned on by the previous output signal OUT[k−1] of a low level, and the previous output signal OUT[k−1] of a low level may be transmitted to the first node Q1. Due to the turned-on sixth transistor T26, the second node voltage VQ2 may be a low-level voltage, similar to the first node voltage VQ1. The second transistor T22 with the gate connected to the first node Q1 or the second node Q2 may be turned on, the first voltage VGH may be transmitted to the third node QB, and the third node voltage VQB may be a high-level voltage.

The seventh transistor T27 with the gate connected to the second node Q2 may be turned on, and the second clock signal CLK2 of a high level may be transmitted to the output terminal GOUT. Accordingly, an output signal OUT[k] of a high level may be output from the output terminal GOUT. A voltage difference between the output terminal GOUT and the second node Q2 may be stored in the capacitor C21.

In a second section P2, the previous output signal OUT [k−1] may be changed from a low level to a high level, the next output signal OUT[k+1] of a high level may be input, and the second clock signal CLK2 of a low level may be input.

The first transistor T21 may be turned off by the previous output signal OUT[k−1] of a high level, and voltages of the first node Q1 and the second node Q2 may be maintained at a low level by the capacitor C21. Due to the turned-on seventh transistor T27, the second clock signal CLK2 of a low level may be transmitted to the output terminal GOUT, and the output signal OUT[k] of a low level may be output from the output terminal GOUT. In this case, as a voltage of the output terminal GOUT falls from a high level to a low level, the second node voltage VQ2 may fall to a voltage level lower than a voltage level in the first section P1 due to coupling of the capacitor C21.

In a third section P3, the previous output signal OUT[k−1] of a high level may be input, the next output signal OUT [k+1] may be changed from a high level to a low level, and the second clock signal CLK2 of a high level may be input.

The fourth transistor T24 may be turned on by the next output signal OUT[k+1] of a low level, the first voltage VGH may be transmitted to the first node Q1, and the first node voltage VQ1 may be changed from a low level to a high level. Due to the turned-on sixth transistor T26, the second node voltage VQ2 may be changed from a low level to a high level similar to the first node voltage VQ1. The seventh transistor T27 with the gate connected to the second node Q2 may be turned off.

As shown in FIGS. 19 and 20, the third transistor T23 with the gate connected to the first node Q1 or the second node Q2 may be turned on, the second voltage VGL1 may be transmitted to the third node QB, and the third node voltage VQB may be changed from a high level to a low level. Alternatively, as shown in FIGS. 21 and 22, the third transistor T23 with the gate connected to the first node Q1 or the second node Q2 may be turned on, the fourth voltage VGL3 may be transmitted to the third node QB, and the third node voltage VQB may be changed from a high level to a low level.

The eighth transistor T28 with the gate connected to the third node QB may be turned on, and the first voltage VGH of a high level may be transmitted to the output terminal GOUT. Accordingly, the output signal OUT[k] of a high level may be output from the output terminal GOUT.

Figure 24:
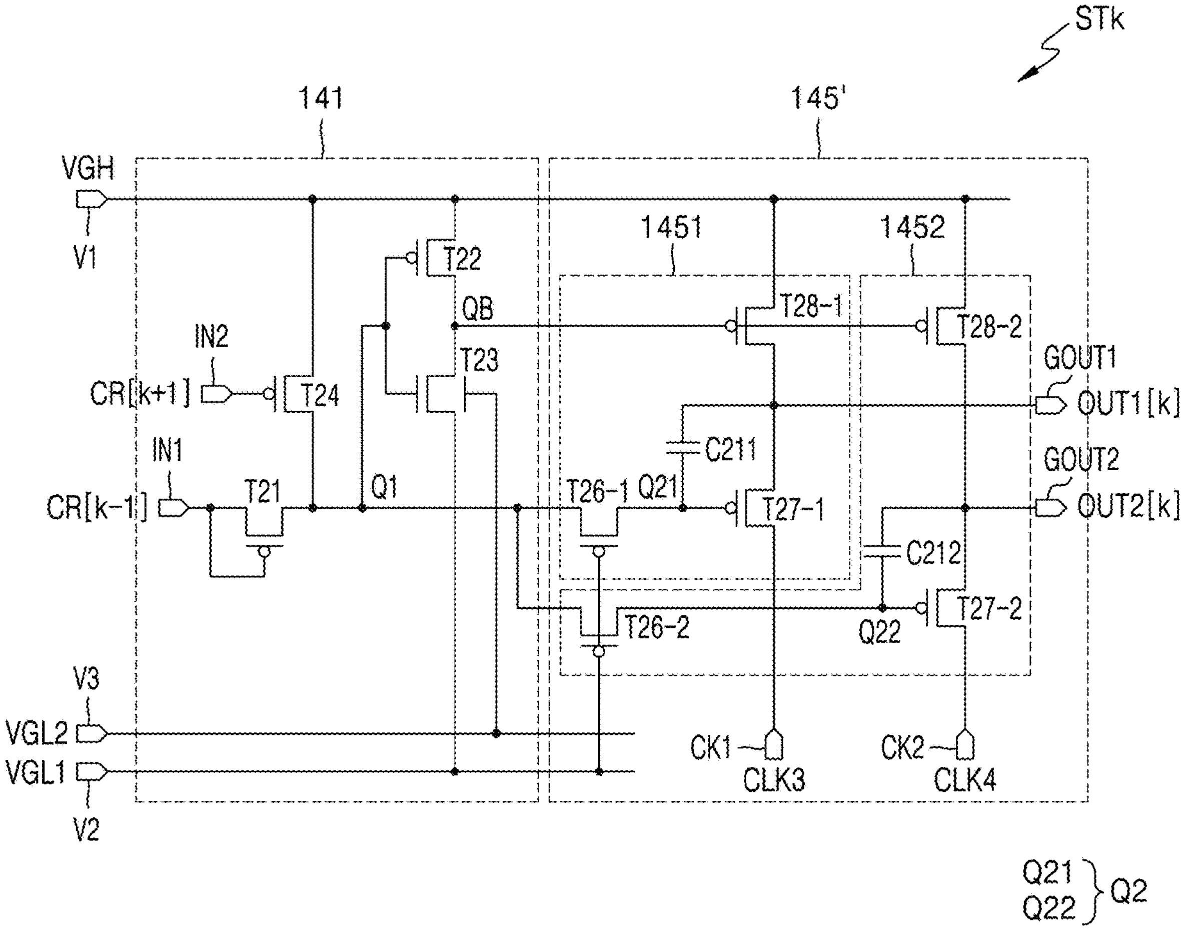
FIGS. 24 and 25 are circuit diagrams illustrating an example of a stage included in the driving circuit of FIG. 9.
Figure 25:
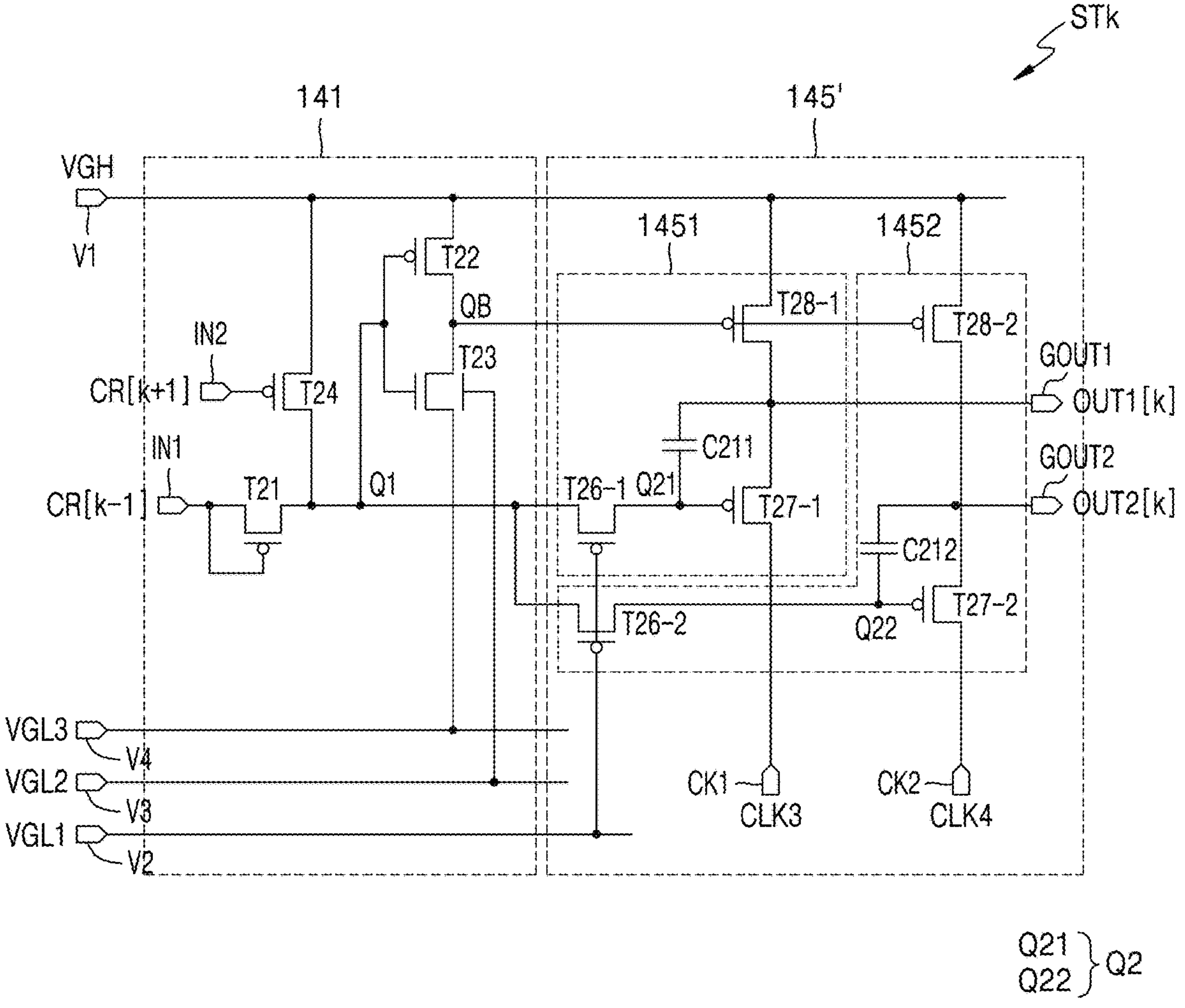
Figure 26:
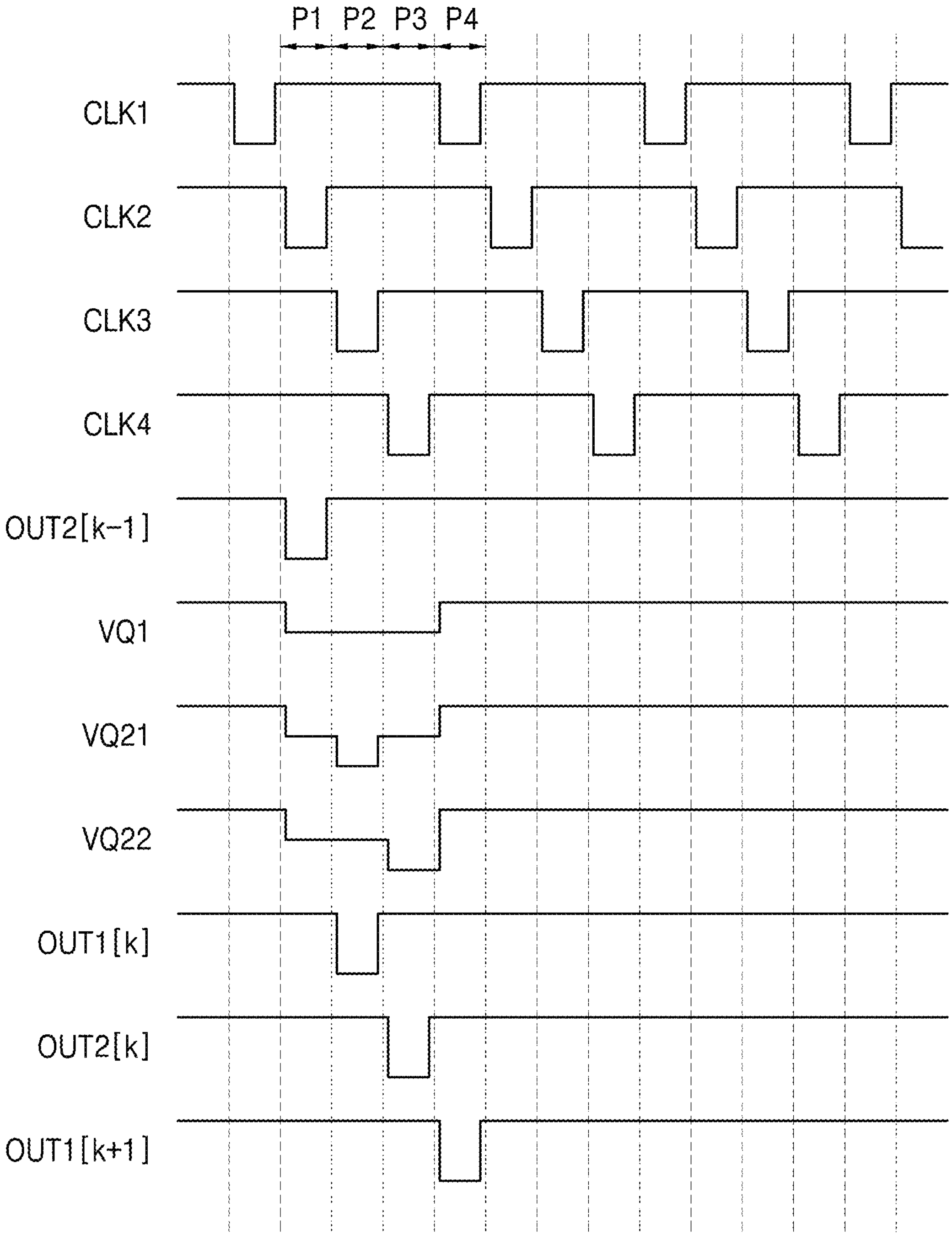
FIG. 26 is a timing diagram for describing an operation of the stage of FIGS. 24 and 25.

FIGS. 24 and 25 are circuit diagrams illustrating an example of a stage included in the driving circuit of FIG. 9. FIG. 26 is a timing diagram for describing an operation of the stage of FIGS. 24 and 25. A difference from a configuration and an operation of the stage of FIG. 19 will be mainly described based on FIGS. 9 to 11.

Referring to FIGS. 9 and 10, each of a plurality of stages (e.g., stages ST1 to STn) may include a first input terminal IN1, a second input terminal IN2, a first voltage input terminal V1, a second voltage input terminal V2, a third voltage input terminal V3, a first clock terminal CK1, a second clock terminal CK2, a first output terminal GOUT1, and a second output terminal GOUT2.

A start signal may be input to the first input terminal IN1. The start signal may be an external signal STV or a previous carry signal. A next carry signal output from a next stage may be input to the second input terminal IN2. In an embodiment, for example, as shown in FIGS. 24 and 25, a k−1$^{th}$ carry signal CR[k−1] output from a k−1$^{th}$ stage STk−1 may be input as a start signal to the first input terminal IN1 of a k$^{th}$ stage STK. A k+1$^{th}$ carry signal CR[k+1] output from a k+1$^{th}$ stage may be input to the second input terminal IN2 of the k$^{th}$ stage STK.

The previous carry signal CR[k−1] may be a first output signal OUT1[$k$−1] (a previous first output signal) or a second output signal OUT2[$k$−1] (a previous second output signal) output from the k−1$^{th}$ stage STk−1. A next carry signal CR[k+1] may be a second output signal OUT2[$k$+1] (a next second output signal) or a first output signal OUT1 [$k$+1] (a next first output signal) output from the k+1$^{th}$ stage STk+1.

A first voltage VGH may be input to the first voltage input terminal V1, a second voltage VGL1 may be input to the second voltage input terminal V2, and a third voltage VGL2 may be input to the third voltage input terminal V3. In an embodiment, as shown in FIG. 25, a fourth voltage input terminal V4 may be added to each of the plurality of stages (e.g., stages ST1 to STn), and a fourth voltage VGL3 may be input to the fourth voltage input terminal V4.

Two of first to fourth clock signals CLK1 to CLK4 may be input to the first clock terminal CK1 and the second clock terminal CK2. In an embodiment, for example, as shown in FIG. 9, the first clock signal CLK1 and the second clock signal CLK2 may be input to the first clock terminal CK1 and the second clock terminal CK2 of an odd-numbered stage, and the third clock signal CLK3 and the fourth clock signal CLK4 may be input to the first clock terminal CK1 and the second clock terminal CK2 of an even-numbered stage. FIGS. 24 and 25 illustrate that the third clock signal CLK3 and the fourth clock signal CLK4 are input to the first clock terminal CK1 and the second clock terminal CK2 of the k$^{th}$ stage STK that is an even-numbered stage, respectively.

An output terminal may include the first output terminal GOUT1 and the second output terminal GOUT2. FIGS. 24 and 25 illustrate an example where a 2k−1$^{th}$ gate signal GS[2$k$−1] is output as a first output signal OUT1[$k$] from the first output terminal GOUT1, and a 2k$^{th}$ gate signal GS[2$k$] may be output as a second output signal OUT2[$k$] from the second output terminal GOUT2.

Referring to FIGS. 24 and 25, the k$^{th}$ stage STK may include a control circuit 141 and an output circuit 145'. Each of the control circuit 141 and the output circuit 145' may include at least one transistor.

The control circuit 141 may control voltages of a first node Q1 and a third node QB in response to signals input to the first input terminal IN1 and the second input terminal IN2. The control circuit 141 of FIGS. 24 and 25 is the same as the control circuit 141 of FIGS. 19 and 21, and thus, a detailed description thereof will be omitted.

In FIGS. 24 and 25, gates of a second transistor T22 and a third transistor T23 are connected to the first node Q1. In another embodiment, gates of the second transistor T22 and the third transistor T23 may be connected to a first sub-node Q21 or a second sub-node Q22.

The output circuit 145' may be connected between the first voltage input terminal V1 and a clock terminal and may output a high-level voltage or a low-level voltage according to voltages of the first node Q1 and the third node QB. A second node Q2 may include a plurality of sub-nodes. The second node Q2 may include the first sub-node Q21 and the second sub-node Q22.

The output circuit 145' may include a plurality of sub-output circuits that are connected in parallel. The output circuit 145' may have a structure in which a plurality of output circuits 145 of FIG. 19 are connected in parallel. The sub-output circuits may include a first sub-output circuit 1451 and a second sub-output circuit 1452. Each of the first sub-output circuit 1451 and the second sub-output circuit 1452 may be the same as the output circuit 145 of FIG. 19.

The first sub-output circuit 1451 may include a sixth transistor T26-1, a seventh transistor T27-1, and an eighth transistor T28-1. The first sub-output circuit 1451 may further include a capacitor C211. The capacitor C211 may be omitted.

The second sub-output circuit 1452 may include a sixth transistor T26-2, a seventh transistor T27-2, and an eighth transistor T28-2. The second sub-output circuit 1452 may further include a capacitor C212. The capacitor C212 may be omitted.

FIG. 26 is a timing diagram illustrating an example where the previous carry signal CR[k−1] is the previous second output signal OUT2[*k*−1] and the next carry signal CR[k+1] is the next first output signal OUT1[*k*+1].

In a first section P1, the previous second output signal OUT2[*k*−1] of a low level may be input to the first input terminal IN1, the next first output signal OUT1[*k*+1] of a high level may be input to the second input terminal IN2, the third clock signal CLK3 of a high level may be input to the first clock terminal CK1, and the fourth clock signal CLK4 of a high level may be input to the second clock terminal CK2.

The first transistor T21 may be turned on by the previous output signal OUT[k−1] of a low level, and the previous output signal OUT[k−1] of a low level may be transmitted to the first node Q1. Due to the turned-on sixth transistors T26-1 and T26-2, each of a first sub-node voltage VQ21 and a second sub-node voltage VQ22 may be a low-level voltage, similar to a first node voltage VQ1. As shown in FIG. 24, the second transistor T22 with the gate connected to the first node Q1 may be turned on, the first voltage VGH may be transmitted to the third node QB, and a third node voltage VQB may be a high-level voltage.

The seventh transistor T27-1 with the gate connected to the first sub-node Q21 may be turned on, and the third clock signal CLK3 of a high level may be transmitted to the first output terminal GOUT1. Accordingly, the first output signal OUT1[*k*] of a high level may be output from the first output terminal GOUT1. A voltage difference between the first output terminal GOUT1 and the first sub-node Q21 may be stored in the capacitor C211. The seventh transistor T27-2 with the gate connected to the second sub-node Q22 may be turned on, and the fourth clock signal CLK4 of a high level may be transmitted to the second output terminal GOUT2. Accordingly, the second output signal OUT2[*k*] of a high level may be output from the second output terminal GOUT2. A voltage difference between the second output terminal GOUT2 and the second sub-node Q22 may be stored in the capacitor C212.

In a second section P2, the previous second output signal OUT2[*k*−1] may be changed from a low level to a high level, the next first output signal OUT1[*k*+1] of a high level may be input, the third clock signal CLK3 of a low level may be input, and the fourth clock signal CLK4 of a high level may be input.

The first transistor T21 may be turned off by the previous second output signal OUT2[*k*−1] of a high level, and the first node voltage VQ1, the first sub-node voltage VQ21, and the second sub-node voltage VQ22 may be maintained at a low level by the capacitors C211 and C212.

Due to the turned-on seventh transistor T27-1, the third clock signal CLK3 of a low level may be transmitted to the first output terminal GOUT1, and the first output signal OUT1[*k*] of a low level may be output from the first output terminal GOUT1. In this case, as a voltage of the first output terminal GOUT1 falls from a high level to a low level, the first sub-node voltage VQ21 may fall to a voltage level lower than a voltage level in the first section P1 due to coupling of the capacitor C211.

Due to the turned-on seventh transistor T27-2, the fourth clock signal CLK4 of a high level may be transmitted to the second output terminal GOUT2, and the second output signal OUT2[*k*] of a high level may be output from the second output terminal GOUT2.

In a third section P3, the previous second output signal OUT2[*k*−1] and the next first output signal OUT1[*k*+1] of a high level may be input, the third clock signal CLK3 of a high level may be input, and the fourth clock signal CLK4 of a low level may be input.

The first transistor T21 may be maintained in a turned-off state by the previous second output signal OUT2[*k*−1] of a high level, and the first node voltage VQ1, the first sub-node voltage VQ21, and the second sub-node voltage VQ22 may be maintained at a low level by the capacitors C211 and C212.

Due to the turned-on seventh transistor T27-1, the third clock signal CLK3 of a high level may be transmitted to the first output terminal GOUT1, and the first output signal OUT1[*k*] of a high level may be output from the first output terminal GOUT1. In this case, as a voltage of the first output terminal GOUT1 rises from a low level to a high level, the first sub-node voltage VQ21 may rise to a low level (e.g., about a voltage level in the first section P1) higher than a voltage level in the second section P2 due to coupling of the capacitor C211.

Due to the turned-on seventh transistor T27-2, the fourth clock signal CLK4 of a low level may be transmitted to the second output terminal GOUT2, and the second output signal OUT2[*k*] of a low level may be output from the second output terminal GOUT2. In this case, as a voltage of the second output terminal GOUT2 falls from a high level to a low level, the second sub-node voltage VQ22 may fall to a voltage level lower than a voltage level in the second section P2 due to coupling of the capacitor C212.

In a fourth section P4, the previous second output signal OUT2[*k*−1] of a high level may be input, the next first output signal OUT1[*k*+1] may be changed from a high level to a low level, the third clock signal CLK3 of a high level may be input, and the fourth clock signal CLK4 of a high level may be input.

A fourth transistor T24 may be turned on by the next first output signal OUT1[*k*+1] of a low level, the first voltage VGH may be transmitted to the first node Q1, and the first node voltage VQ1 may be changed from a low level to a high level. Due to the turned-on sixth transistors T26-1 and T26-2, the first sub-node voltage VQ21 and the second sub-node voltage VQ22 may be changed from a low level to a high level similar to the first node voltage VQ1.

As shown in FIG. 24, the third transistor T23 with the gate connected to the first node Q1 may be turned on, the second voltage VGL1 may be transmitted to the third node QB, and the third node voltage VQB may be changed from a high level to a low level. Alternatively, as shown in FIG. 25, the third transistor T23 with the gate connected to the first node Q1 may be turned on, the fourth voltage VGL3 may be transmitted to the third node QB, and the third node voltage VQB may be changed from a high level to a low level.

Due to the eighth transistor T28-1 with the gate connected to the third node QB, the first voltage VGH of a high level may be transmitted to the first output terminal GOUT1, and the first output signal OUT1[*k*] of a high level may be output from the first output terminal GOUT1. Due to the eighth transistor T28-2 with the gate connected to the third node QB, the first voltage VGH of a high level may be transmitted to the second output terminal GOUT2, and the second output signal OUT2[*k*] of a high level may be output from the second output terminal GOUT2.

Figure 27:
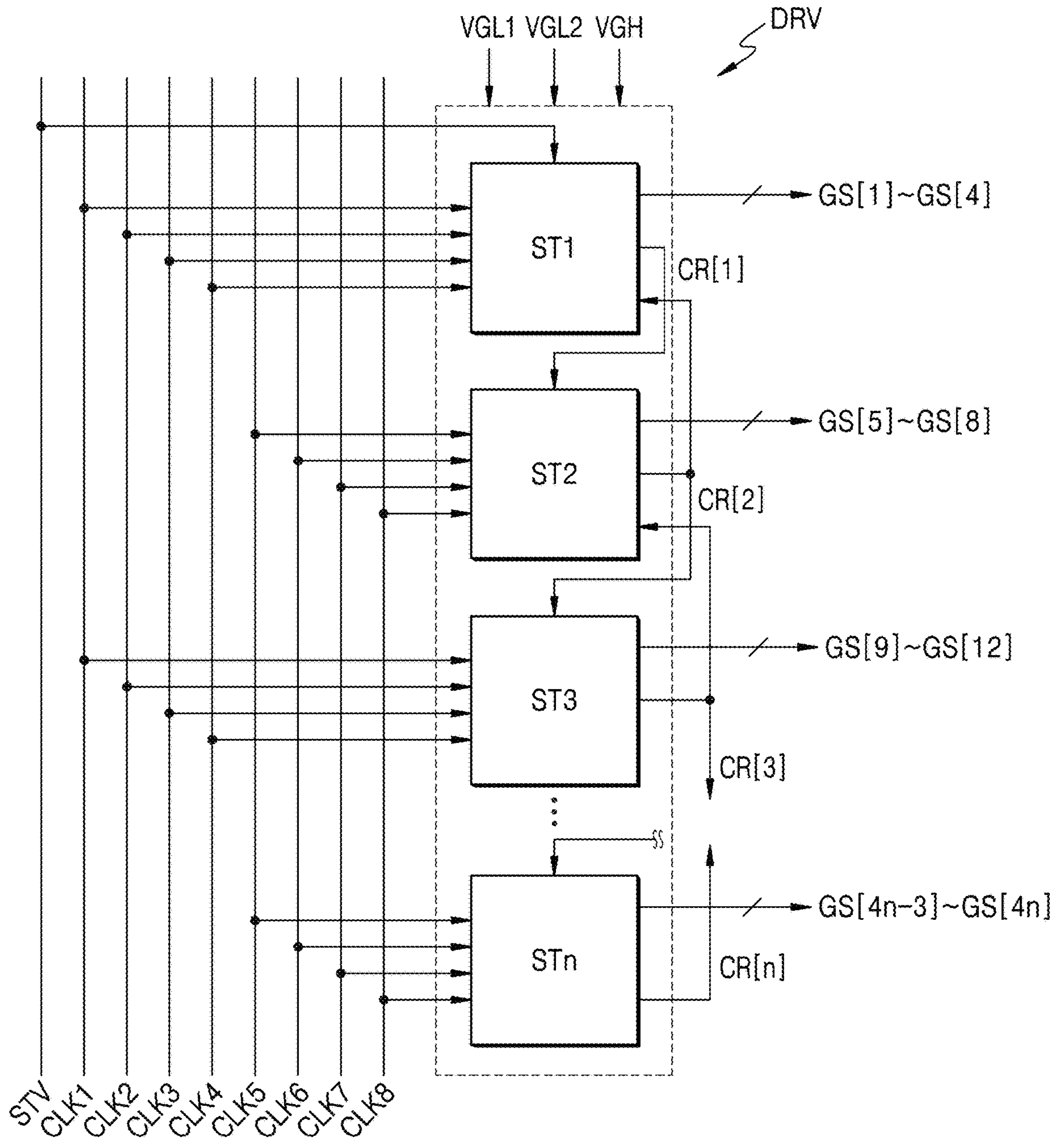
FIG. 27 is a diagram schematically illustrating a driving circuit, according to an embodiment.
Figure 28A:
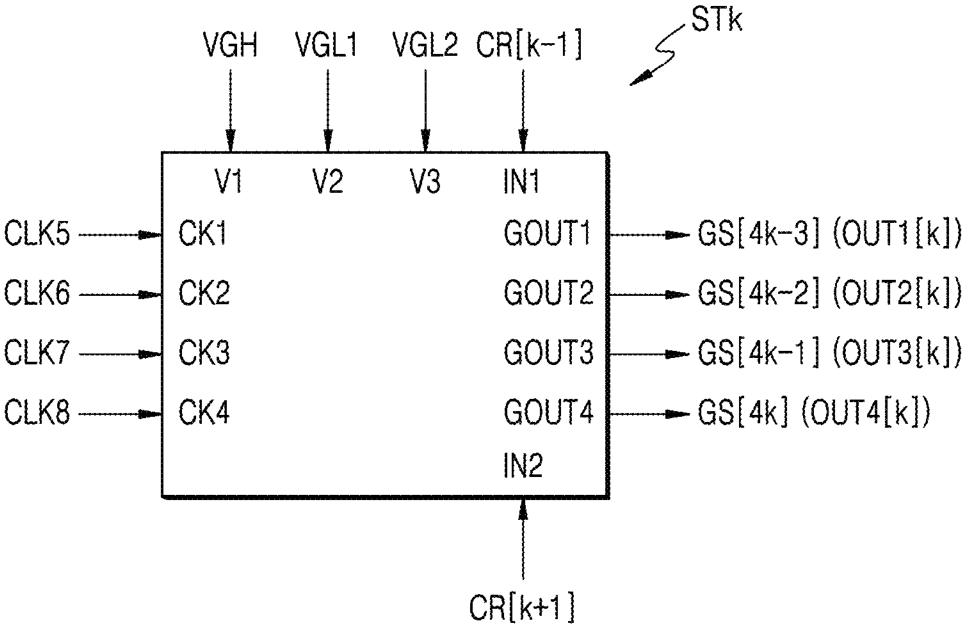
FIGS. 28A and 28B are diagrams schematically illustrating one stage of the driving circuit of FIG. 27.
Figure 28B:
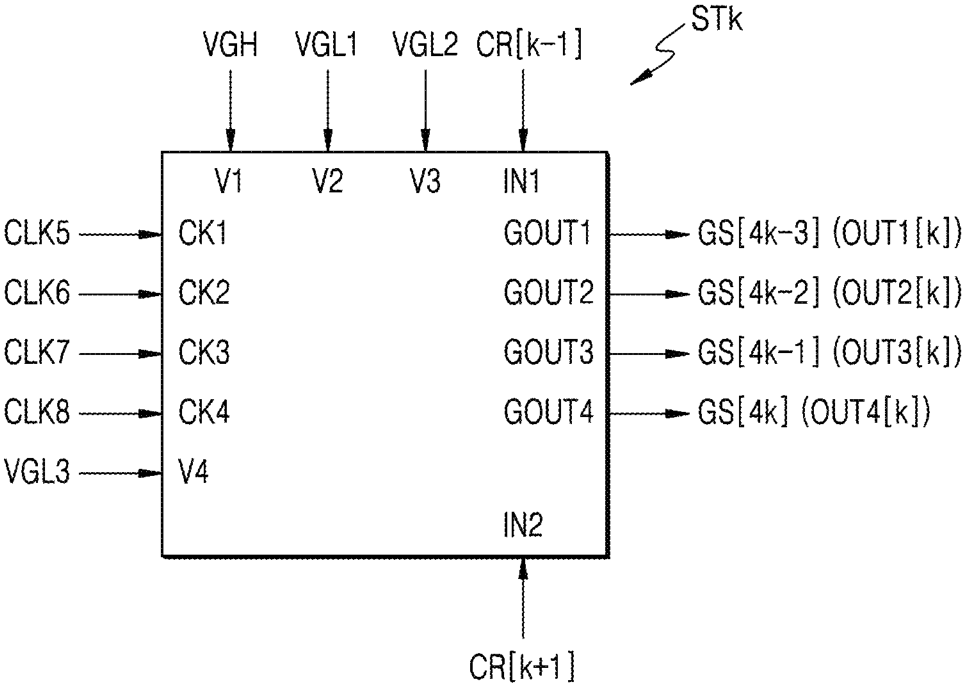
Figure 29:
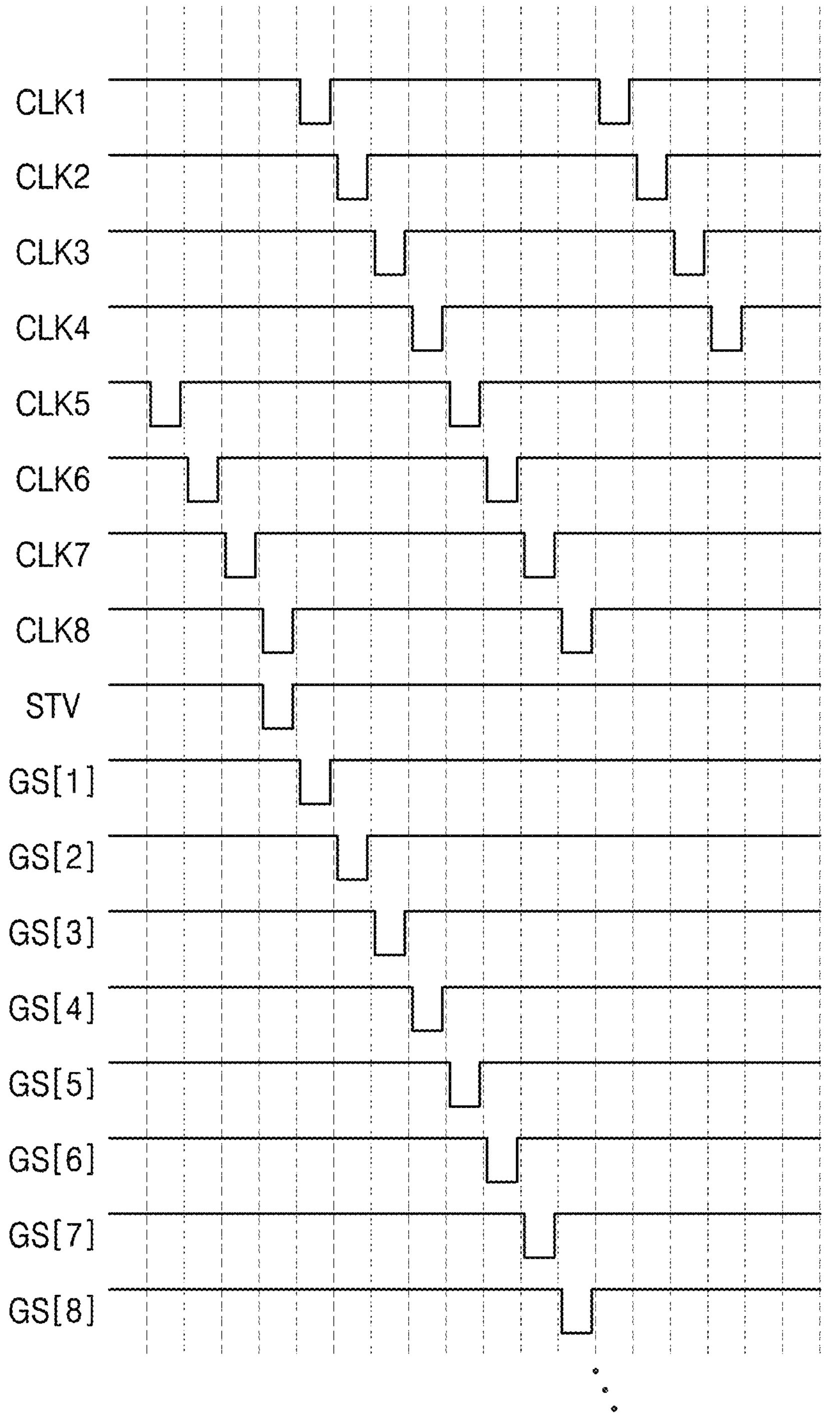
FIG. 29 is a diagram illustrating signals input to and signals output from stages of the driving circuit of FIG. 27.
Figure 30:
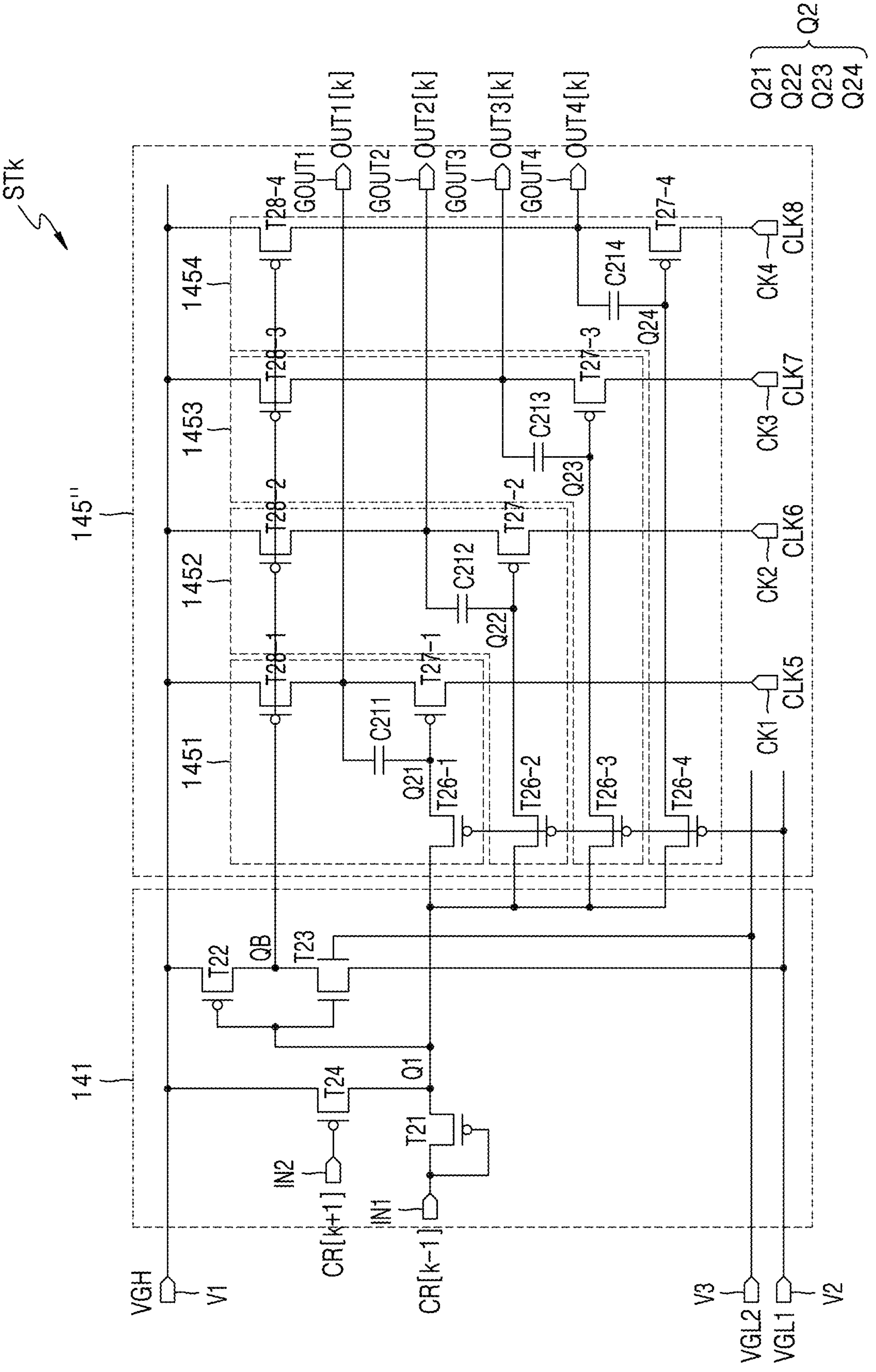
FIGS. 30 and 31 are circuit diagrams illustrating an example of a stage included in the driving circuit of FIG. 27.
Figure 31:
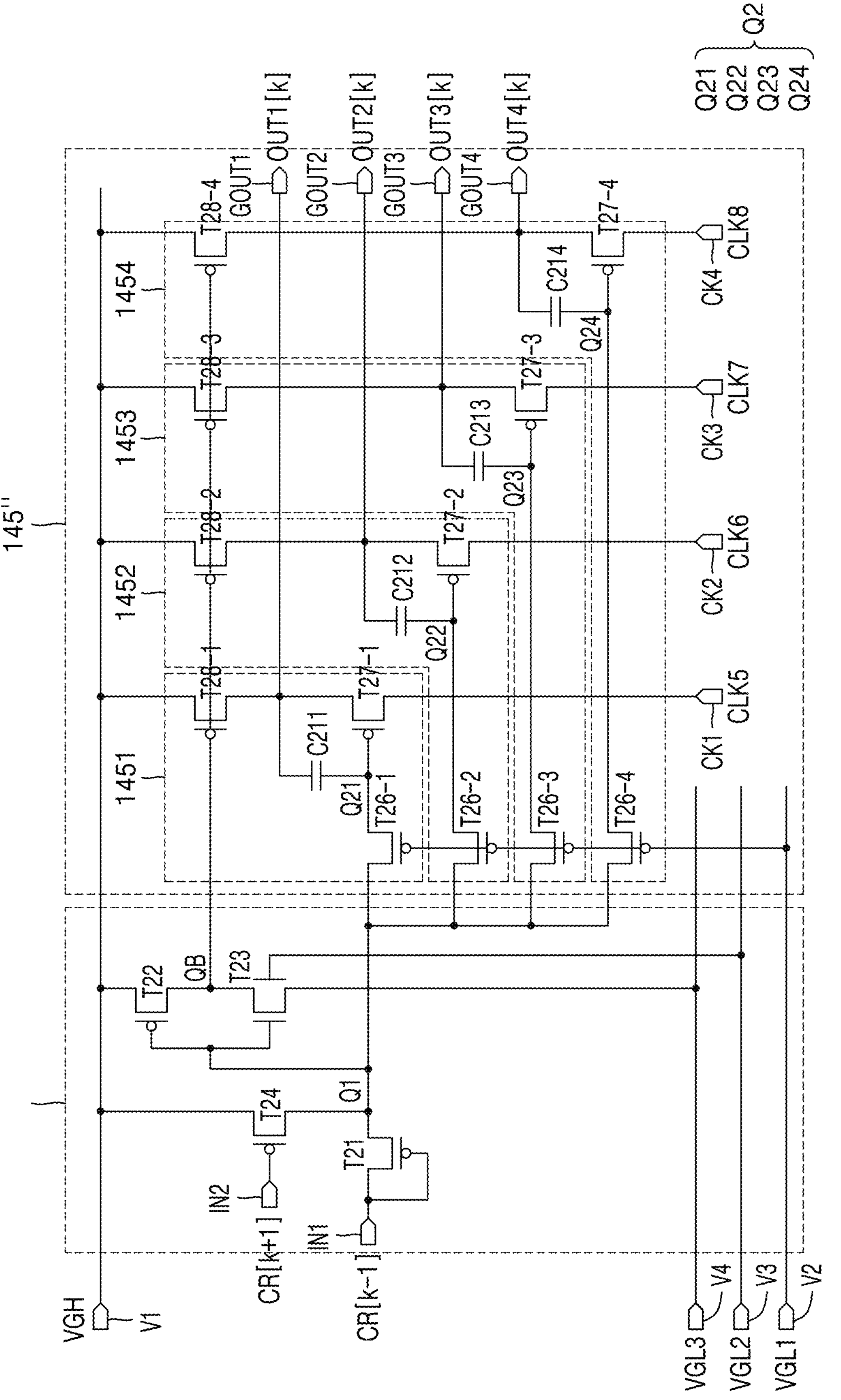
Figure 32:
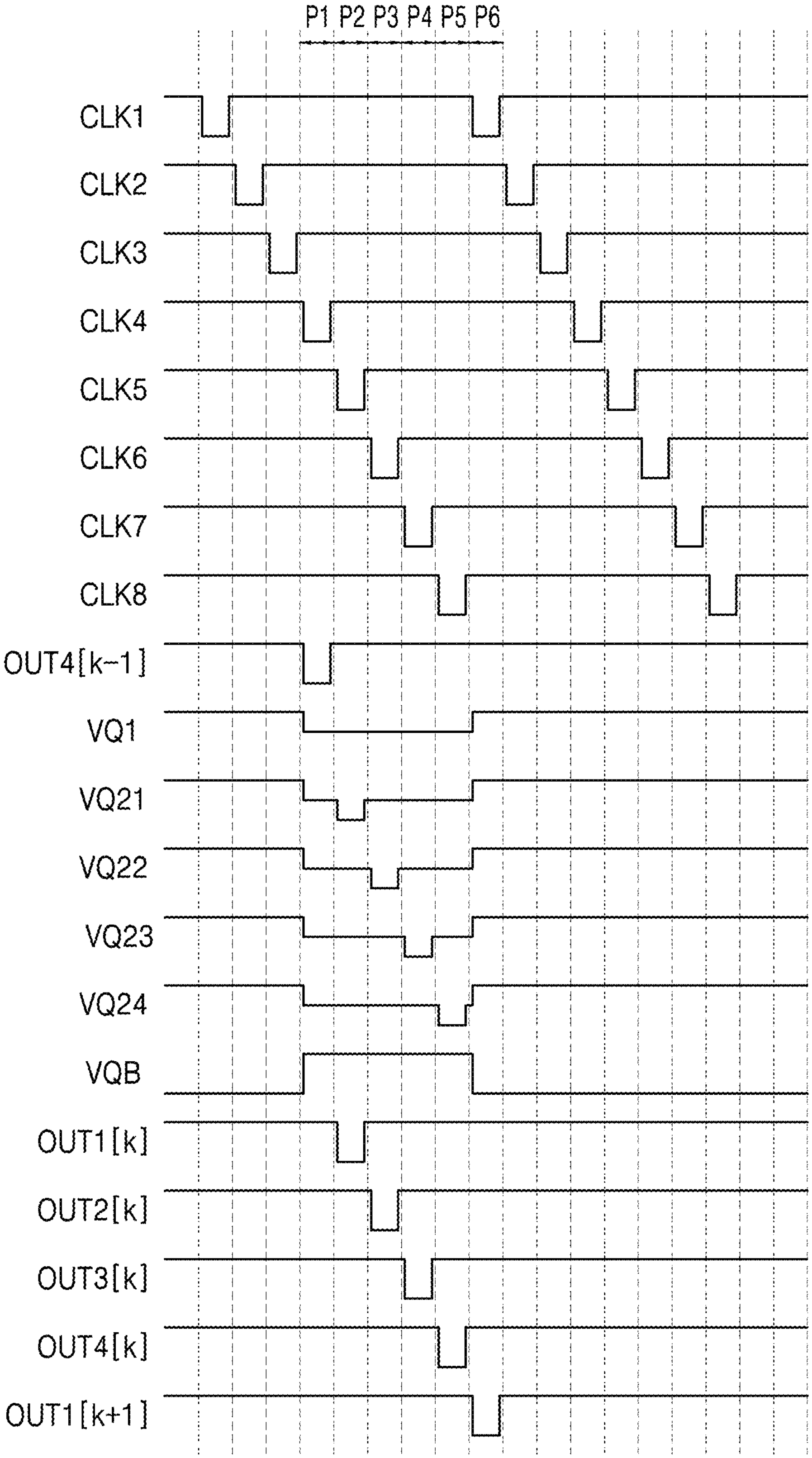
FIG. 32 is a timing diagram for describing an operation of the stage of FIGS. 30 and 31.

FIG. 27 is a diagram schematically illustrating a driving circuit, according to an embodiment. FIGS. 28A and 28B are diagrams schematically illustrating one stage of the driving circuit of FIG. 27. FIG. 29 is a diagram illustrating signals input to and signals output from stages of the driving circuit of FIG. 27. FIGS. 30 and 31 are circuit diagrams illustrating an example of a stage included in the driving circuit of FIG. 27. FIG. 32 is a timing diagram for describing an operation of the stage of FIGS. 30 and 31.

The driving circuit DRV of FIG. 27 is an embodiment in which each of a plurality of stages (e.g., stages ST1 to STn) generates four gate signals and outputs the gate signals gate lines of four corresponding rows. In this case, the number of stages may be ¼ of the number of rows provided in the pixel area 110. Each of the plurality of stages (e.g., stages ST1 to STn) may sequentially output four gate signals. A detailed description of the same configuration and operation as those in FIGS. 24 and 25 will be omitted, and a difference will be mainly described.

Referring to FIG. 28A, each of a plurality of stages (e.g., stages ST1 to STn) may include a first input terminal IN1, a second input terminal IN2, a first voltage input terminal V1, a second voltage input terminal V2, a third voltage input terminal V3, first to fourth clock terminals CK1 to CK4, and first to fourth output terminals GOUT1 to GOUT4. Referring to FIG. 28B, each of the plurality of stages (e.g., stages ST1 to STn) may further include a fourth voltage input terminal V4.

A start signal may be input to the first input terminal IN1. The start signal may be an external signal STV or a previous carry signal. A next carry signal output from a next stage may be input to the second input terminal IN2. In an embodiment, for example, a k−1$^{th}$ carry signal CR[k−1] output from a k−1$^{th}$ stage STk−1 may be input as a start signal to the first input terminal IN1 of a k$^{th}$ stage STK. A k+1$^{th}$ carry signal CR[k+1] output from a k+1$^{th}$ stage STk+1 may be input to the second input terminal IN2 of the k$^{th}$ stage STK.

The previous carry signal CR[k−1] may be a last output signal, for example, a fourth output signal OUT4[*k*−1] (a previous fourth output signal) output from the k−1$^{th}$ stage STk−1. The next carry signal CR[k+1] may be a first output signal, for example, a first output signal OUT1[*k*+1] (a next first output signal) output from the k+1$^{th}$ stage STk+1.

A first voltage VGH may be input to the first voltage input terminal V1, a second voltage VGL1 may be input to the second voltage input terminal V2, and a third voltage VGL2 may be input to the third voltage input terminal V3. A fourth voltage VGL3 may be input to the fourth voltage input terminal V4.

One of four clock signals from among first to eighth clock signals CLK1 to CLK8 may be input to a corresponding one of the first to fourth clock terminals CK1 to CK4. In an embodiment, for example, the first to fourth clock signals CLK1 to CLK4 may be input to the first to fourth clock terminals CK1 to CK4 of an odd-numbered stage. The fifth to eighth clock signals CLK5 to CLK8 may be input to the first to fourth clock terminals CK1 to CK4 of an even-numbered stage.

The first to eighth clock signals CLK1 to CLK8 may be square wave signals in which a high-level voltage and a low-level voltage are repeated. The first to eighth clock signals CLK1 to CLK8 may have the same waveform and the same cycle and may be phase-shifted (phase-delayed) signals from each other. The first to eighth clock signals CLK1 to CLK8 may be sequentially phase-shifted from each other by ⅛ cycle and then input to the driving circuit DRV. In the first to eighth clock signals CLK1 to CLK8, a duration during which a low-level voltage is maintained for one cycle may be shorter than a duration during which a high-level voltage is maintained.

FIGS. 28A and 28B illustrate that the fifth to eighth clock signals CLK5 to CLK8 are input to the first to fourth clock terminals CK1 to CK4 of the k$^{th}$ stage STK that is an even-numbered stage, respectively.

As shown in FIG. 29, gate signals GS[1], GS[2], GS[3], GS[4], . . . output from first to the fourth output terminals GOUT1 to GOUT4 of the plurality of stages (e.g., stages ST1 to STn) may be sequentially shifted from each other by a certain interval. In an embodiment, the stages ST1 to STn may shift, by ⅛ cycle of a clock signal, and sequentially output the gate signals GS[1], GS[2], GS[3], GS[4], . . . .

First to fourth output signals of a low level may be output from the first to fourth output terminals GOUT1 to GOUT4 in synchronization with a low-level voltage output timing of clock signals. In an embodiment, the plurality of stages (e.g., stages ST1 to STn) may shift, by ⅛ cycle of a clock signal and sequentially output first to fourth output signals of a low-level voltage.

FIGS. 28A and 28B illustrate that k$^{th}$ first to fourth output signals OUT1[*k*] to OUT4[*k*] are output from the first to fourth output terminals GOUT1 to GOUT4 of the k$^{th}$ stage STK that is an even-numbered stage. The k$^{th}$ stage STK may output a 4k−3$^{th}$ gate signal GS[4*k*−3] as the k$^{th}$ first output signal OUT1[*k*] to a gate line of a 4k−3$^{th}$ row, may output a 4k−2$^{th}$ gate signal GS[4*k*−2] as the k$^{th}$ second output signal OUT2[*k*] to a gate line of a 4k−2$^{th}$ row, may output a 4k−1$^{th}$ gate signal GS[4*k*−1] as the k$^{th}$ third output signal OUT3[*k*] to a gate line of a 4k−1$^{th}$ row, and may output a 4k$^{th}$ gate signal GS[4*k*] as the k$^{th}$ fourth output signal OUT4[*k*] *to a gate line of a* 4k$^{th}$ row.

Referring to FIGS. 30 and 31, the k$^{th}$ stage STK may include a control circuit 141 and an output circuit 145". Each of the control circuit 141 and the output circuit 145" may include at least one transistor.

The control circuit 141 may control voltages of a first node Q1 and a third node QB in response to signals input to the first input terminal IN1 and the second input terminal IN2. The control circuit 141 of FIGS. 30 and 31 is the same as the control circuit 141 of FIGS. 24 and 25, and thus, a detailed description thereof will be omitted.

In FIGS. 30 and 31, gates of the second transistor T22 and the third transistor T23 are connected to the first node Q1. In another embodiment, the gates of the second transistor T22 and the third transistor T23 may be connected to one of the first to fourth sub-nodes Q21 to Q24.

The output circuit 145" may be connected between the first voltage input terminal V1 and a clock terminal and may output a high-level voltage or a low-level voltage according to voltages of the first node Q1 and the third node QB. The second node Q2 may include a plurality of sub-nodes. The second node Q2 may include the first to fourth sub-nodes Q21 to Q24.

The output circuit 145" may include a plurality of sub-output circuits that are connected in parallel. The output circuit 145" may have a structure in which a plurality of output circuits 145 of FIG. 19 are connected in parallel. The sub-output circuits may include first to fourth sub-output circuits 1451 to 1454. Each of the first to fourth sub-output circuits 1451 to 1454 may be the same as the output circuit 145 of FIG. 19.

The first sub-output circuit 1451 may include a sixth transistor T26-1, a seventh transistor T27-1, and an eighth transistor T28-1. The first sub-output circuit 1451 may further include a capacitor C211. The capacitor C211 may be omitted.

The second sub-output circuit 1452 may include a sixth transistor T26-2, a seventh transistor T27-2, and an eighth transistor T28-2. The second sub-output circuit 1452 may further include a capacitor C212. The capacitor C212 may be omitted.

The third sub-output circuit 1453 may include a sixth transistor T26-3, a seventh transistor T27-3, and an eighth transistor T28-3. The third sub-output circuit 1453 may further include a capacitor C213. The capacitor C213 may be omitted.

The fourth sub-output circuit 1454 may include a sixth transistor T26-4, a seventh transistor T27-4, and an eighth transistor T28-4. The fourth sub-output circuit 1454 may further include a capacitor C214. The capacitor C214 may be omitted.

An operation of the $k^{th}$ stage STK of FIGS. 30 and 31 will be described with reference to FIG. 32.

In a first section P1, the previous fourth output signal OUT4[$k$−1] of a low level may be input to the first input terminal IN1, the next first output signal OUT1[$k$+1] of a high level may be input to the second input terminal IN2, and the fifth to eighth clock signals CLK5 to CLK8 of a high level may be input to the first to fourth clock terminals CK1 to CK4.

A first transistor T21 may be turned on by the previous fourth output signal OUT4[$k$−1] of a low level, and the previous fourth output signal OUT4[$k$−1] of a low level may be transmitted to the first node Q1. Due to the turned-on sixth transistors T26-1, T26-2, T26-3, and T26-4, each of first to fourth sub-node voltages VQ21 to VQ24 may be a low-level voltage similar to a first node voltage VQ1. The second transistor T22 with the gate connected to the first node Q1 may be turned on, the first voltage VGH may be transmitted to the third node QB, and a third node voltage VQB may be a high-level voltage.

The seventh transistors T27-1, T27-2, T27-3, and T27-4 with gates connected to the first to fourth sub-nodes Q21 to Q24 may be turned on, and the fifth to eighth clock signals CLK5 to CLK8 of a high level may be transmitted to the first to fourth output terminals GOUT1 to GOUT4, respectively. Accordingly, the first to fourth output signals OUT1[$k$], OUT2[$k$], OUT3[$k$], and OUT4[$k$] of a high level may be output from the first to fourth output terminals GOUT1 to GOUT4. Voltage differences between the first to fourth output terminals GOUT1 to GOUT4 and the first to fourth sub-nodes Q21 to Q24 may be stored in the capacitors C211, C212, C213, and C214, respectively.

In a second section P2, the previous fourth output signal OUT4[$k$−1] may be changed from a low level to a high level, the next first output signal OUT1[$k$+1] of a high level may be input, the fifth clock signal CLK5 of a low level may be input to the first clock terminal CK1, and the sixth to eighth clock signals CLK6 to CLK8 of a high level may be input to the second to fourth clock terminals CK2 to CK4.

The first transistor T21 may be turned off by the previous fourth output signal OUT4[$k$−1] of a high level, and voltages of the first node Q1 and the first to fourth sub-nodes Q21 to Q24 may be maintained at a low level by the capacitors C211, C212, C213, and C214.

Due to the turned-on seventh transistor T27-1, the fifth clock signal CLK5 of a low level may be input to the first output terminal GOUT1, and the first output signal OUT1[$k$] of a low level may be output from the first output terminal GOUT1. In this case, as a voltage of the first output terminal GOUT1 falls from a high level to a low level, the first sub-node voltage VQ21 may fall to a voltage level lower than a voltage level in the first section P1 due to coupling of the capacitor C211

Due to the turned-on seventh transistors T27-2, T27-3, and T27-4, the sixth to eighth clock signals CLK6 to CLK8 of a high level may be transmitted to the second to fourth output terminals GOUT2 to GOUT4, respectively, and the second to fourth output signals OUT2[$k$], OUT3[$k$], and OUT4[$k$] of a high level may be output from the second to fourth output terminals GOUT2 to GOUT4.

In a third section P3, the previous fourth output signal OUT4[$k$−1] and the next first output signal OUT1[$k$+1] of a high level may be input, the sixth clock signal CLK6 of a low level may be input to the second clock terminal CK2, and the fifth clock signal CLK5, the seventh clock signal CLK7, and the eighth clock signal CLK8 of a high level may be input to the first clock terminal CK1, the third clock terminal CK3, and the fourth clock terminal CK4, respectively.

The first transistor T21 may be turned off by the previous fourth output signal OUT4[$k$−1] of a high level, and voltages of the first node Q1 and the first to fourth sub-nodes Q21 to Q24 may be maintained at a low level by the capacitors C211, C212, C213, and C214.

Due to the turned-on seventh transistor T27-2, the sixth clock signal CLK6 of a low level may be transmitted to the second output terminal GOUT2, and the second output signal OUT2[$k$] of a low level may be output from the second output terminal GOUT2. In this case, as a voltage of the second output terminal GOUT2 falls from a high level to a low level, the second sub-node voltage VQ22 may fall to a voltage level lower than a voltage level in the second section P2 due to coupling of the capacitor C212.

Due to the turned-on seventh transistors T27-1, T27-3, and T27-4, the fifth clock signal CLK5, the seventh clock signal CLK7, and the eighth clock signal CLK8 of a high level may be transmitted to the first output terminal GOUT1, the third output terminal GOUT3, and the fourth output terminal GOUT4, respectively, and the first output signal OUT1[$k$], the third output signal OUT3[$k$], and the fourth output signal OUT4[$k$] of a high level may be output from the first output terminal GOUT1, the third output terminal GOUT3, and the fourth output terminal GOUT4, respectively. In this case, as a voltage of the first output terminal GOUT1 rises from a low level to a high level, the first sub-node voltage VQ21 may rise to a low level (e.g., about a voltage in the first section P1) higher than a voltage level in the second section P2 due to coupling of the capacitor C211.

In a fourth section P4, the previous fourth output signal OUT4[$k$−1] and the next first output signal OUT1[$k$+1] of a high level may be input, the seventh clock signal CLK7 of a low level may be input to the third clock terminal CK3, and the fifth clock signal CLK5, the sixth clock signal CLK6, and the eighth clock signal CLK8 of a high level may be input to the first clock terminal CK1, the second clock terminal CK2, and the fourth clock terminal CK4, respectively.

The first transistor T21 may be turned off by the previous fourth output signal OUT4[$k$−1] of a high level, and voltages of the first node Q1 and the first to fourth sub-nodes Q21 to Q24 may be maintained at a low level by the capacitors C211, C212, C213, and C214.

Due to the turned-on seventh transistor T27-3, the seventh clock signal CLK7 of a low level may be transmitted to the third output terminal GOUT3, and the third output signal OUT3[*k*] of a low level may be output from the third output terminal GOUT3. In this case, as a voltage of the third output terminal GOUT3 falls from a high level to a low level, the third sub-node voltage VQ23 may fall to a voltage level lower than a voltage level in the third section P3 due to coupling of the capacitor C213.

Due to the turned-on seventh transistors T27-1, T27-2, and T27-4, the fifth clock signal CLK5, the sixth clock signal CLK6, and the eighth clock signal CLK8 of a high level may be transmitted to the first output terminal GOUT1, the second output terminal GOUT2, and the fourth output terminal GOUT4, respectively, and the first output signal OUT1[*k*], the second output signal OUT2[*k*], and the fourth output signal OUT4[*k*] of a high level may be output from the first output terminal GOUT1, the second output terminal GOUT2, and the fourth output terminal GOUT4, respectively. In this case, as a voltage of the second output terminal GOUT2 rises from a low level to a high level, the second sub-node voltage VQ22 may rise to a low level (e.g., about a voltage level in the second section P2) higher than a voltage level in the third section P3 due to coupling of the capacitor C212.

In a fifth section P5, the previous fourth output signal OUT4[*k*−1] and the next first output signal OUT1[*k*+1] of a high level may be input, the eighth clock signal CLK8 of a low level may be input to the fourth clock terminal CK4, and the fifth to seventh clock signals CLK5 to CLK7 of a high level may be input to the first to third clock terminals CK1 to CK3, respectively.

The first transistor T21 may be turned off by the previous fourth output signal OUT4[*k*−1] of a high level, and voltages of the first node Q1 and the first to fourth sub-nodes Q21 to Q24 may maintain a low-level voltage due to the capacitors C211, C212, C213, and C214.

Due to the turned-on seventh transistor T27-4, the eighth clock signal CLK8 of a low level may be transmitted to the fourth output terminal GOUT4, and the fourth output signal OUT4[*k*] of a low level may be output from the fourth output terminal GOUT4. In this case, as a voltage of the fourth output terminal GOUT4 falls from a high level to a low level, the fourth sub-node voltage VQ24 may fall to a voltage level lower than a voltage level in the fourth section P4 due to coupling of the capacitor C214.

Due to the turned-on seventh transistors T27-1, T27-2, and T27-3, the fifth to seventh clock signals CLK5 to CLK7 of a high level may be transmitted to the first to third output terminals GOUT1 to GOUT3, respectively, and the first to third output signals OUT1[*k*], OUT2[*k*], and OUT3[*k*] of a high level may be output from the first to third output terminals GOUT1 to GOUT3, respectively. In this case, as a voltage of the third output terminal GOUT3 rises from a low level to a high level, the third sub-node voltage VQ23 may rise to a low level (e.g., about a voltage level in the third section P3) higher than a voltage level in the fourth section P4 due to coupling of the capacitor C213.

In a sixth section P6, the previous fourth output signal OUT4[*k*−1] of a high level may be input, the next first output signal OUT1[*k*+1] may be changed from a high level to a low level, and the fifth to eighth clock signals CLK5 to CLK8 of a high level may be input to the first to fourth clock terminals CK1 to CK4, respectively.

The fourth transistor T24 may be turned on by the next first output signal OUT1[*k*+1] of a low level, the first voltage VGH may be transmitted to the first node Q1, and the first node voltage VQ1 may be changed from a low level to a high level. As shown in FIG. 30, the third transistor T23 with the gate connected to the first node Q1 may be turned on, the second voltage VGL1 may transmitted to the third node QB, and the third node voltage VQB may be changed from a high level to a low level. Alternatively, as shown in FIG. 31, the third transistor T23 with the gate connected to the first node Q1 may be turned on, the fourth voltage VGL3 may be transmitted to the third node QB, and the third node voltage VQB may be changed from a high level to a low level.

Due to the eighth transistors T28-1, T28-2, T28-3, and T28-4 with gates connected to the third node QB, the first voltage VGH of a high level may be transmitted to the first to fourth output terminals GOUT1 to GOUT4. Accordingly, the first to fourth output signals OUT1[*k*], OUT2[*k*], OUT3[*k*], and OUT4[*k*] of a high level may be output from the first to fourth output terminals GOUT1 to GOUT4.

Figure 33:
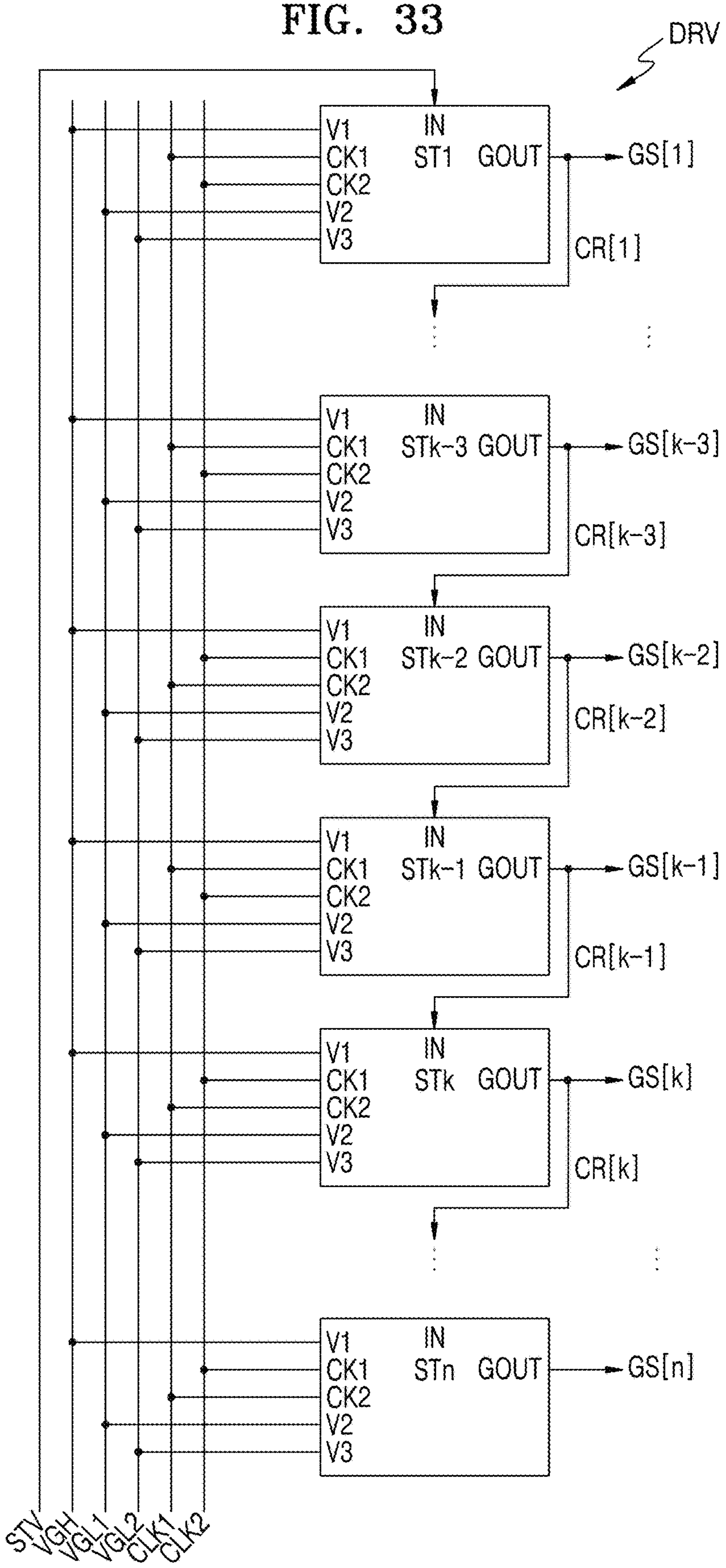
FIG. 33 is a diagram schematically illustrating a driving circuit, according to an embodiment.
Figure 34A:
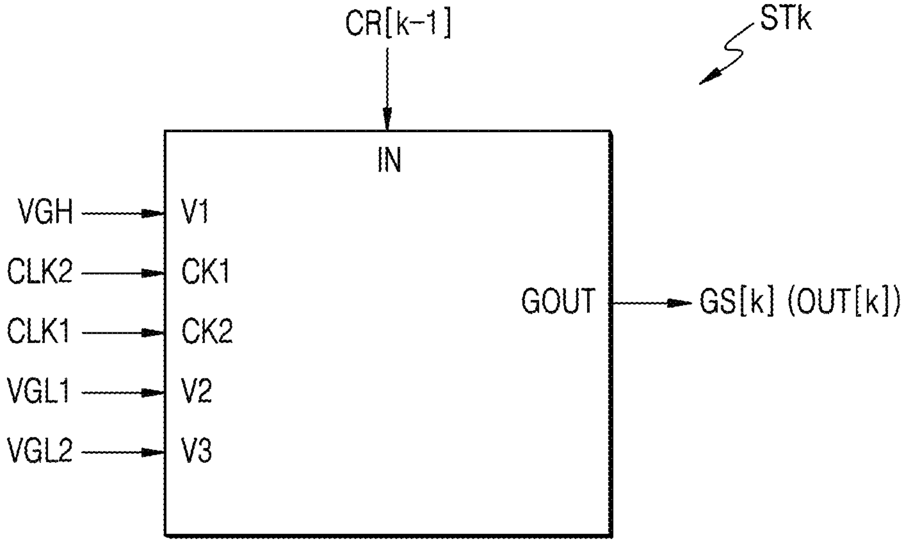
FIGS. 34A and 34B are diagrams schematically illustrating one stage included in a driving circuit, according to an embodiment.
Figure 34B:
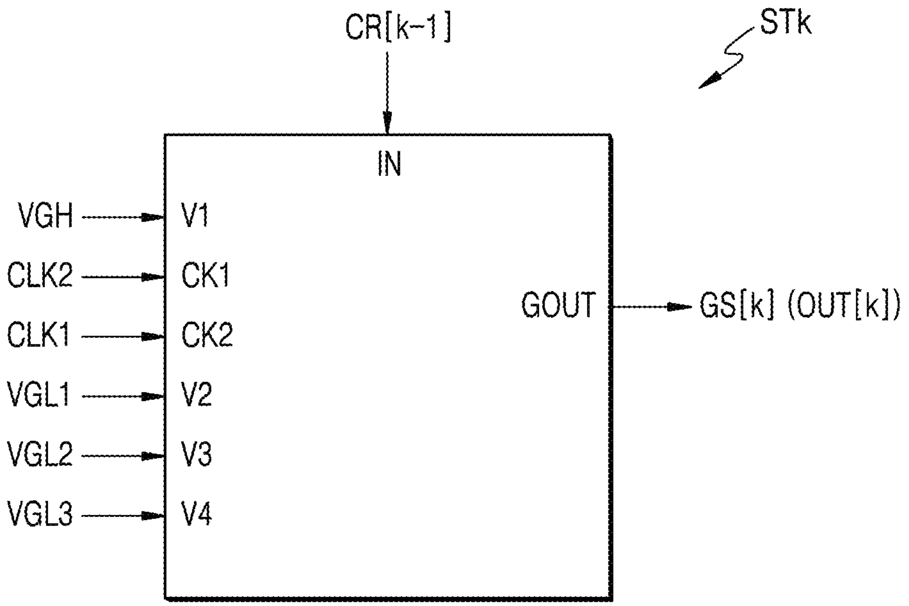
Figure 37:
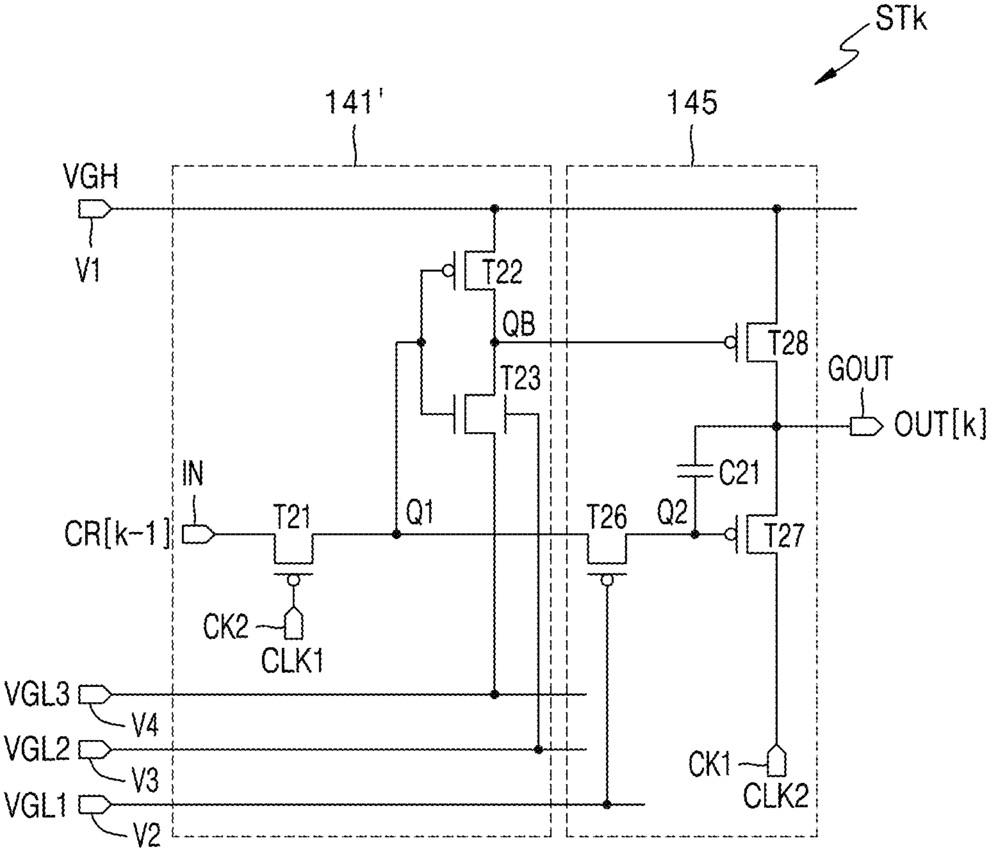
Figure 38:
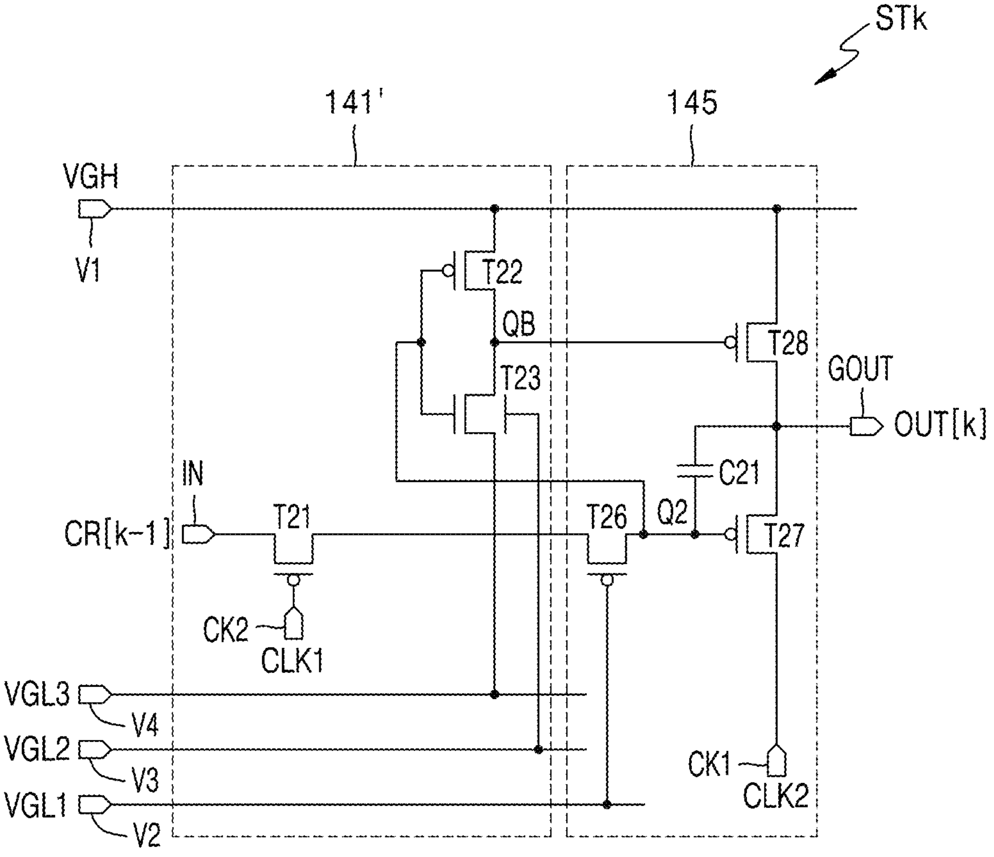
Figure 39:
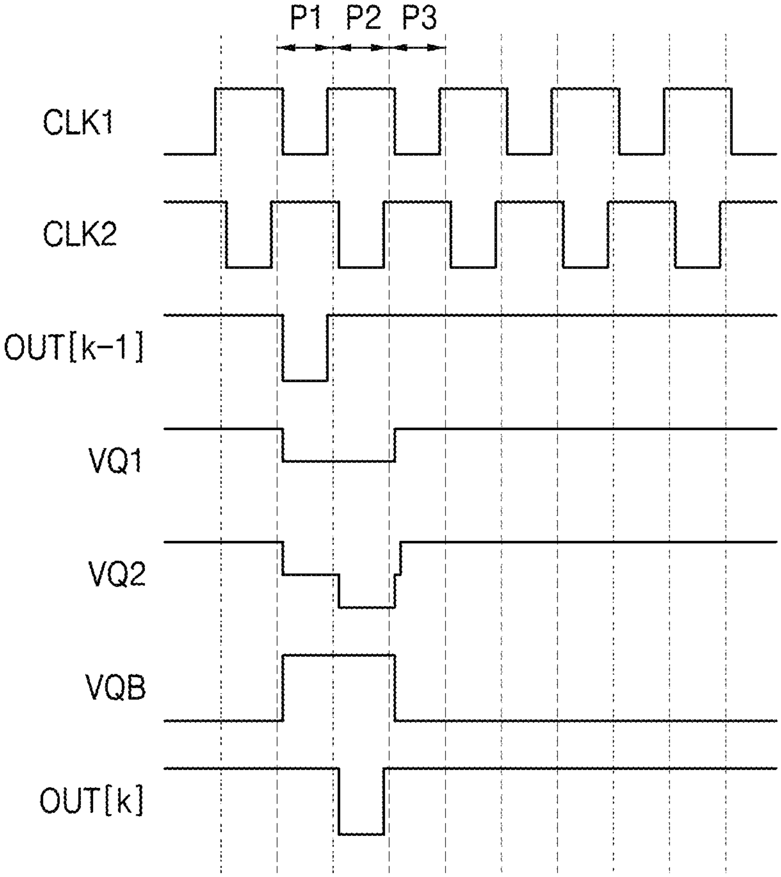
FIG. 39 is a timing diagram for describing an operation of the stage of FIGS. 35 to 38.

FIG. 33 is a diagram schematically illustrating a driving circuit, according to an embodiment. FIGS. 34A and 34B are diagrams schematically illustrating one stage included in a driving circuit, according to an embodiment. FIGS. 35 to 38 are circuit diagrams illustrating an example of a stage, according to an embodiment. FIG. 39 is a timing diagram for describing an operation of the stage of FIGS. 35 to 38. A difference from a configuration and an operation of the stage of FIG. 19 will be mainly described based on FIGS. 4 and 5.

The driving circuit DRV of FIG. 33 is an embodiment in which each of a plurality of stages (e.g., stages ST1 to STn) generates one gate signal and outputs the gate signal to a gate line of a corresponding row. As shown in FIG. 34A, the driving circuit DRV is different from the driving circuit DRV of FIG. 4 in that each of the plurality of stages (e.g., stages ST1 to STn) includes one input terminal IN and two clock terminals, that is, a first clock terminal CK1 and a second clock terminal CK2, and outputs one gate signal.

Each of the plurality of stages (e.g., stages ST1 to STn) may include the input terminal IN, a first voltage input terminal V1, a second voltage input terminal V2, a third voltage input terminal V3, the first clock terminal CK1, the second clock terminal CK2, and an output terminal GOUT. In another embodiment, as shown in FIG. 34B, each of the plurality of stages (e.g., stages ST1 to STn) may further include a fourth voltage input terminal V4.

A start signal may be input to the input terminal IN. The start signal may be an external signal STV or a previous carry signal. In an embodiment, the external signal STV may be input as a start signal to the input terminal IN of a first stage ST1, and a previous carry signal may be input as a start signal to the input terminal IN of each of second to $n^{th}$ stages ST2 to STn. In an embodiment, for example, a $k-1^{th}$ carry signal CR[k−1] output from a $k-1^{th}$ stage STk−1 may be input as a start signal to the input terminal IN of a $k^{th}$ stage STK.

A first voltage VGH may be input to the first voltage input terminal V1, a second voltage VGL1 may be input to the second voltage input terminal V2, and a third voltage VGL2 may be input to the third voltage input terminal V3. A fourth voltage VGL3 may be input to the fourth voltage input terminal V4.

A first clock signal CLK1 or a second clock signal CLK2 may be input to the first clock terminal CK1. The second clock signal CLK2 or the first clock signal CLK1 may be input to the second clock terminal CK2. In an odd-numbered stage, the first clock signal CLK1 may be input to the first clock terminal CK1, and the second clock signal CLK2 may be input to the second clock terminal CK2. In an even-numbered stage, the second clock signal CLK2 may be input to the first clock terminal CK1, and the first clock signal CLK1 may be input to the second clock terminal CK2.

FIGS. 34A and 34B illustrate that the second clock signal CLK2 is input to the first clock terminal CK1 and the first clock signal CLK1 is input to the second clock terminal CK2 of the $k^{th}$ stage STK that is an even-numbered stage.

An output signal may be output in synchronization with a low-level voltage output timing of a clock signal input to the first clock terminal CK1 from the output terminal GOUT. In an embodiment, for example, a $k^{th}$ gate signal GS[k] may be output as an output signal OUT[k] from the output terminal GOUT of the $k^{th}$ stage STK in synchronization with a low level output timing of the second clock signal CLK2.

Each $k^{th}$ stage STK of FIGS. 35 to 38 may include a control circuit 141' and an output circuit 145. Each of the control circuit 141' and the output circuit 145 may include at least one transistor.

The control circuit 141' may control voltages of a first node Q1 and a third node QB in response to a signal input to the input terminal IN. The control circuit 141' of FIGS. 35 to 38 is different from the control circuit 141 of FIGS. 19 to 22 in that a fourth transistor T24 is omitted and a gate of a first transistor T21 is connected to the second clock terminal CK2. Because the turn-on and turn-off of the first transistor T21 is controlled by a clock signal, the fourth transistor T24 may be omitted, thereby reducing the size of the driving circuit DRV.

The first transistor T21 may be connected between the input terminal IN and the first node Q1. The gate of the first transistor T21 may be connected to the second clock terminal CK2. The first transistor T21 may be turned on when the first clock signal CLK1 of a low level is input, and may transmit a previous carry signal CR[k−1] to the first node Q1. The previous carry signal CR[k−1] may be an output signal OUT[k−1] (a previous output signal) output from a $k-1^{th}$ stage STk−1.

Figure 35:
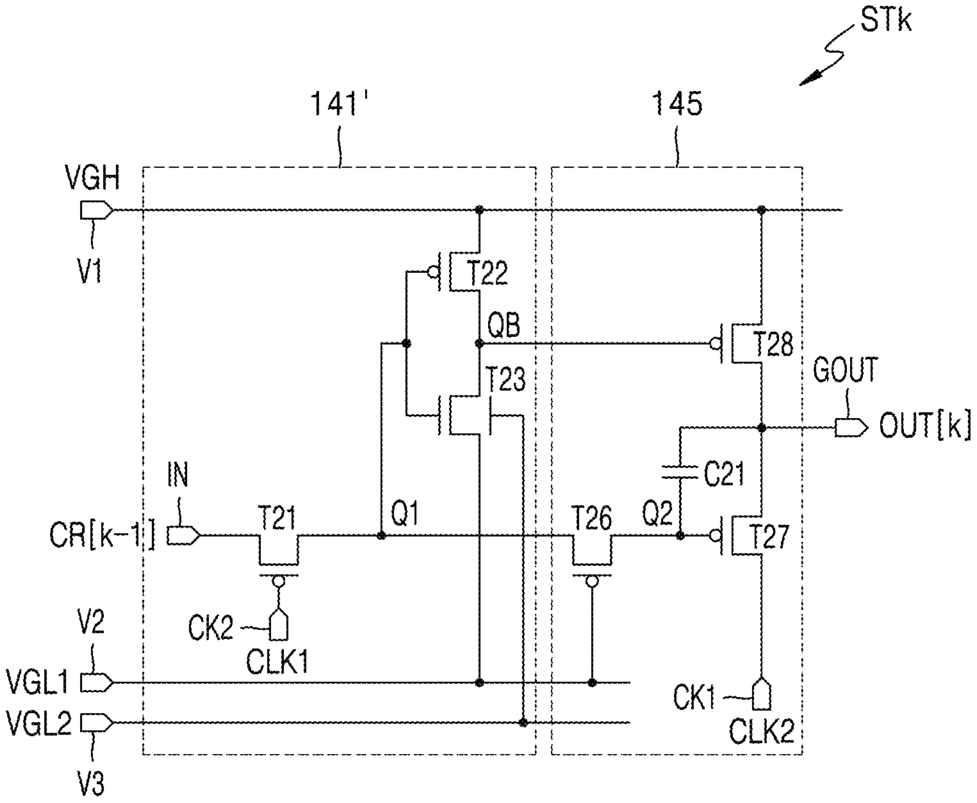
FIGS. 35 to 38 are circuit diagrams illustrating an example of a stage, according to an embodiment.
Figure 36:
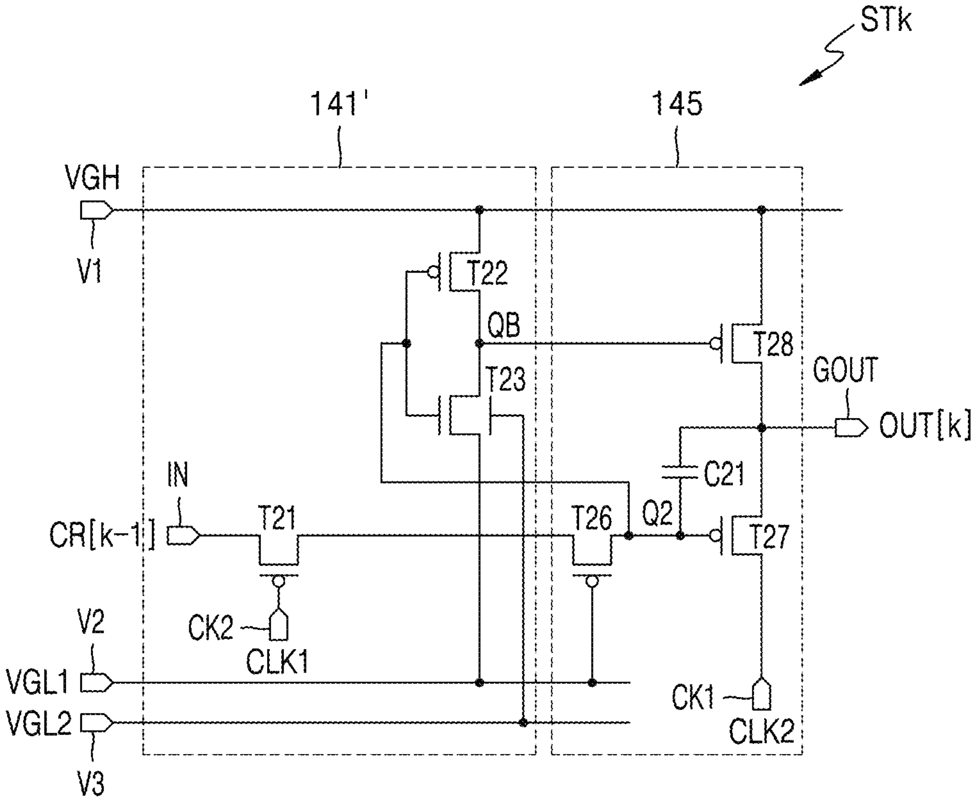

A second transistor T22 may be connected between the first voltage input terminal V1 and the third node QB. As shown in FIGS. 35 and 36, a third transistor T23 may be connected between the third node QB and the second voltage input terminal V2. Alternatively, as shown in FIGS. 37 and 38, the third transistor T23 may be connected between the third node QB and the fourth voltage input terminal V4. Gates of the second transistor T22 and the third transistor T23 may be connected to the first node Q1 as shown in FIGS. 35 and 37 or may be connected to a second node Q2 as shown in FIGS. 36 and 38.

The second transistor T22 may be turned on when a voltage of the first node Q1 or the second node Q2 is at a low level, and may transmit the first voltage VGH to the third node QB. The third transistor T23 may be turned on when a voltage of the first node Q1 or the second node Q2 is at a high level, and may transmit the second voltage VGL1 or the fourth voltage VGL3 to the third node QB.

The output circuit 145 may be connected between the first voltage input terminal V1 and a clock terminal and may output a high-level voltage or a low-level voltage according to voltages of the first node Q1 and the third node QB. The output circuit 145 of FIGS. 35 to 38 is the same as the output circuit 145 of FIGS. 19 and 21, and thus, a detailed description thereof will be omitted.

An operation of the $k^{th}$ stage STK of FIGS. 35 to 38 will be described with reference to FIG. 39.

In a first section P1, the previous output signal OUT[k−1] of a low level may be input to the input terminal IN, the second clock signal CLK2 of a high level may be input to the first clock terminal CK1, and the first clock signal CLK1 of a low level may be input to the second clock terminal CK2.

The first transistor T21 may be turned on by the first clock signal CLK1 of a low level, and may transmit the previous output signal OUT[k−1] of a low level to the first node Q1. Due to a sixth transistor T26 that is turned on, the second node voltage VQ2 may be a low-level voltage, similar to a first node voltage VQ1. The second transistor T22 with the gate connected to the first node Q1 or the second node Q2 may be turned on, the first voltage VGH may be transmitted to the third node QB, and a third node voltage VQB may be a high-level voltage.

A seventh transistor T27 with a gate connected to the second node Q2 may be turned on, the second clock signal CLK2 of a high level may be transmitted to the output terminal GOUT, and the output signal OUT[k] of a high level may be output from the output terminal GOUT. A voltage difference between the output terminal GOUT and the second node Q2 may be stored in a capacitor C21.

In a second section P2, the previous output signal OUT[k−1] may be changed from a low level to a high level, the second clock signal CLK2 of a low level may be input to the first clock terminal CK1, and the first clock signal CLK1 of a high level may be input to the second clock terminal CK2.

The first transistor T21 may be turned off by the first clock signal CLK1 of a high level. Voltages of the first node Q1 and the second node Q2 may maintain a low-level voltage due to the capacitor C21, the second clock signal CLK2 of a low level may be transmitted to the output terminal GOUT by the turned-on seventh transistor T27, and the output signal OUT[k] of a low level may be output from the output terminal GOUT. In this case, as a voltage of the output terminal GOUT falls from a high level to a low level, the second node voltage VQ2 may fall to a voltage level lower than a voltage level in the first section P1 due to coupling of the capacitor C21.

In a third section P3, the previous output signal OUT[k−1] of a high level may be input, the second clock signal CLK2 of a high level may be input to the first clock terminal CK1, and the first clock signal CLK1 of a low level may be input to the second clock terminal CK2.

The first transistor T21 may be turned on by the first clock signal CLK1 of a low level, the previous output signal OUT[k−1] of a high level may be transmitted to the first node Q1, and the first node voltage VQ1 and the second node voltage VQ2 may be changed from a low level to a high level. The seventh transistor T27 with the gate connected to the second node Q2 may be turned off.

The third transistor T23 with the gate connected to the first node Q1 or the second node Q2 may be turned on, the second voltage VGL1 or the fourth voltage VGL3 may be transmitted to the third node QB, and the third node voltage VQB may be changed from a high level to a low level. An eighth transistor T28 with a gate connected to the third node QB may be turned on, and the first voltage VGH of a high level may be transmitted to the output terminal GOUT. Accordingly, the output signal OUT[k] of a high level may be output from the output terminal GOUT.

Figure 40:
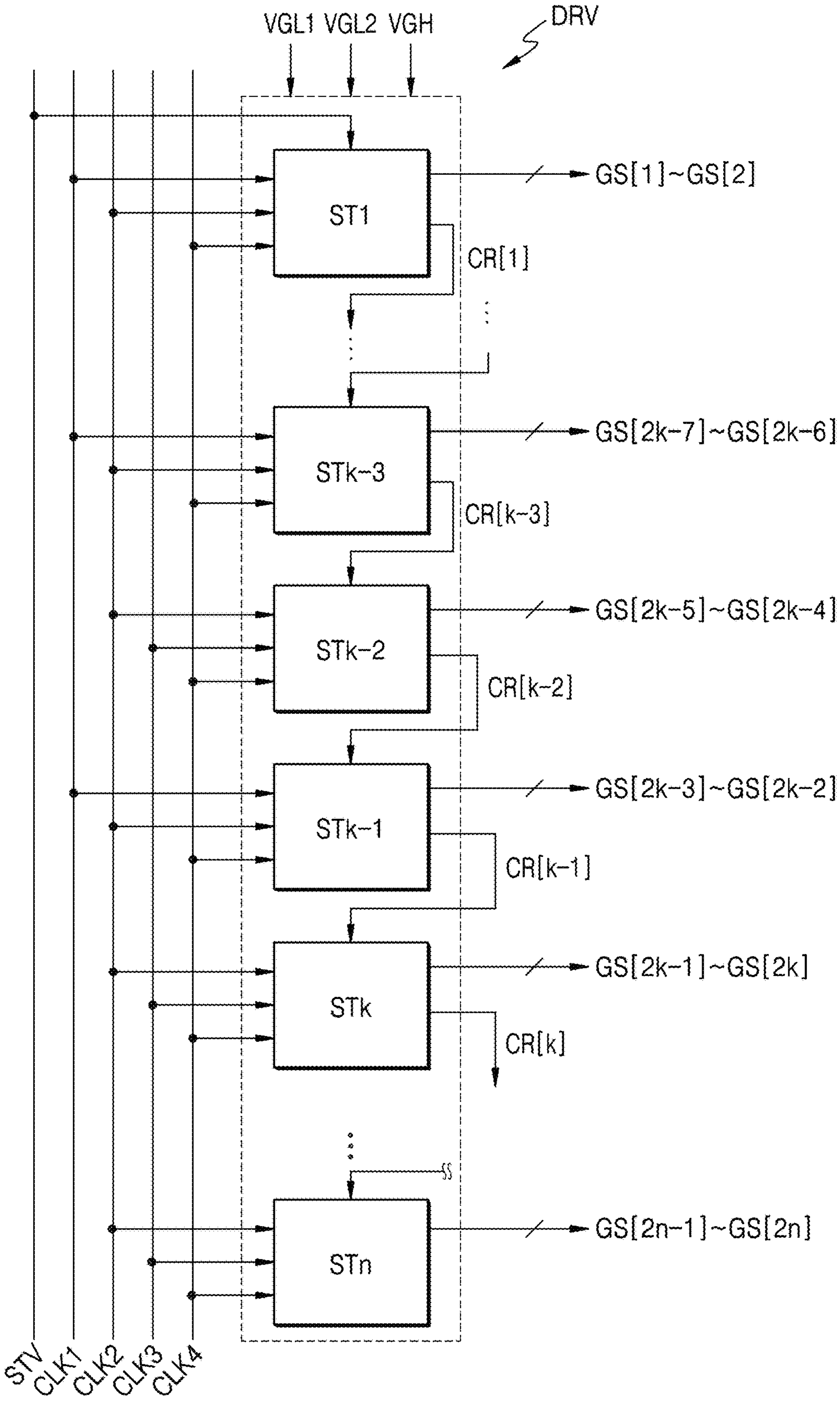
FIG. 40 is a diagram schematically illustrating a driving circuit, according to an embodiment.
Figure 41A:
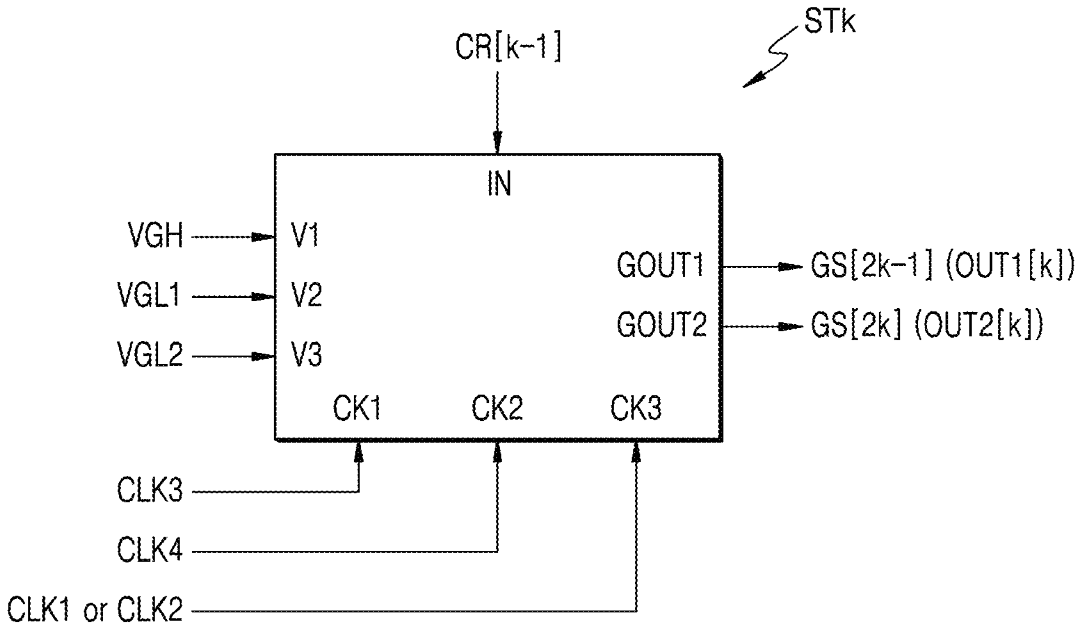
FIGS. 41A and 41B are diagrams schematically illustrating one stage included in a driving circuit, according to an embodiment.
Figure 41B:
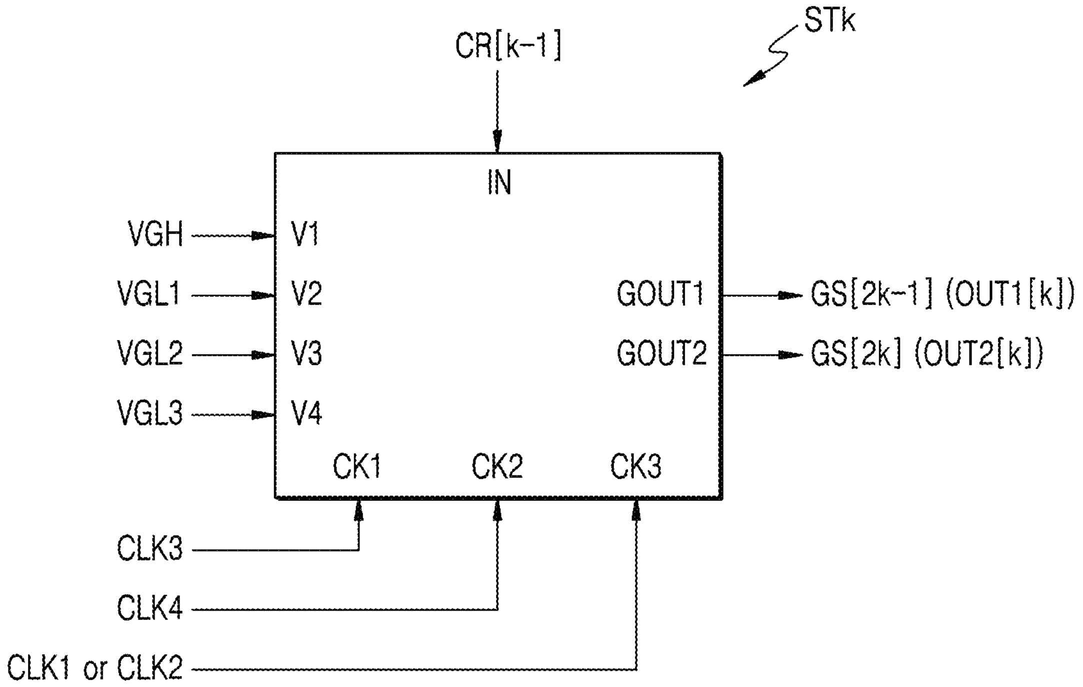
Figure 42:
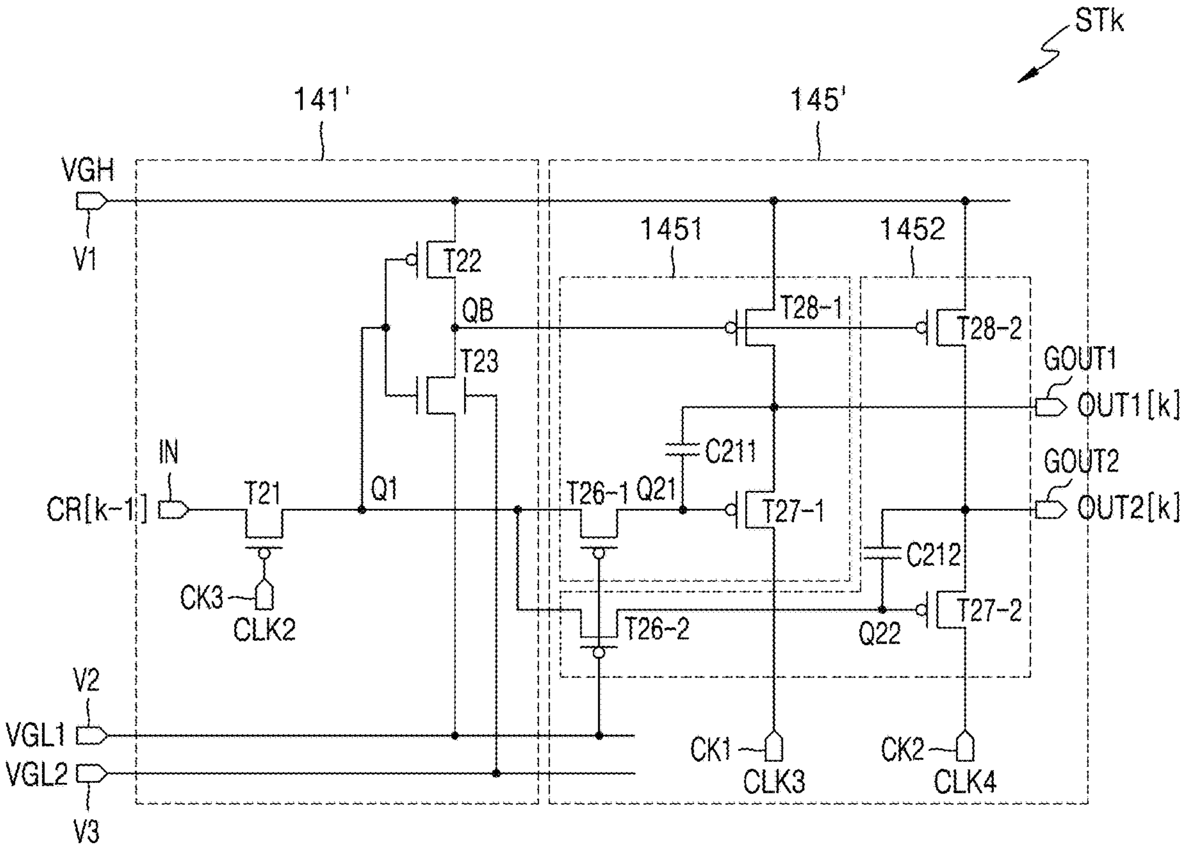
FIGS. 42 and 43 are circuit diagrams illustrating an example of a stage, according to an embodiment.
Figure 43:
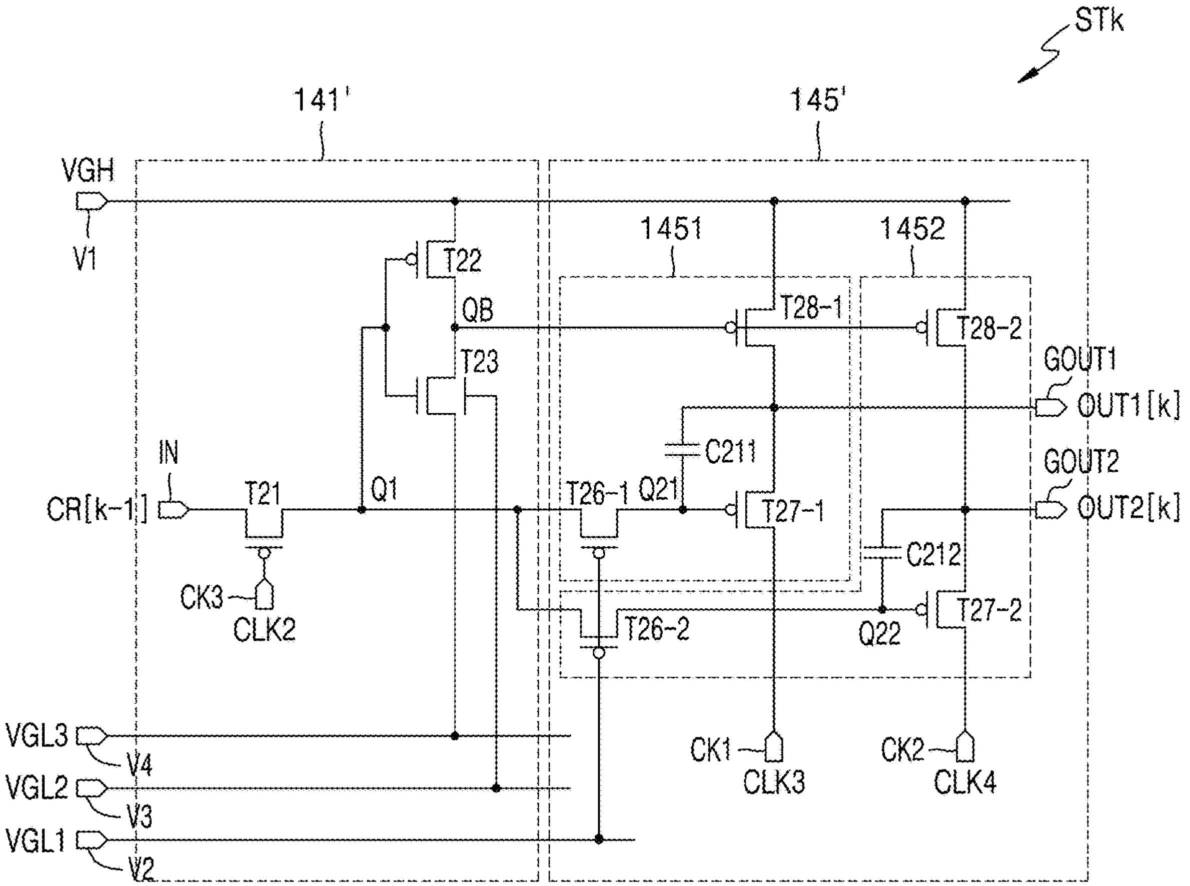
Figure 44:
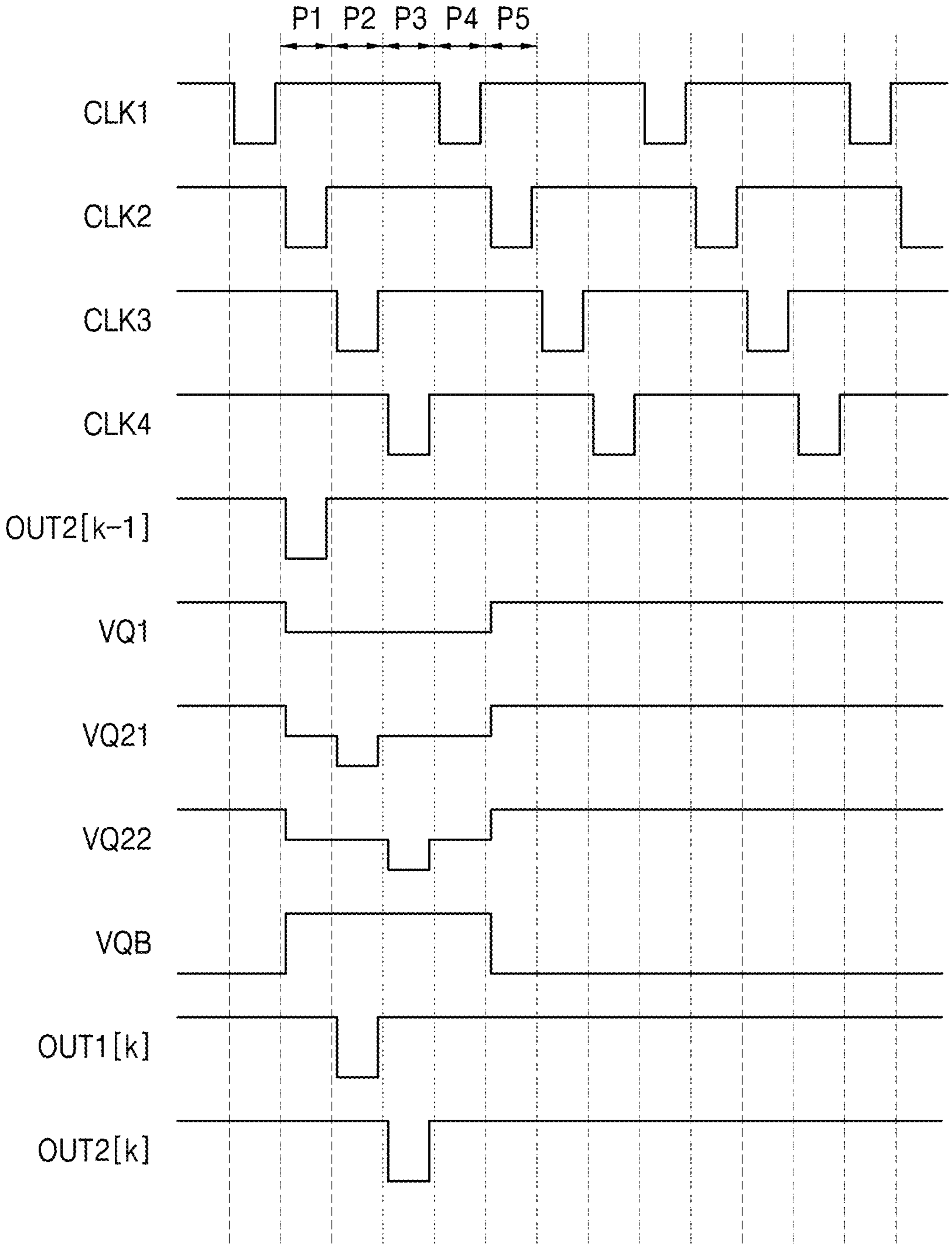
FIG. 44 is a timing diagram for describing an operation of the stage of FIGS. 42 and 43.

FIG. 40 is a diagram schematically illustrating a driving circuit, according to an embodiment. FIGS. 41A and 41B are diagrams schematically illustrating one stage included in a driving circuit, according to an embodiment. FIGS. 42 and 43 are circuit diagrams illustrating an example of a stage, according to an embodiment. FIG. 44 is a timing diagram for describing an operation of the stage of FIGS. 42 and 43. A difference from a configuration and an operation of the stage of FIG. 19 will be described based on FIGS. 9 to 11.

The driving circuit DRV of FIG. 40 is an embodiment in which each of a plurality of stages (e.g., stages ST1 to STn)

generates two gate signals and outputs the gate signals to gate lines of two corresponding rows. Each of the plurality of stages (e.g., stages ST1 to STn) may sequentially output two gate signals.

As shown in FIG. 41A, each stage is different from the stage of FIGS. 9 and 10 in that each of the plurality of stages (e.g., stages ST1 to STn) includes one input terminal IN and three clock terminals, that is, first to third clock terminals CK1 to CK3, and outputs two gate signals. Each of the plurality of stages (e.g., stages ST1 to STn) may include the input terminal IN, a first voltage input terminal V1, a second voltage input terminal V2, a third voltage input terminal V3, the first clock terminal CK1, the second clock terminal CK2, the third clock terminal CK3, a first output terminal GOUT1, and a second output terminal GOUT2. In another embodiment, as shown in FIG. 41B, each of the plurality of stages (e.g., stages ST1 to STn) may further include a fourth voltage input terminal V4.

A start signal may be input to the input terminal IN. The start signal may be an external signal STV or a previous carry signal. In an embodiment, the external signal STV may be input as a start signal to the input terminal IN of a first stage ST1, and a previous carry signal may be input as a start signal to the input terminal IN of each of second to $n^{th}$ stages ST2 to STn. In an embodiment, for example, a $k-1^{th}$ carry signal CR[k−1] output from a $k-1^{th}$ stage STk−1 may be input as a start signal to the input terminal IN of a $k^{th}$ stage STK.

A first voltage VGH may be input to the first voltage input terminal V1, a second voltage VGL1 may be input to the second voltage input terminal V2, and a third voltage VGL2 may be input to the third voltage input terminal V3. A fourth voltage VGL3 may be input to the fourth voltage input terminal V4.

Two of first to fourth clock signals CLK1 to CLK4 may be input to the first clock terminal CK1 and the second clock terminal CK2. In an embodiment, for example, the first clock signal CLK1 and the second clock signal CLK2 may be input to the first clock terminal CK1 and the second clock terminal CK2 of an odd-numbered stage, and the third clock signal CLK3 and the fourth clock signal CLK4 may be input to the first clock terminal CK1 and the second clock terminal CK2 of an even-numbered stage.

One of the remaining two clock signals other than clock signals input to the first clock terminal CK1 and the second clock terminal CK2 from among the first to fourth clock signals CLK1 to CLK4 may be input to the third clock terminal CK3. In an embodiment, for example, the third clock signal CLK3 or the fourth clock signal CLK4 may be input to the third clock terminal CK3 of the odd-numbered stage. The first clock signal CLK1 or the second clock signal CLK2 may be input to the third clock terminal CK3 of the even-numbered stage.

In FIGS. 41A and 41B, the third clock signal CLK3 and the fourth clock signal CLK4 are input to the first clock terminal CK1 and the second clock terminal CK2 of the $k^{th}$ stage STK that is an even-numbered stage, respectively, and the first clock signal CLK1 or the second clock signal CLK2 is input to the third clock terminal CK3.

A first output signal is output from the first output terminal GOUT1 in synchronization with a low-level voltage output timing of a clock signal input to the first clock terminal CK1, and a second output signal may be output from the second output terminal GOUT2 in synchronization with a low-level voltage output timing of a clock signal input to the second clock terminal CK2. In an embodiment, for example, a $2k-1^{th}$ gate signal GS[$2k$−1] may be output from the first output terminal GOUT1 of the $k^{th}$ stage STK as a first output signal OUT1[$k$] in synchronization with a low level output timing of the third clock signal CLK3. A $2k^{th}$ gate signal GS[$2k$] may be output from the second output terminal GOUT2 of the $k^{th}$ stage STK as a second output signal OUT2[$k$] in synchronization with a low level output timing of the fourth clock signal CLK4.

The $k^{th}$ stage STK of FIGS. 42 and 43 may include a control circuit 141' and an output circuit 145'. Each of the control circuit 141' and the output circuit 145' may include at least one transistor. The control circuit 141' of FIGS. 42 and 43 is the same as the control circuit 141' of FIGS. 35 and 37, and thus, a detailed description thereof will be omitted. The output circuit 145' of FIGS. 42 and 43 is the same as the output circuit 145' of FIGS. 24 and 25, and thus, a detailed description thereof will be omitted.

The previous carry signal CR[k−1] input to the $k^{th}$ stage STK may be one of output signals output from the $k-1^{th}$ stage STk−1. In an embodiment, the previous carry signal CR[k−1] may be a second output signal OUT2[$k$−1] or a first output signal OUT1[$k$−1] output from the $k-1^{th}$ stage STk−1. In an embodiment, for example, the previous carry signal CR[k−1] may be the second output signal OUT2[$k$−1] output from the $k-1^{th}$ stage STk−1, and the second clock signal CLK2 may be input to the third clock terminal CK3. In another embodiment, the previous carry signal CR[k−1] may be the first output signal OUT1[$k$−1] output from the $k-1^{th}$ stage STk−1, and the first clock signal CLK1 may be input to the third clock terminal CK3.

An operation of the $k^{th}$ stage STK of FIGS. 42 and 43 will be described with reference to FIG. 44. FIG. 44 is a timing diagram illustrating an example where the previous second output signal OUT2[$k$−1] is input to the input terminal IN and the second clock signal CLK2 is input to the third clock terminal CK3.

In a first section P1, the previous second output signal OUT2[$k$−1] of a low level may be input to the input terminal IN, the third clock signal CLK3 of a high level may be input to the first clock terminal CK1, the fourth clock signal CLK4 of a high level may be input to the second clock terminal CK2, and the second clock signal CLK2 of a low level may be input to the third clock terminal CK3.

A first transistor T21 may be turned on by the second clock signal CLK2 of a low level, and the previous second output signal OUT2[$k$−1] of a low level may be transmitted to the first node Q1. Due to sixth transistors T26-1 and T26-2 which are turned on, each of a first sub-node voltage VQ21 and a second sub-node voltage VQ22 may be a low-level voltage similar to a first node voltage VQ1. A second transistor T22 with a gate connected to a first node Q1 may be turned on, the first voltage VGH may be transmitted to a third node QB, and a third node voltage VQB may be a high-level voltage.

A seventh transistor T27-1 with a gate connected to a first sub-node Q21 may be turned on, and the third clock signal CLK3 of a high level may be transmitted to the first output terminal GOUT1. Accordingly, the first output signal OUT1[$k$] of a high level may be output from the first output terminal GOUT1. A voltage difference between the first output terminal GOUT1 and the first sub-node Q21 may be stored in a capacitor C211. A seventh transistor T27-2 with a gate connected to a second sub-node Q22 may be turned on, and the fourth clock signal CLK4 of a high level may be transmitted to the second output terminal GOUT2. Accordingly, the second output signal OUT2[$k$] of a high level may be output from the second output terminal GOUT2. A voltage difference between the second output terminal GOUT2 and the second sub-node Q22 may be stored in a capacitor C212.

In a second section P2, the previous second output signal OUT2[k−1] may be changed from a low level to a high level, the third clock signal CLK3 of a low level may be input to the first clock terminal CK1, the fourth clock signal CLK4 of a high level may be input to the second clock terminal CK2, and the second clock signal CLK2 of a high level may be input to the third clock terminal CK3.

The first transistor T21 may be turned off by the second clock signal CLK2 of a high level, and the first node voltage VQ1, the first sub-node voltage VQ21 and the second sub-node voltage VQ22 may be maintained at a low level by the capacitors C211 and C212.

Due to the turned-on seventh transistor T27-1, the third clock signal CLK3 of a low level may be transmitted to the first output terminal GOUT1, and the first output signal OUT1[k] of a low level may be output from the first output terminal GOUT1. In this case, as a voltage of the first output terminal GOUT1 falls from a high level to a low level, the first sub-node voltage VQ21 may fall to a voltage level lower than a voltage level in the first section P1 due to coupling of the capacitor C211.

Due to the turned-on seventh transistor T27-2, the fourth clock signal CLK4 of a high level may be transmitted to the second output terminal GOUT2, and the second output signal OUT2[k] of a high level may be output from the second output terminal GOUT2.

In a third section P3, the previous second output signal OUT2[k−1] of a high level may be input, the third clock signal CLK3 of a high level may be input to the first clock terminal CK1, the fourth clock signal CLK4 of a low level may be input to the second clock terminal CK2, and the second clock signal CLK2 of a high level may be input to the third clock terminal CK3.

The first transistor T21 may be turned off by the second clock signal CLK2 of a high level, and the first node voltage VQ1, the first sub-node voltage VQ21, and the second sub-node voltage VQ22 may be maintained at a low level by the capacitors C211 and C212.

Due to the turned-on seventh transistor T27-1, the third clock signal CLK3 of a high level may be transmitted to the first output terminal GOUT1, and the first output signal OUT1[k] of a high level may be output from the first output terminal GOUT1. In this case, as a voltage of the first output terminal GOUT1 rises from a low level to a high level, the first sub-node voltage VQ21 may rise to a low level (e.g., about a voltage level in the first section P1) higher than a voltage level in the second section P2 due to coupling of the capacitor C211.

Due to the turned-on seventh transistor T27-2, the fourth clock signal CLK4 of a low level may be transmitted to the second output terminal GOUT2, and the second output signal OUT2[k] of a low level may be output from the second output terminal GOUT2. In this case, as a voltage of the second output terminal GOUT2 falls from a high level to a low level, the second sub-node voltage VQ22 may fall to a voltage level lower than a voltage level in the second section P2 due to coupling of the capacitor C212.

In a fourth section P4, the previous second output signal OUT2[k−1] of a high level may be input, the third clock signal CLK3 of a high level may be input to the first clock terminal CK1, the fourth clock signal CLK4 of a high level may be input to the second clock terminal CK2, and the second clock signal CLK2 of a high level may be input to the third clock terminal CK3.

The first transistor T21 may be turned off by the second clock signal CLK2 of a high level, and the first node voltage VQ1, the first sub-node voltage VQ21, and the second sub-node voltage VQ22 may be maintained at a low level by the capacitors C211 and C212.

Due to the turned-on seventh transistor T27-1, the third clock signal CLK3 of a high level may be transmitted to the first output terminal GOUT1, and the first output signal OUT1[k] of a high level may be output from the first output terminal GOUT1.

Due to the turned-on seventh transistor T27-2, the fourth clock signal CLK4 of a high level may be transmitted to the second output terminal GOUT2, and the second output signal OUT2[k] of a high level may be output from the second output terminal GOUT2. In this case, as a voltage of the second output terminal GOUT2 rises from a low level to a high level, the second sub-node voltage VQ22 may rise to a low level (e.g., about a voltage level in the second section P2) higher than a voltage level in the third section P3 due to coupling of the capacitor C212.

In a fifth section P5, the previous second output signal OUT2[k−1] of a high level may be input, the third clock signal CLK3 of a high level may be input to the first clock terminal CK1, the fourth clock signal CLK4 of a high level may be input to the second clock terminal CK2, and the second clock signal CLK2 of a low level may be input to the third clock terminal CK3.

The first transistor T21 may be turned on by the second clock signal CLK2 of a low level, and the previous second output signal OUT2[k−1] of a high level may be transmitted to the first node Q1. Due to the turned-on sixth transistors T26-1 and T26-2, each of the first sub-node voltage VQ21 and the second sub-node voltage VQ22 may be a high-level voltage similar to the first node voltage VQ1. A third transistor T23 with a gate connected to the first node Q1 may be turned on, the second voltage VGL1 or the fourth voltage VGL3 may be transmitted to the third node QB, and the third node voltage VQB may be changed from a high level to a low level.

Due to an eighth transistor T28-1 with a gate connected to the third node QB, the first voltage VGH of a high level may be transmitted to the first output terminal GOUT1, and the first output signal OUT1[k] of a high level may be output from the first output terminal GOUT1. Due to an eighth transistor T28-2 with a gate connected to the third node QB, the first voltage VGH of a high level may be transmitted to the second output terminal GOUT2, and the second output signal OUT2[k] of a high level may be output from the second output terminal GOUT2.

Figure 45:
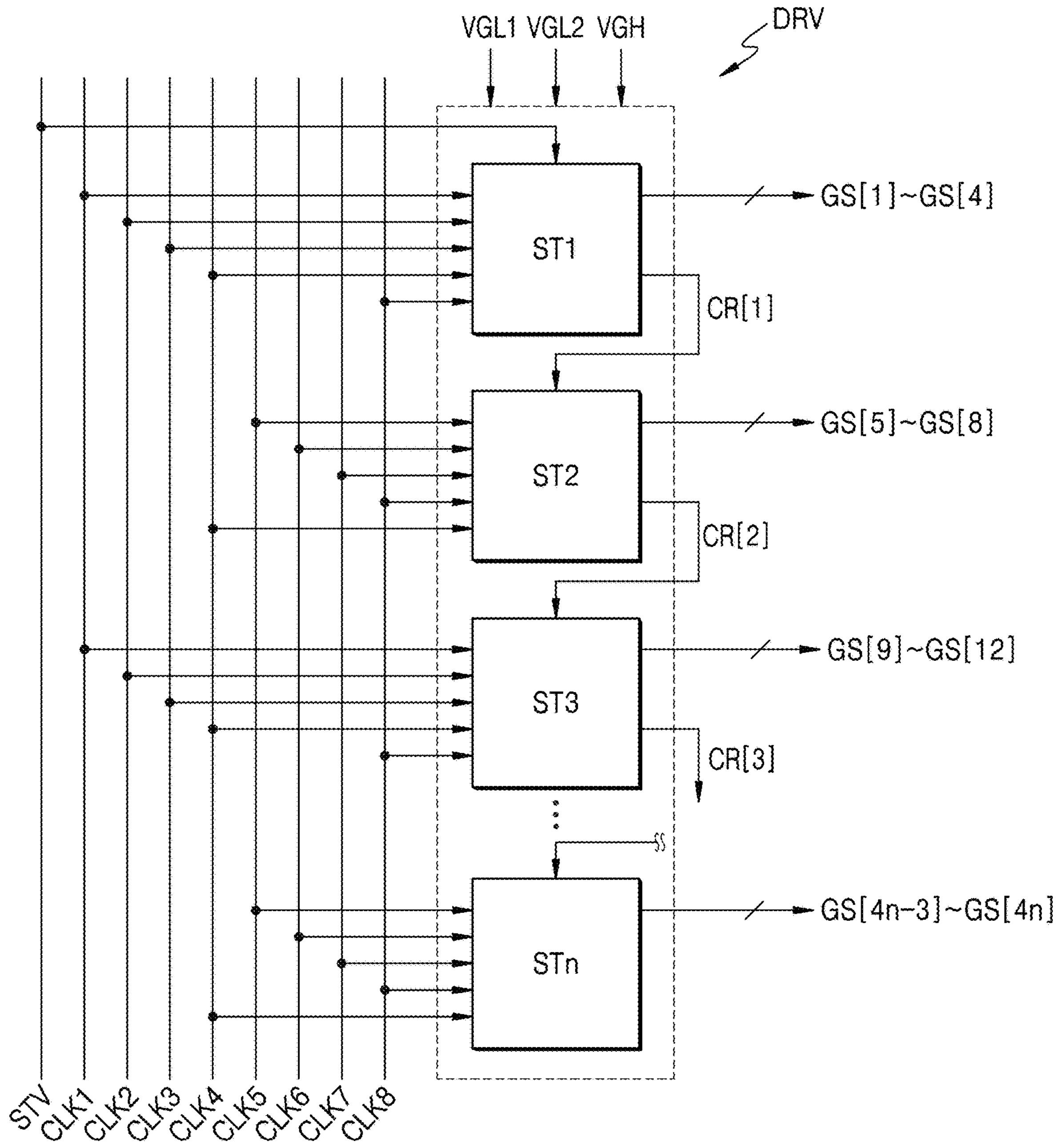
FIG. 45 is a diagram schematically illustrating a driving circuit, according to an embodiment.
Figure 46A:
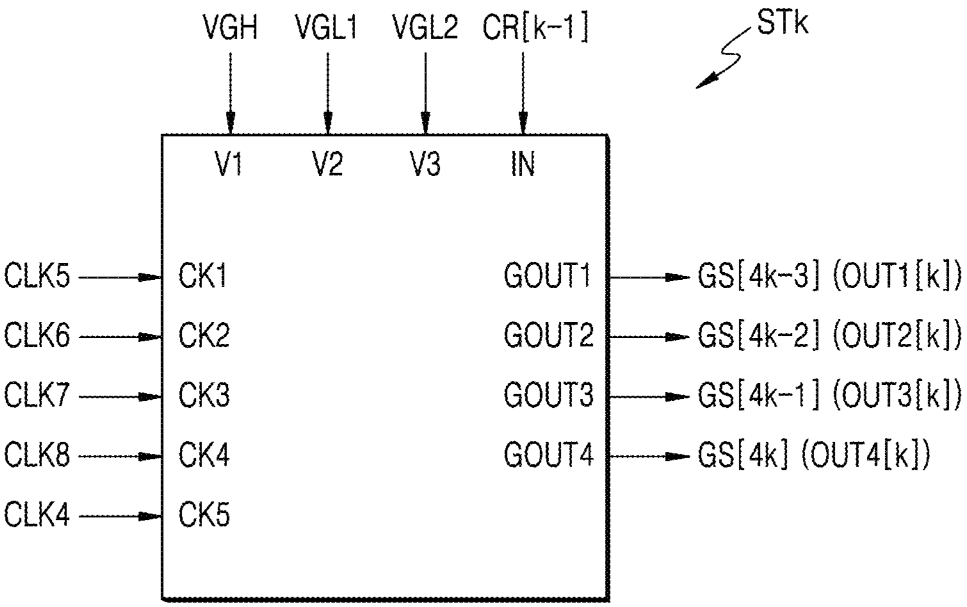
FIGS. 46A and 46B are diagrams schematically illustrating one stage of the driving circuit of FIG. 45.
Figure 46B:
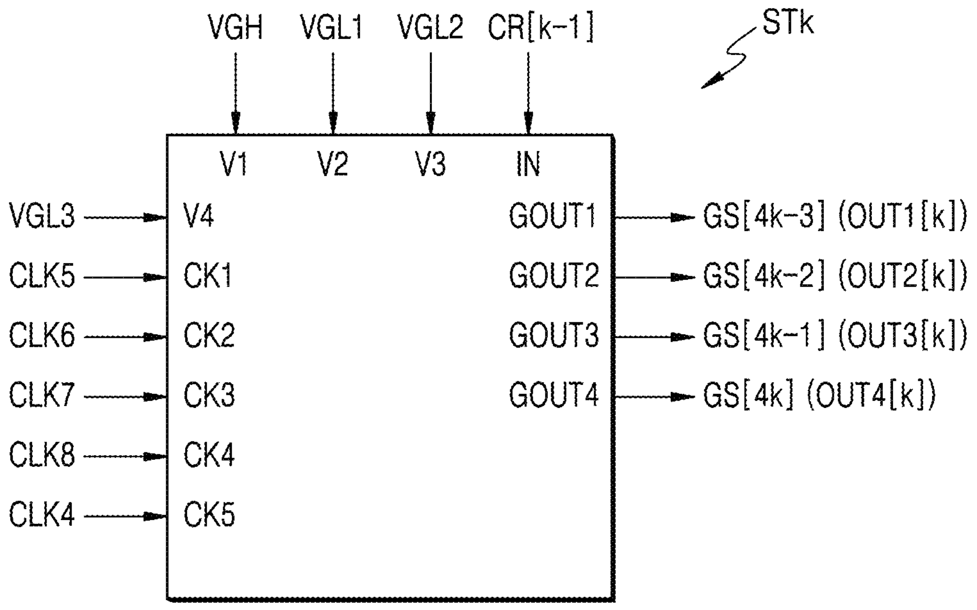
Figure 47:
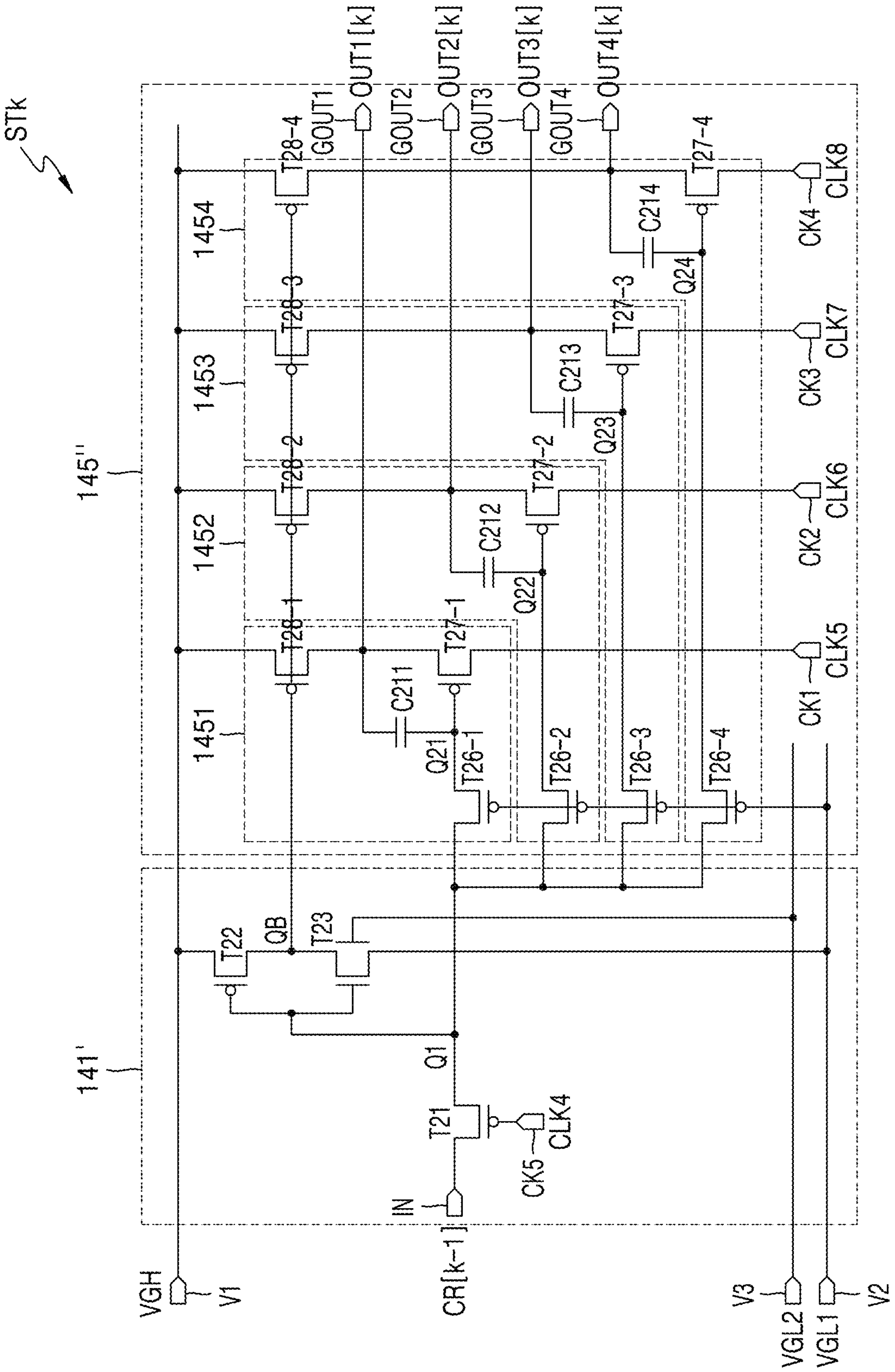
FIGS. 47 and 48 are circuit diagrams illustrating an example of a stage included in the driving circuit of FIG. 45.
Figure 48:
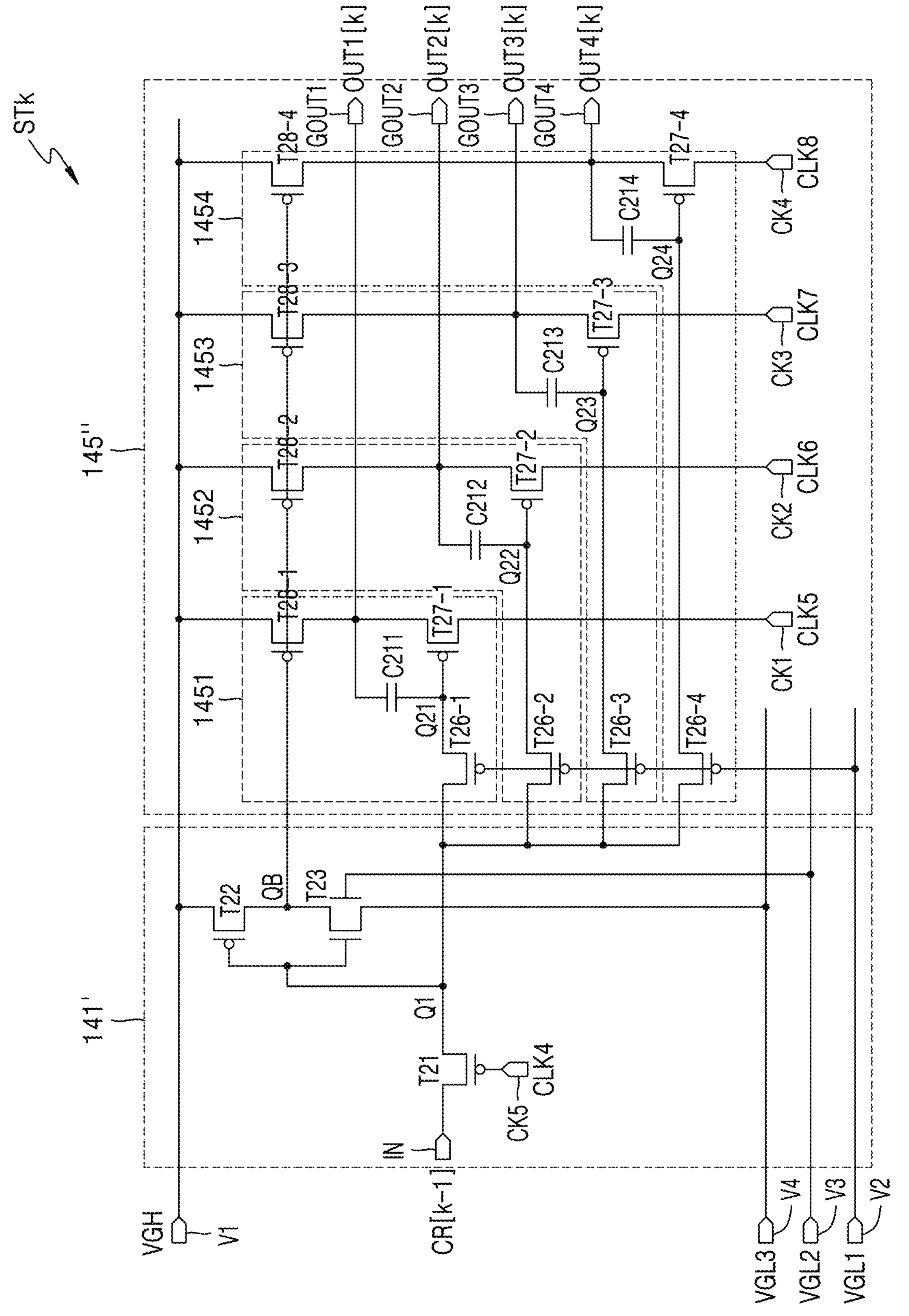
Figure 49:
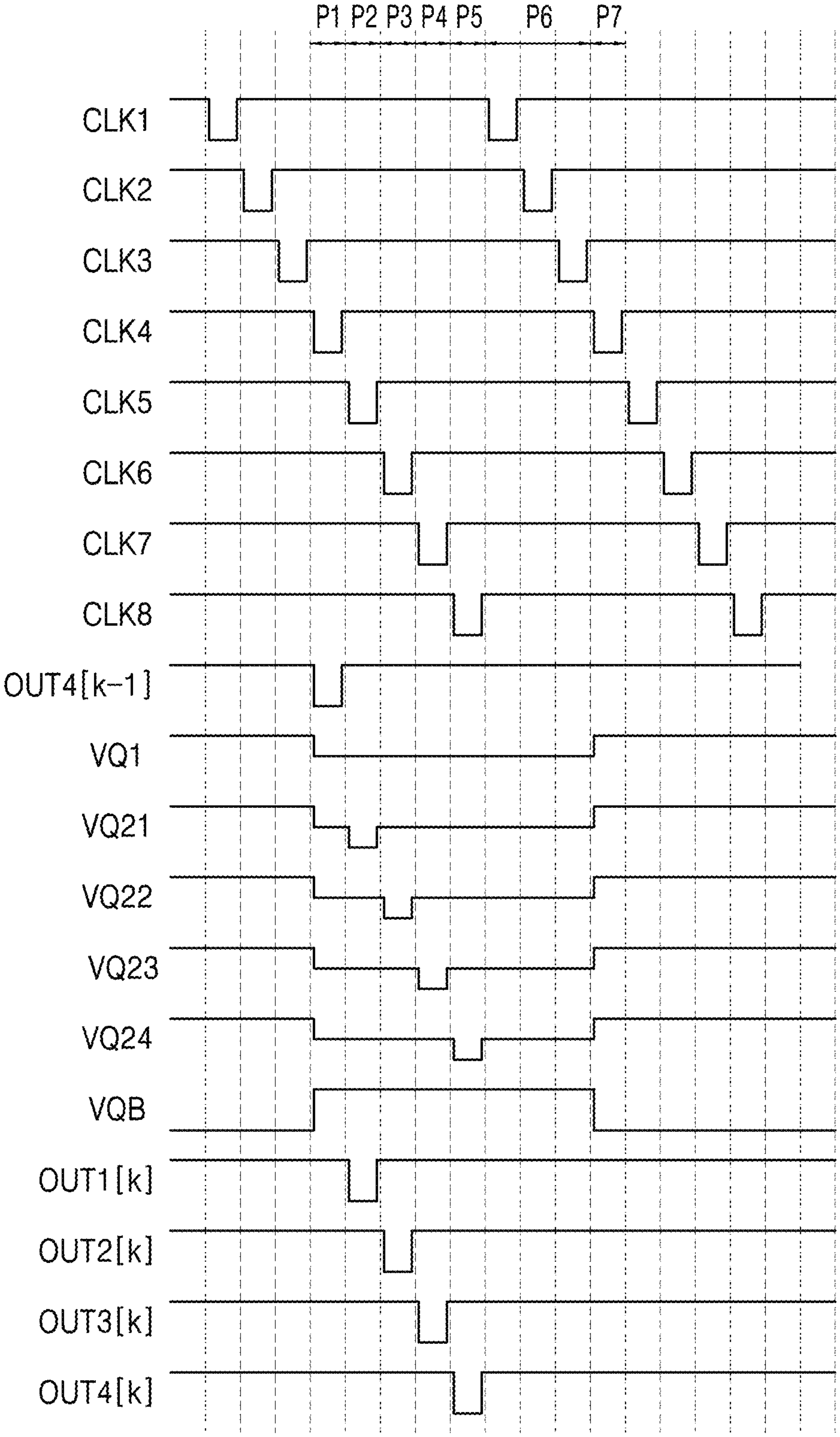
FIG. 49 is a timing diagram for describing an operation of the stage of FIGS. 47 and 48.

FIG. 45 is a diagram schematically illustrating a driving circuit, according to an embodiment. FIGS. 46A and 46B are diagrams schematically illustrating one stage of the driving circuit of FIG. 45. FIGS. 47 and 48 are circuit diagrams illustrating an example of a stage included in the driving circuit of FIG. 45. FIG. 49 is a timing diagram for describing an operation of the stage of FIGS. 47 and 48.

The driving circuit DRV of FIG. 45 is an embodiment in which each of a plurality of stages (e.g., stages ST1 to STn) generates four gate signals and outputs the gate signals to gate lines of four corresponding rows. Each of the plurality of stages (e.g., stages ST1 to STn) may sequentially output four gate signals. A detailed description of the same configuration and operation as those in FIGS. 27 to 32 will be omitted, and a difference will be mainly described.

The stage of FIG. 46A is different from the stage of FIG. 27 in that the stage includes one input terminal IN and five clock terminals, that is, first to fifth clock terminals CK1 to CK5, and outputs four gate signals.

Referring to FIG. 46A, each of the plurality of stages (e.g., stages ST1 to STn) may include the input terminal IN, a first voltage input terminal V1, a second voltage input terminal V2, a third voltage input terminal V3, the first to fifth clock terminals CK1 to CK5, and first to fourth output terminals GOUT1 to GOUT4. In another embodiment, referring to FIG. 46B, each of the plurality of stages (e.g., stages ST1 to STn) may further include a fourth voltage input terminal V4.

A start signal may be input to the input terminal IN. The start signal may be an external signal STV or a previous carry signal. In an embodiment, the external signal STV may be input as a start signal to the input terminal IN of a first stage ST1, and a previous carry signal may be input as a start signal to the input terminal IN of each of second to $n^{th}$ stages ST2 to STn. In an embodiment, for example, a $k-1^{th}$ carry signal CR[k−1] output from a $k-1^{th}$ stage STk−1 may be input as a start signal to the input terminal IN of a $k^{th}$ stage STK.

A first voltage VGH may be input to the first voltage input terminal V1, a second voltage VGL1 may be input to the second voltage input terminal V2, and a third voltage VGL2 may be input to the third voltage input terminal V3. A fourth voltage VGL3 may be input to the fourth voltage input terminal V4.

One of four clock signals from among first to eighth clock signals CLK1 to CLK8 may be input to a corresponding one of the first to fourth clock terminals CK1 to CK4. In an embodiment, for example, the first to fourth clock signals CLK1 to CLK4 may be input to the first to fourth clock terminals CK1 to CK4 of an odd-numbered stage, and the fifth to eighth clock signals CLK5 to CLK8 may be input to the first to fourth clock terminals CK1 to CK4 of an even-numbered stage.

One of four clock signals input to a previous stage or a next stage may be input to the fifth clock terminal CK5. One of the remaining four clock signals other than clock signals input to the first to fourth clock terminals CK1 to CK4 from among the first to eighth clock signals CLK1 to CLK8 may be input to the fifth clock terminal CK5. In an embodiment, for example, one of the fifth to eighth clock signals CLK5 to CLK8 may be input to the fifth clock terminal CK5 of an odd-numbered stage. One of the first to fourth clock signals CLK1 to CLK4 may be input to the fifth clock terminal CK5 of an even-numbered stage.

FIGS. 46A and 46B illustrate that the fifth to eighth clock signals CLK5 to CLK8 are input to the first to fourth clock terminals CK1 to CK4 of the $k^{th}$ stage STK, which is an even-numbered stage, respectively, and the fourth clock signal CLK4 from among the first to fourth clock signals CLK1 to CLK4 is input to the fifth clock terminal CK5.

A first output signal is output from the first output terminal GOUT1 in synchronization with a low-level voltage output timing of a clock signal input to the first clock terminal CK1, a second output signal is output from the second output terminal GOUT2 in synchronization of a low-level voltage output timing of a clock signal input to the second clock terminal CK2, a third output signal is output from the third output terminal GOUT3 in synchronization with a low-level voltage output timing of a clock signal input to the third clock terminal CK3, and a fourth output signal may be output from the fourth output terminal GOUT4 in synchronization with a low-level voltage output timing of a clock signal input to the fourth clock terminal CK4.

In an embodiment, for example, a $4k-3^{th}$ gate signal GS[4*k*−3] may be output from the first output terminal GOUT1 of the $k^{th}$ stage STK as a first output signal OUT1[*k*] in synchronization with a low level output timing of the fifth clock signal CLK5. A $4k-2^{th}$ gate signal GS[4*k*−2] may be output from the second output terminal GOUT2 of the $k^{th}$ stage STK as a second output signal OUT2[*k*] in synchronization with a low level output timing of the sixth clock signal CLK6. A $4k-1^{th}$ gate signal GS[4*k*−1] may be output from the third output terminal GOUT3 of the $k^{th}$ stage STK as a third output signal OUT3[*k*] in synchronization with a low level output timing of the seventh clock signal CLK7. A $4k^{th}$ gate signal GS[4*k*] may be output from the fourth output terminal GOUT4 of the $k^{th}$ stage STK as a fourth output signal OUT4[*k*] in synchronization with a low level output timing of the eighth clock signal CLK8.

The $k^{th}$ stage STK of FIGS. 47 and 48 may include a control circuit 141' and an output circuit 145". Each of the control circuit 141' and the output circuit 145" may include at least one transistor. The control circuit 141' of FIGS. 47 and 48 is the same as the control circuit 141' of FIGS. 35 and 37, and thus, a detailed description thereof will be omitted. The output circuit 145" of FIGS. 47 and 48 is the same as the output circuit 145" of FIGS. 30 and 31, and thus, a detailed description thereof will be omitted.

The previous carry signal CR[k−1] input to the $k^{th}$ stage STK may be one of output signals output from the $k-1^{th}$ stage STk−1, and a clock signal input to a gate of a first transistor T21 may be one of clock signals input to the $k-1^{th}$ stage STk−1.

In an embodiment, the previous carry signal CR[k−1] of the $k^{th}$ stage STK may be one of first to fourth output signals OUT1[*k*−1] to OUT4[*k*−1] output from the $k-1^{th}$ stage STk−1, and a signal input to the fifth clock terminal CK5 may be one of the first to fourth clock signals CLK1 to CLK4. In an embodiment, for example, the previous carry signal CR[k−1] may be the fourth output signal OUT4[*k*−1] (a previous fourth output signal), which is a last output signal output from the $k-1^{th}$ stage STk−1.

An operation of the $k^{th}$ stage STK of FIGS. 47 and 48 will be described with reference to FIG. 49. FIG. 49 is a timing diagram illustrating an example where the previous fourth output signal OUT4[*k*−1] is input to the input terminal IN, and the fourth clock signal CLK4 is input to the fifth clock terminal CK5.

In a first section P1, the previous fourth output signal OUT4[*k*−1] of a low level may be input to the input terminal IN, the fifth to eighth clock signals CLK5 to CLK8 of a high level may be input to the first to fourth clock terminals CK1 to CK4, and the fourth clock signal CLK4 of a low level may be input to the fifth clock terminal CK5.

The first transistor T21 may be turned on by the fourth clock signal CLK4 of a low level, and the previous fourth output signal OUT4[*k*−1] of a low level may be transmitted to a first node Q1. Due to sixth transistors T26-1, T26-2, T26-3, and T26-4 which are turned on, each of first to fourth sub-node voltages VQ21 to VQ24 may be a low-level voltage similar to a first node voltage VQ1. A second transistor T22 with a gate connected to the first node Q1 may be turned on, the first voltage VGH may be transmitted to a third node QB, and a third node voltage VQB may be a high-level voltage.

Seventh transistors T27-1, T27-2, T27-3, and T27-4 including gates connected to first to fourth sub-nodes Q21 to Q24 may be turned on, and the fifth to eighth clock signals CLK5 to CLK8 of a high level may be transmitted to the first to fourth output terminals GOUT1 to GOUT4, respectively.

Accordingly, the first to fourth output signals OUT1[k] to OUT4[k] of a high level may be output from the first to fourth output terminals GOUT1 to GOUT4. Voltage differences between the first to fourth output terminals GOUT1 to GOUT4 and the first to fourth sub-nodes Q21 to Q24 may be stored in capacitors C211 to C214, respectively.

In a second section P2, the previous fourth output signal OUT4[k−1] may be changed from a low level to a high level, the fifth clock signal CLK5 of a low level may be input to the first clock terminal CK1, the sixth to eighth clock signals CLK6 to CLK8 of a high level may be input to the second to fourth clock terminals CK2 to CK4, and the fourth clock signal CLK4 of a high level may be input to the fifth clock terminal CK5.

The first transistor T21 may be turned off by the fourth clock signal CLK4 of a high level, and voltages of the first node Q1 and the first to fourth sub-nodes Q21 to Q24 may be maintained at a low level by the capacitors C211, C212, C213, and C214.

Due to the turned-on seventh transistor T27-1, the fifth clock signal CLK5 of a low level may be transmitted to the first output terminal GOUT1, and the first output signal OUT1[k] of a low level may be output from the first output terminal GOUT1. In this case, as a voltage of the first output terminal GOUT1 falls from a high level to a low level, the first sub-node voltage VQ21 may fall to a voltage level lower than a voltage level in the first section P1 due to coupling of the capacitor C211.

Due to the turned-on seventh transistors T27-2, T27-3, and T27-4, the sixth to eighth clock signals CLK6 to CLK8 of a high level may be transmitted to the second to fourth output terminals GOUT2 to GOUT4, and the second to fourth output signals OUT2[k], OUT3[k], and OUT4[k] of a high level may be output from the second to fourth output terminals GOUT2 to GOUT4.

In a third section P3, the previous fourth output signal OUT4[k−1] of a high level may be input, the sixth clock signal CLK6 of a low level may be input to the second clock terminal CK2, and the fifth clock signal CLK5, the seventh clock signal CLK7, and the eighth clock signal CLK8 of a high level may be input to the first clock terminal CK1, the third clock terminal CK3, and the fourth clock terminal CK4. The fourth clock signal CLK4 of a high level may be input to the fifth clock terminal CK5.

The first transistor T21 may be turned off by the fourth clock signal CLK4 of a high level, and voltages of the first node Q1 and the first to fourth sub-nodes Q21 to Q24 may maintain a low-level voltage due to the capacitors C211, C212, C213, and C214.

Due to the turned-on seventh transistor T27-2, the sixth clock signal CLK6 of a low level may be transmitted to the second output terminal GOUT2, and the second output signal OUT2[k] of a low level may be output from the second output terminal GOUT2. In this case, as a voltage of the second output terminal GOUT2 falls from a high level to a low level, the second sub-node voltage VQ22 may fall to a voltage level lower than a voltage level in the second section P2 due to coupling of the capacitor C212.

Due to the turned-on seventh transistors T27-1, T27-3, and T27-4, the fifth clock signal CLK5, the seventh clock signal CLK7, and the eighth clock signal CLK8 of a high level may be transmitted to the first output terminal GOUT1, the third output terminal GOUT3, respectively, and the fourth output terminal GOUT4, and the first output signal OUT1[k], the third output signal OUT3[k], and the fourth output signal OUT4[k] of a high level may be output from the first output terminal GOUT1, the third output terminal GOUT3, and the fourth output terminal GOUT4, respectively. In this case, as a voltage of the first output terminal GOUT1 rises from a low level to a high level, the first sub-node voltage VQ21 may rise to a low level (e.g., about a voltage level in the first section P1) higher than a voltage level in the second section P2 due to coupling of the capacitor C211.

In a fourth section P4, the previous forth output signal OUT4[k−1] of a high level may be input, the seventh clock signal CLK7 of a low level may be input to the third clock terminal CK3, and the fifth clock signal CLK5, the sixth clock signal CLK6, and the eighth clock signal CLK8 of a high level may be input to the first clock terminal CK1, the second clock terminal CK2, and the fourth clock terminal CK4. The fourth clock signal CLK4 of a high level may be input to the fifth clock terminal CK5.

The first transistor T21 may be turned off by the fourth clock signal CLK4 of a high level, and voltages of the first node Q1 and the first to fourth sub-nodes Q21 to Q24 may be maintained at a low level by the capacitors C211, C212, C213, and C214.

Due to the turned-on seventh transistor T27-3, the seventh clock signal CLK7 of a low level may be transmitted to the third output terminal GOUT3, and the third output signal OUT3[k] of a low level may be output from the third output terminal GOUT3. In this case, as a voltage of the third output terminal GOUT3 falls from a high level to a low level, the third sub-node voltage VQ23 may fall to a voltage level lower than a voltage level in the third section P3 due to coupling of the capacitor C213.

Due to the turned-on seventh transistors T27-1, T27-2, and T27-4, the fifth clock signal CLK5, the sixth clock signal CLK6, and the eighth clock signal CLK8 of a high level may be transmitted to the first output terminal GOUT1, the second output terminal GOUT2, and the fourth output terminal GOUT4, respectively, and the first output signal OUT1[k], the second output signal OUT2[k], and the fourth output signal OUT4[k] of a high level may be output from the first output terminal GOUT1, the second output terminal GOUT2, and the fourth output terminal GOUT4, respectively. In this case, as a voltage of the second output terminal GOUT2 rises from a low level to a high level, the second sub-node voltage VQ22 may rise to a low level (e.g., about a voltage level in the second section P2) higher than a voltage level in the third section P3 due to coupling of the capacitor C212.

In a fifth section P5, the previous fourth output signal OUT4[k−1] of a high level may be input, the eighth clock signal CLK8 of a low level may be input to the fourth clock terminal CK4, and the fifth to seventh clock signals CLK5 to CLK7 of a high level may be input to the first to third clock terminals CK1 to CK3. The fourth clock signal CLK4 of a high level may be input to the fifth clock terminal CK5.

The first transistor T21 may be turned off by the fourth clock signal CLK4 of a high level, and voltages of the first node Q1 and the first to fourth sub-nodes Q21 to Q24 may be maintained at a low level by the capacitors C211, C212, C213, and C214.

Due to the turned-on seventh transistor T27-4, the eighth clock signal CLK8 of a low level may be transmitted to the fourth output terminal GOUT4, and the fourth output signal OUT4[k] of a low level may be output from the fourth output terminal GOUT4. In this case, as a voltage of the fourth output terminal GOUT4 falls from a high level to a low level, the fourth sub-node voltage VQ24 may fall to a voltage level lower than a voltage level in the fourth section P4 due to coupling of the capacitor C214.

Due to the turned-on seventh transistors T27-1, T27-2, and T27-3, the fifth to seventh clock signals CLK5 to CLK7 of a high level may be transmitted to the first to third output terminals GOUT1 to GOUT3, respectively, and the first to third output signals OUT1[*k*], OUT2[*k*], and OUT3[*k*] of a high level may be output from the first to third output terminals GOUT1 to GOUT3, respectively. In this case, as a voltage of the third output terminal GOUT3 rises from a low level to a high level, the third sub-node voltage VQ23 may rise to a low level (e.g., about a voltage level in the third section P3) higher than a voltage level in the fourth section P4 due to coupling of the capacitor C213.

In a sixth section P6, the previous fourth output signal OUT4[*k*−1] of a high level may be input, the fifth to eighth clock signals CLK5 to CLK8 of a high level may be input to the first to fourth clock terminals CK1 to CK4, and the fourth clock signal CLK4 of a high level may be input to the fifth clock terminal CK5.

The first transistor T21 may be turned off by the fourth clock signal CLK4 of a high level, and voltages of the first node Q1 and the first to fourth sub-nodes Q21 to Q24 may be maintained at a low level by the capacitors C211, C212, C213, and C214.

Due to the turned-on seventh transistors T27-1, T27-2, T27-3, and T27-4, the fifth to eighth clock signals CLK5 to CLK8 of a high level may be transmitted to the first to fourth output terminals GOUT1 to GOUT4, respectively. Accordingly, the first to fourth output signals OUT1[*k*] to OUT4[*k*] of a high level may be output from the first to fourth output terminals GOUT1 to GOUT4, respectively. In this case, as a voltage of the fourth output terminal GOUT4 rises from a low level to a high level, the fourth sub-node voltage VQ24 may rise to a low level (e.g., about a voltage level in the fourth section P4) higher than a voltage level in the fifth interval P5 due to coupling of the capacitor C214.

In a seventh section P7, the previous fourth output signal OUT4[*k*−1] of a high level may be input, the fifth to eighth clock signals CLK5 to CLK8 of a high level may be input to the first to fourth clock terminals CK1 to CK4, and the fourth clock signal CLK4 of a low level may be input to the fifth clock terminal CK5.

The first transistor T21 may be turned on by the fourth clock signal CLK4 of a low level, and the previous fourth output signal OUT4[*k*−1] of a high level may be transmitted to the first node Q1. Due to the turned-on sixth transistors, T26-1, T26-2, T26-3, and T26-4, each of the first to fourth sub-node voltages VQ21 to VQ24 may be changed to a high-level voltage similar to the first node voltage VQ1. The seventh transistors T27-1, T27-2, T27-3, and T27-4 with the gates connected to the first to fourth sub-nodes Q21 to Q24 may be turned off.

A third transistor T23 with a gate connected to the first node Q1 may be turned on, the second voltage VGL1 or the fourth voltage VGL3 may be transmitted to the third node QB, and the third node voltage VQB may be changed from a high level to a low level. Eighth transistors T28-1, T28-2, T28-3, and T28-4 with gates connected to the third node QB may be turned on, and the first voltage VGH of a high level may be transmitted to the first to fourth output terminals GOUT1 to GOUT4. Accordingly, the first to fourth output signals OUT1[*k*], OUT2[*k*], OUT3[*k*], and OUT4[*k*] of a high level may be output from the first to fourth output terminals GOUT1 to GOUT4, respectively.

Figure 50:
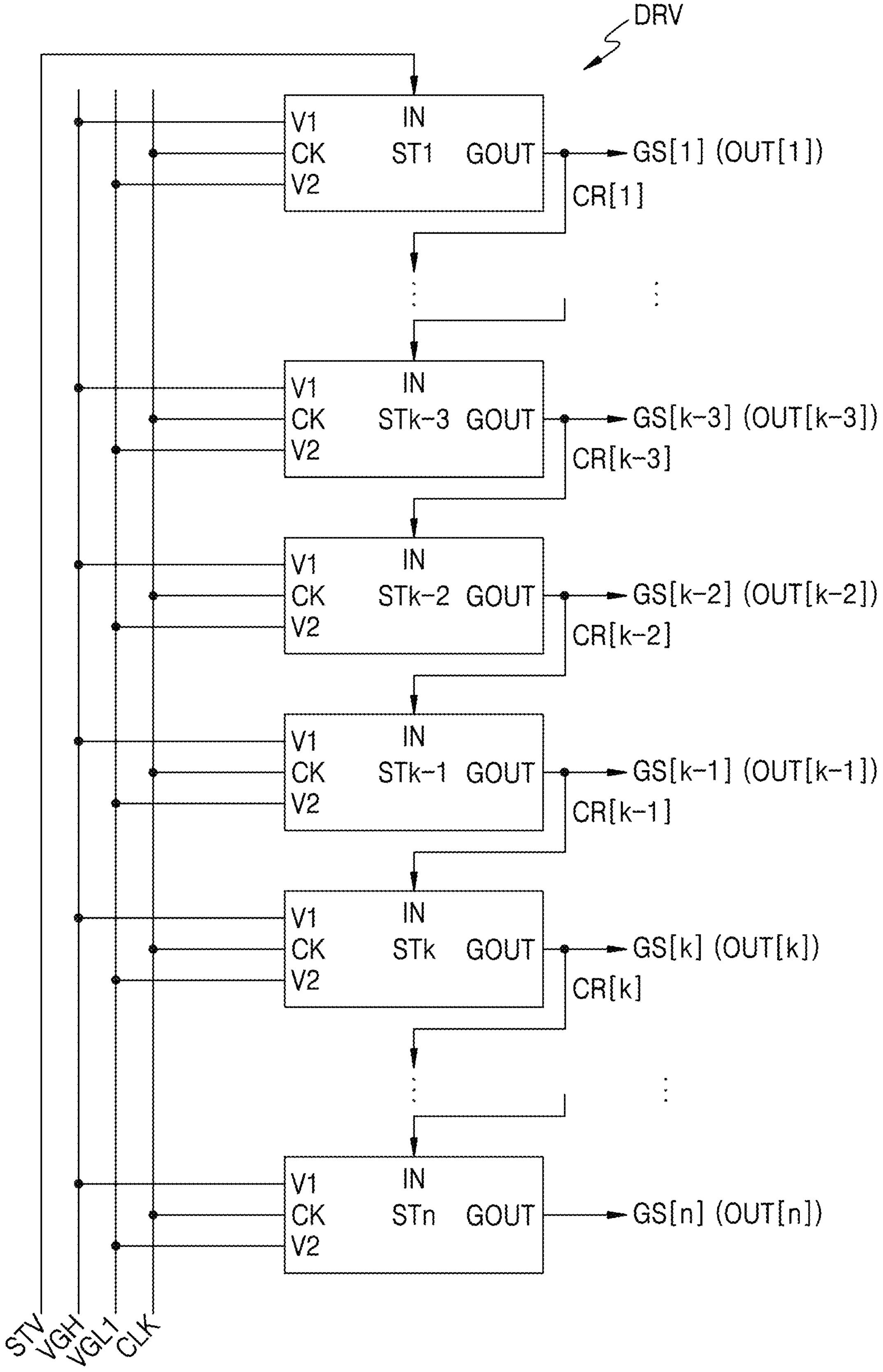
FIG. 50 is a diagram schematically illustrating a driving circuit, according to an embodiment.
Figure 51:
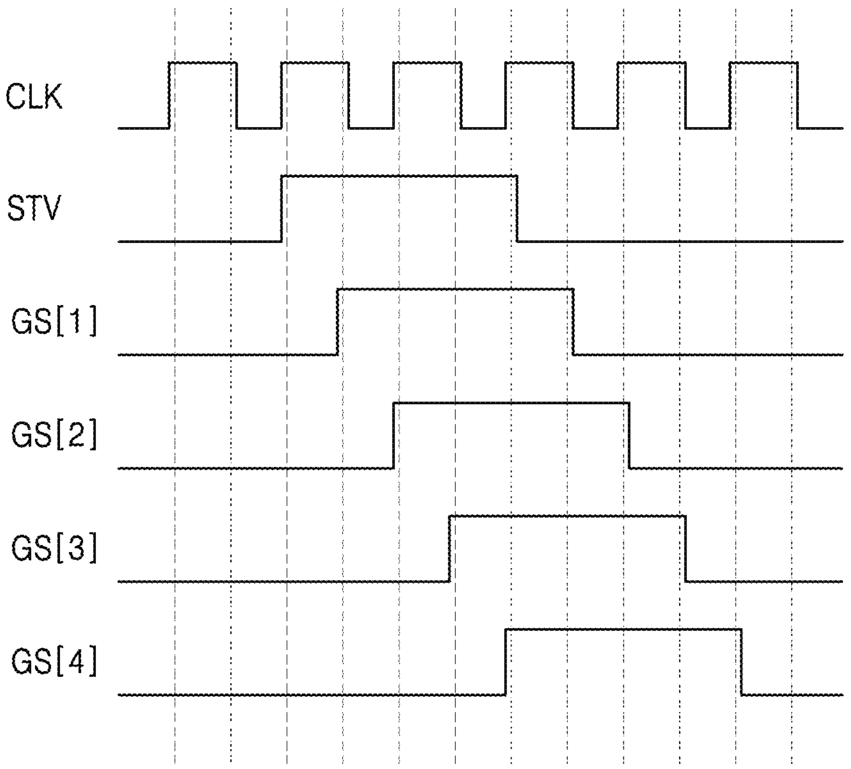
FIG. 51 is a diagram illustrating signals input to and signals output from stages of the driving circuit of FIG. 50.
Figure 52:
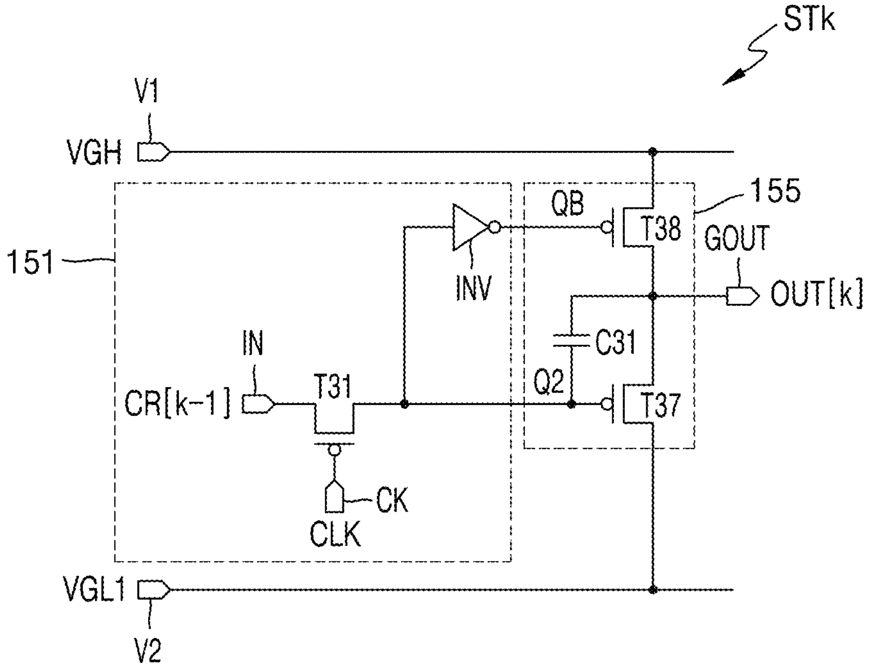
FIGS. 52 and 53 are circuit diagrams illustrating an example of a stage included in the driving circuit of FIG. 50.
Figure 53:
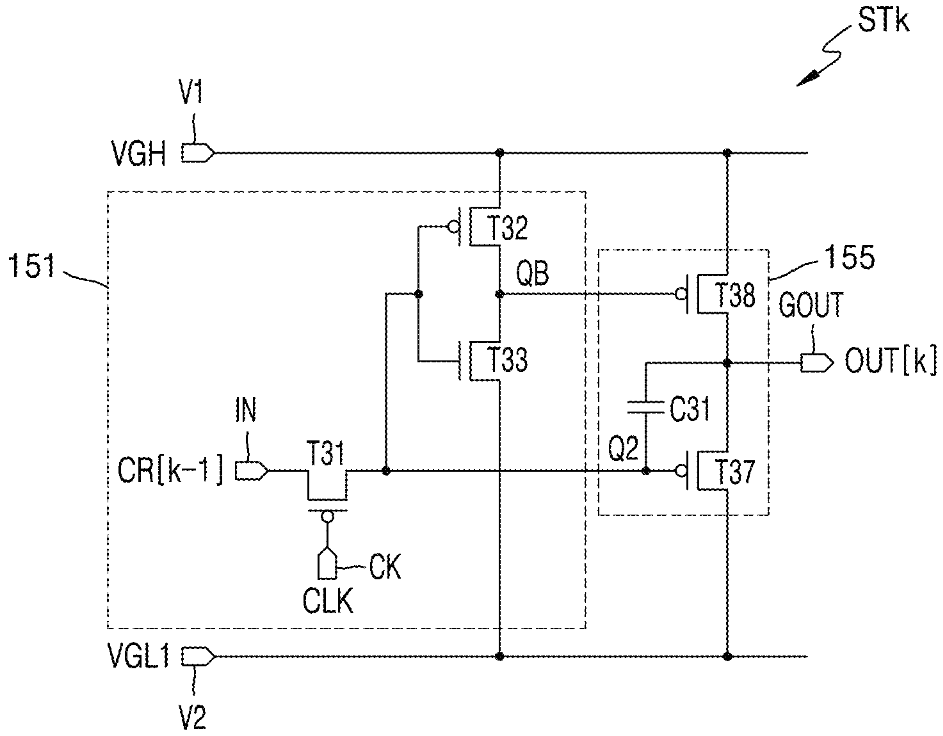
Figure 54:
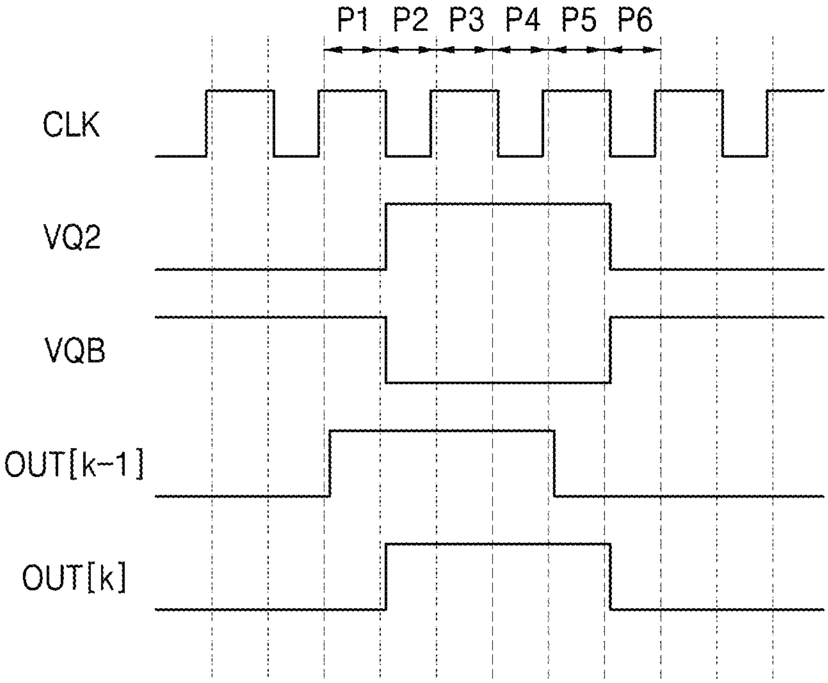
FIG. 54 is a timing diagram for describing an operation of the stage of FIG. 53.

FIG. 50 is a diagram schematically illustrating a driving circuit, according to an embodiment. FIG. 51 is a diagram illustrating signals input to and signals output from stages of the driving circuit of FIG. 50. FIGS. 52 and 53 are circuit diagrams illustrating an example of a stage included in the driving circuit of FIG. 50. FIG. 54 is a timing diagram for describing an operation of the stage of FIG. 53.

The stage of FIG. 50 is different from the stage of FIG. 4 in that the stage includes one input terminal IN and one clock terminal CK and outputs one gate signal.

Referring to FIG. 50, each of a plurality of stages (e.g., stages ST1 to STn) may include the input terminal IN, a first voltage input terminal V1, a second voltage input terminal V2, the clock terminal CK, and an output terminal GOUT. In another embodiment, each of the plurality of stages (e.g., stages ST1 to STn) may further include a third voltage input terminal V3.

Each of the plurality of stages (e.g., stages ST1 to STn) may generate a carry signal CR and may supply the carry signal CR to the input terminal IN of a next stage.

A start signal may be input to the input terminal IN. The start signal may be an external signal STV or a previous carry signal. In an embodiment, the external signal STV may be input as a start signal to the input terminal IN of a first stage ST1, and a previous carry signal may be input as a start signal to the input terminal IN of each of second to $n^{th}$ stages ST2 to STn. In an embodiment, for example, a $k-1^{th}$ carry signal CR[k−1] output from a $k-1^{th}$ stage STk−1 may be input as a start signal to the input terminal IN of a $k^{th}$ stage STK.

A first voltage VGH may be input to the first voltage input terminal V1, and a second voltage VGL1 may be input to the second voltage input terminal V2. In an embodiment where the stage further includes the third voltage input terminal V3, a third voltage VGL2 may be input to the third voltage input terminal V3.

A clock signal CLK may be input to the clock terminal CK. The clock signal CLK may be a square wave signal in which a high-level voltage and a low-level voltage are repeated. In an embodiment, a high-level voltage of the clock signal CLK may be the first voltage VGH, and a low-level voltage may be the second voltage VGL1. In the clock signal CLK, a duration during which a low-level voltage is maintained for one cycle may be the same as a duration during which a high-level voltage is maintained. In another embodiment, in the clock signal CLK, a duration during which a low-level voltage is maintained for one cycle may be shorter than a duration during which a high-level voltage is maintained.

A gate signal GS may be output as an output signal OUT from the output terminal GOUT. As shown in FIGS. 50 and 51, gate signals GS[1], GS[2], . . . , and GS[n] output from the output terminals GOUT of the plurality of stages (e.g., stages ST1 to STn) may be sequentially shifted from each other by a certain interval. In an embodiment, the plurality of stages (e.g., stages ST1 to STn) may shift, by ½ cycle of the clock signal CLK, and sequentially output the gate signals GS[1], GS[2], . . . , and GS[n] of a high-level voltage. In an embodiment, a high-level voltage and a low-level voltage of a gate signal may be the first voltage VGH and the second voltage VGL1, respectively. A duration during which a high-level voltage of a gate signal is maintained may be twice a cycle of the clock signal CLK. Each of the gate signals GS[1], GS[2], . . . , and GS[n] of a high-level voltage may partially overlap a previous gate signal.

Hereinafter, the $k^{th}$ stage STK, which is an even-numbered stage, will be described as an example. The $k^{th}$ stage STK may receive the $k-1^{th}$ carry signal CR[k−1] from the $k-1^{th}$ stage STk−1, which is a previous stage, and may output a $k^{th}$ gate signal GS[k] as an output signal OUT[k] to a gate line of a $k^{th}$ row.

Referring to FIGS. 52 and 53, the $k^{th}$ stage STK may include a control circuit 151 and an output circuit 155.

The control circuit 151 may control voltages of a second node Q2 and a third node QB in response to a signal input to the input terminal IN. In an embodiment, for example, the control circuit 151 may control voltages of the second node Q2 and the third node QB in response to the previous carry signal CR[k−1]. The control circuit 151 may include a first transistor T31 and an inverter INV. The inverter INV may include a second transistor T32 and a third transistor T33. Each of the first transistor T31 and the second transistor T32 may be a P-channel transistor, and the third transistor T33 may be an N-channel transistor.

The first transistor T31 may be connected between the input terminal IN and the second node Q2. A gate of the first transistor T31 may be connected to the clock terminal CK. The first transistor T31 may be turned on when the clock signal CLK of a low level is input, and may transmit the previous carry signal CR[k−1] to the second node Q2. The previous carry signal CR[k−1] may be an output signal OUT[k−1] (a previous output signal) output from the $k-1^{th}$ stage STk−1.

The second transistor T32 may be connected between the first voltage input terminal V1 and the third node QB. A gate of the second transistor T32 may be connected to the second node Q2. The second transistor T32 may be turned on when a voltage of the second node Q2 is at a low level, and may transmit the first voltage VGH to the third node QB.

The third transistor T33 may be connected between the third node QB and the second voltage input terminal V2. A gate of the third transistor T33 may be connected to the second node Q2. The third transistor T33 may be turned on when a voltage of the second node Q2 is at a high level, and may transmit the second voltage VGL1 to the third node QB.

The output circuit 155 may be connected between the first voltage input terminal V1 and the second voltage input terminal V2, and may output a high-level voltage of the first voltage VGH and a low-level voltage of the second voltage VGL1 according to voltages of the second node Q2 and the third node QB. The output circuit 155 may include a seventh transistor T37 and an eighth transistor T38 which are P-channel transistors. The output circuit 155 may further include a capacitor C31. The capacitor C31 may be omitted.

The seventh transistor T37 may be connected between the output terminal GOUT and the second voltage input terminal V2. A gate of the seventh transistor T37 may be connected to the second node Q2. The seventh transistor T37 may be turned on when a voltage of the second node Q2 is at a low level, and may transmit the second voltage VGL1 input to the second voltage input terminal V2 to the output terminal GOUT. The seventh transistor T37 may be a pull-down transistor that transmits a low-level voltage to the output terminal GOUT.

The eighth transistor T38 may be connected between the first voltage input terminal V1 and the output terminal GOUT. A gate of the eighth transistor T38 may be connected to the third node QB. The eighth transistor T38 may be turned on when a voltage of the third node QB is at a low level, and may transmit the first voltage VGH input to the first voltage input terminal V1 to the output terminal GOUT. The eighth transistor T38 may be a pull-up transistor that transmits a high-level voltage to the output terminal GOUT.

The capacitor C31 may be connected between the output terminal GOUT and the second node Q2.

The seventh transistor T37 may stably output an output signal of a low level due to the capacitor C31 connected to the seventh transistor T37. A circuit may be simplified by omitting a capacitor connected to the eighth transistor T38, thereby reducing the size of the output circuit 155.

Hereinafter, an operation of the $k^{th}$ stage STK of FIG. 53 will be described with reference to FIG. 54.

In a first section P1, the previous output signal OUT[k−1] of a high level may be input to the input terminal IN, and the clock signal CLK of a high level may be input to the clock terminal CK.

The first transistor T31 may be turned off by the clock signal CLK of a high level, and a second node voltage VQ2 may be maintained at a low level of a previous section. Due to the turned-on seventh transistor T37, the second voltage VGL1 of a low level may be transmitted to the output terminal GOUT, and the output signal OUT[k] of a low level may be output from the output terminal GOUT.

In a second section P2, the previous output signal OUT[k−1] of a high level may be input to the input terminal IN, and the clock signal CLK of a low level may be input to the clock terminal CK.

The first transistor T31 may be turned on by the clock signal CLK of a low level, the previous output signal OUT[k−1] of a high level may be transmitted to the second node Q2, and the seventh transistor T37 may be turned off. The third transistor T33 with the gate connected to the second node Q2 may be turned on, and the second voltage VGL1 of a low level may be transmitted to the third node QB. Due to the turned-on eighth transistor T38, the first voltage VGH of a high level may be transmitted to the output terminal GOUT, and the output signal OUT[k] of a high level may be output from the output terminal GOUT.

In a third section P3, the previous output signal OUT[k−1] of a high level may be input, and the clock signal CLK of a high level may be input to the clock terminal CK.

The first transistor T31 may be turned off by the clock signal CLK of a high level, the second node voltage VQ2 may maintain a high level of the second section P2, and a third node voltage VQB may maintain a low level of the second section P2. Due to the turned-on eighth transistor T38, the first voltage VGH of a high level may be transmitted to the output terminal GOUT, and the output signal OUT[k] of a high level may be output from the output terminal GOUT.

In a fourth section P4, the previous output signal OUT[k−1] of a high level may be input, and the clock signal CLK of a low level may be input to the clock terminal CK.

The first transistor T31 may be turned on by the clock signal CLK of a low level, the previous output signal OUT[k−1] of a high level may be transmitted to the second node Q2, and the third node voltage VQB may maintain a low level of the second section P2. Due to the turned-on eighth transistor T38, the first voltage VGH of a high level may be transmitted to the output terminal GOUT, and the output signal OUT[k] of a high level may be output from the output terminal GOUT.

In a fifth section P5, the previous output signal OUT[k−1] of a low level may be input, and the clock signal CLK of a high level may be input to the clock terminal CK.

The first transistor T31 may be turned off by the clock signal CLK of a high level, the second node voltage VQ2 may maintain a high level of the fourth section P4, and the third node voltage VQB may maintain a low level of the fourth section P4. Due to the turned-on eighth transistor T38, the first voltage VGH of a high level may be transmitted to the output terminal GOUT, and the output signal OUT[k] of a high level may be output from the output terminal GOUT.

In a sixth section P6, the previous output signal OUT[k−1] of a low level may be input, and the clock signal CLK of a low level may be input to the clock terminal CK.

The first transistor T31 may be turned on by the clock signal CLK of a low level, the previous output signal OUT[k−1] of a low level may be transmitted to the second node Q2, and the seventh transistor T37 may be turned on. Due to the turned-on seventh transistor T37, the second voltage VGL1 of a low level may be transmitted to the output terminal GOUT, and the output signal OUT[k] of a low level may be output from the output terminal GOUT. The second transistor T32 with the gate connected to the second node Q2 may be turned on, the first voltage VGH of a high level may be transmitted to the third node QB, and the eighth transistor T38 may be turned off.

Figure 55:
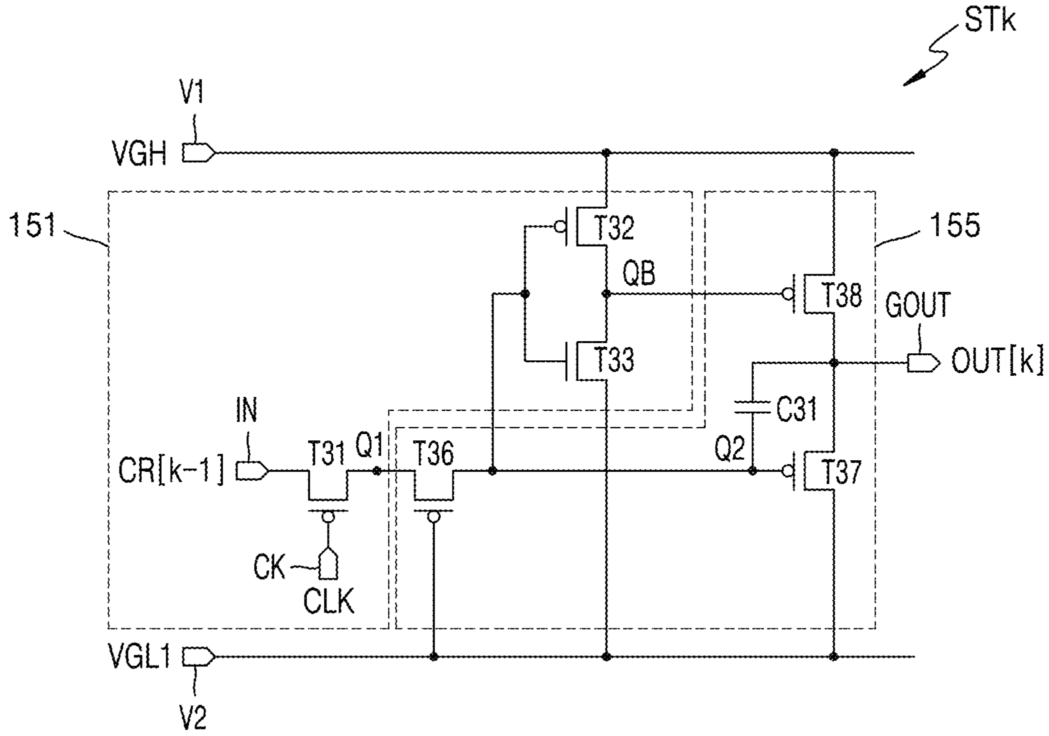
FIG. 55 is a circuit diagram illustrating an example of a stage included in the driving circuit of FIG. 50.
Figure 56:
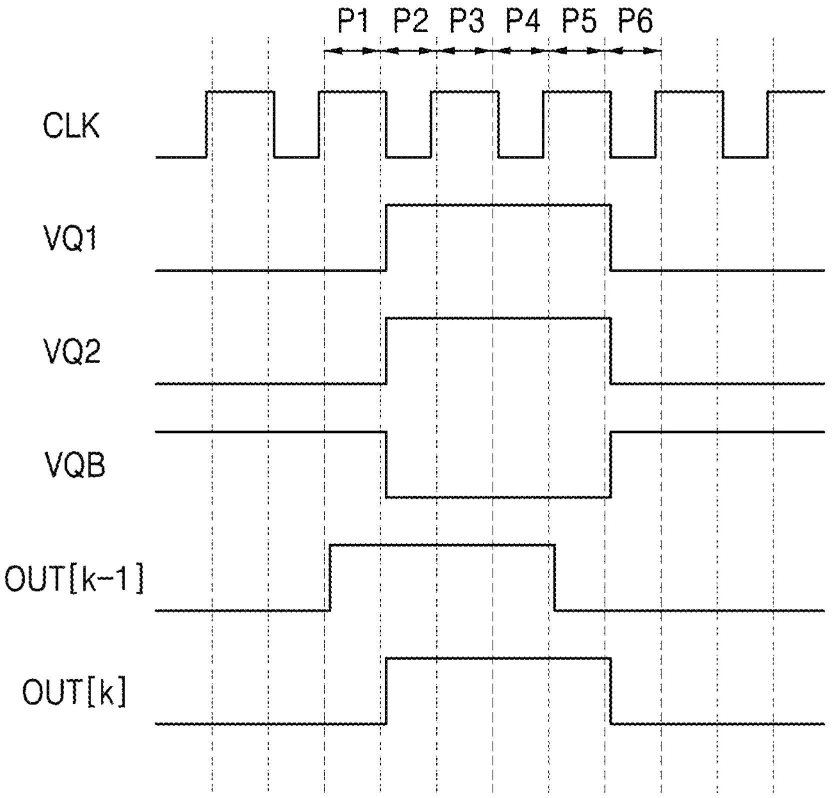
FIG. 56 is a timing diagram for describing an operation of the stage of FIG. 55.

FIG. 55 is a circuit diagram illustrating an example of a stage included in the driving circuit of FIG. 50. FIG. 56 is a timing diagram for describing an operation of the stage of FIG. 55. Hereinafter, a difference from the stage of FIG. 53 will be mainly described.

A $k^{th}$ stage STK of FIG. 55 is different from the $k^{th}$ stage STK of FIG. 53 in that a sixth transistor T36, which is a P-channel transistor, is added to the output circuit 155, and other configurations and operations are the same as those of the $k^{th}$ stage STK of FIG. 53.

A node to which the first transistor T31 and the sixth transistor T36 are connected is referred to as a first node Q1. The sixth transistor T36 may be connected between the first node Q1 and the second node Q2. A gate of the sixth transistor T36 may be connected to the second voltage input terminal V2. The sixth transistor T36 may always be in a turned-on state due to the second voltage VGL1. Accordingly, as shown in FIG. 56, the first node voltage VQ1 may be similar to the second node voltage VQ2.

FIGS. 57 to 61 are circuit diagrams illustrating an example of a stage included in the driving circuit of FIG. 50. FIG. 62 is a timing diagram for describing an operation of the stage of FIG. 61. Hereinafter, a difference from the stage of FIG. 53 will be mainly described.

Figure 57:
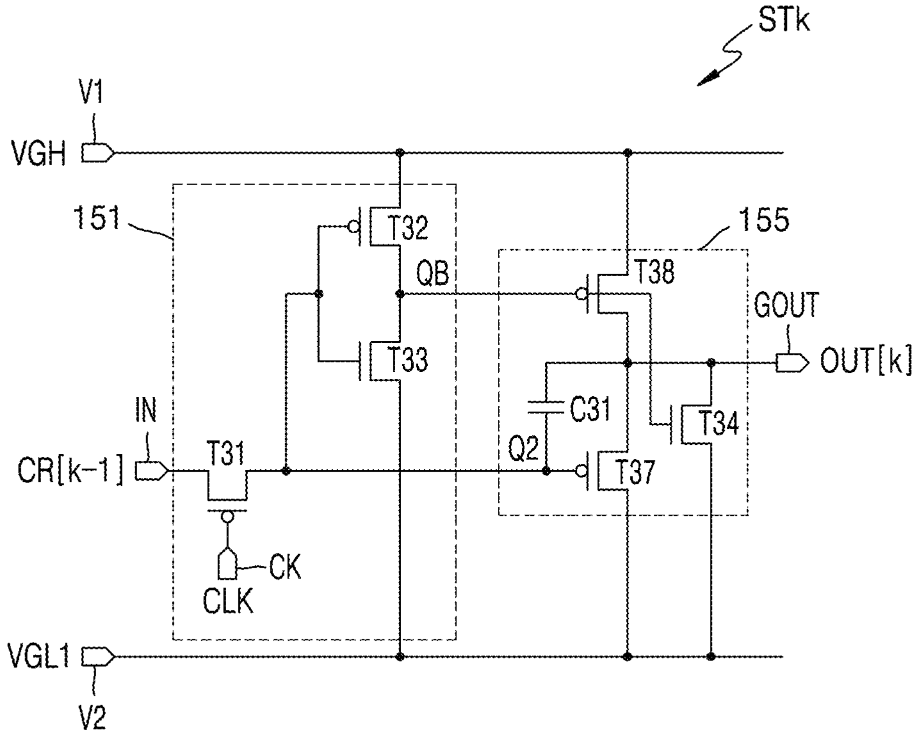
FIGS. 57 to 61 are circuit diagrams illustrating an example of a stage included in the driving circuit of FIG. 50.

A $k^{th}$ stage STK of FIG. 57 is different from the $k^{th}$ stage STK of FIG. 53 in that a fourth transistor T34, which is an N-channel transistor, is added to the output circuit 155, and other configurations and operations are the same as those of the $k^{th}$ stage STK of FIG. 53.

The fourth transistor T34 may be connected between the output terminal GOUT and the second voltage input terminal V2. A gate of the fourth transistor T34 may be connected to the third node QB. The fourth transistor T34 may be turned on when a voltage of the third node QB is at a high level, and may transmit the second voltage VGL1 to the output terminal GOUT.

In a section in which the output signal OUT[k] of a low level is output, a voltage of the second node Q2 may increase due to leakage current of a transistor (e.g., the first transistor T31 and/or the sixth transistor T36) connected to the second node Q2, and a voltage level of an output signal of a low level output from the seventh transistor T37 may rise. In the present embodiment, because the fourth transistor T34 is provided between the output terminal GOUT and the second voltage input terminal V2, the output signal OUT[k] of a low level may be stably output.

Figure 58:
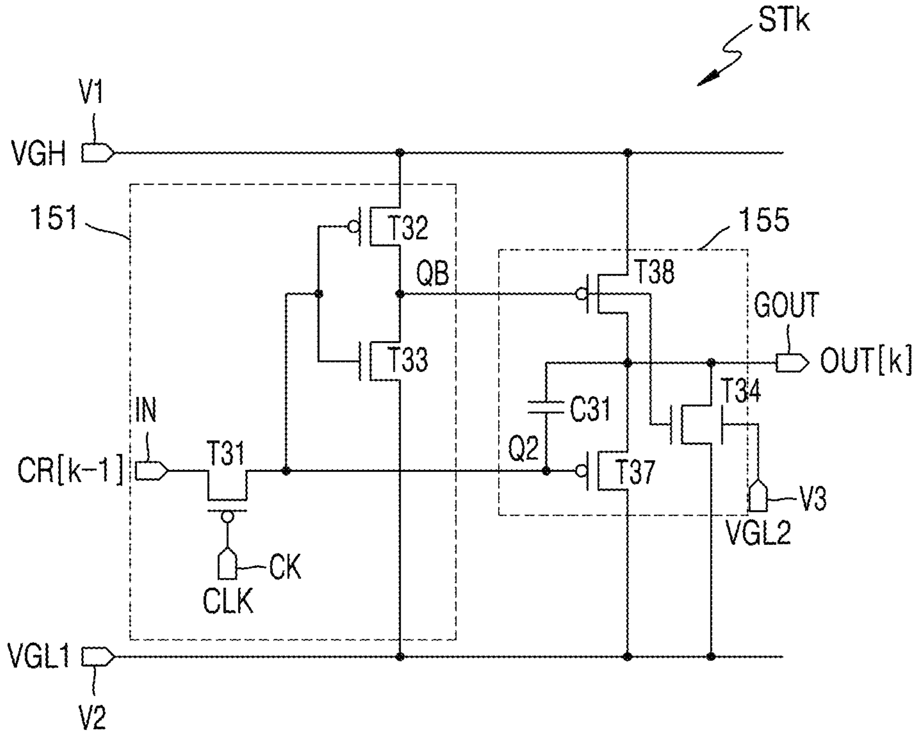

In another embodiment, as shown in FIG. 58, the fourth transistor T34 may further include a back gate connected to the third voltage input terminal V3. The fourth transistor T34 may be a dual gate transistor including a gate (a first gate or a top gate) located over a semiconductor layer and a back gate (a second gate or a bottom gate) located under the semiconductor layer.

Due to a variation in a manufacturing process, an initial threshold voltage of the fourth transistor T34 may be low, resulting in leakage current. Leakage current of the fourth transistor T34 may be minimized by inputting the third voltage VGL2 of a low level to the back gate of the fourth transistor T34 that is an oxide transistor.

Figure 59:
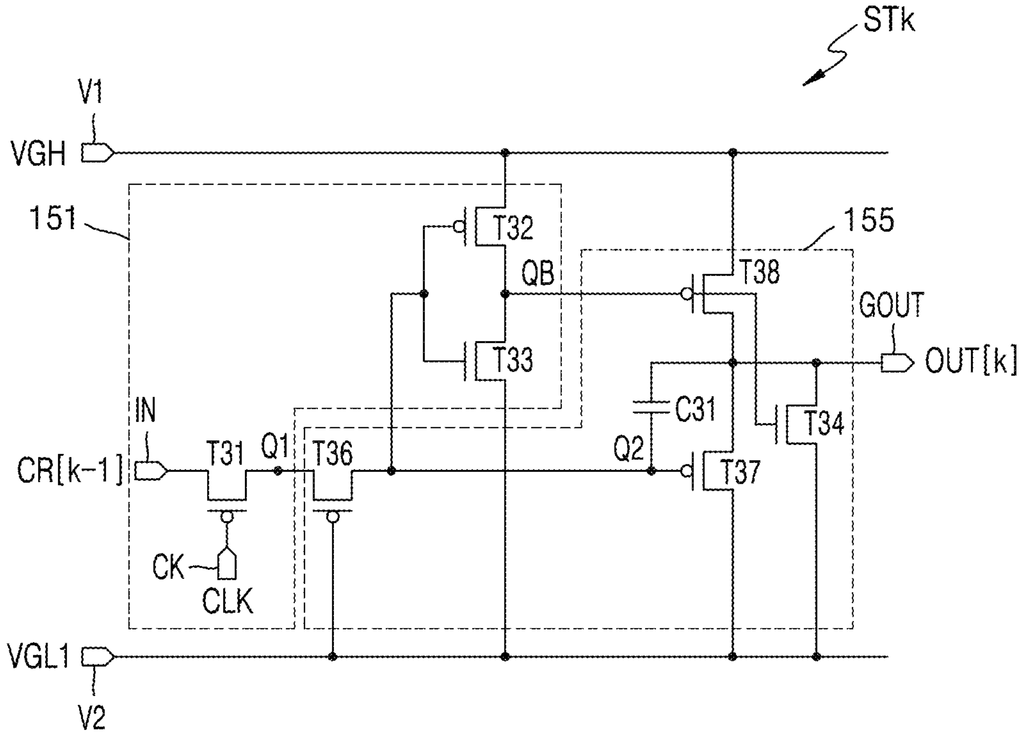
Figure 60:
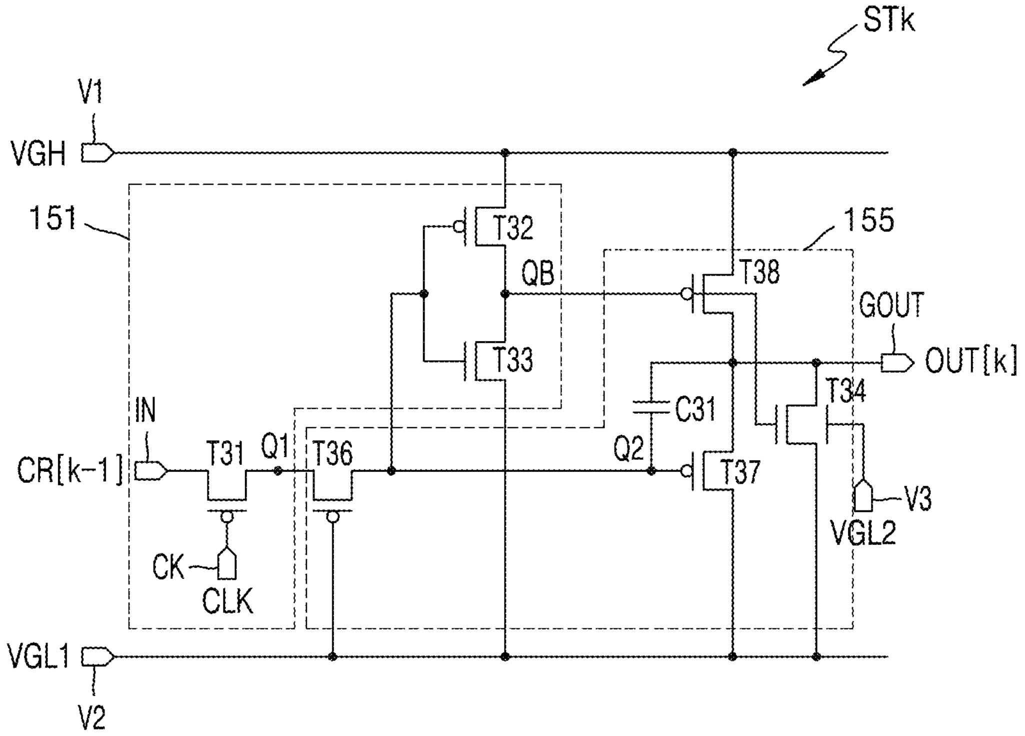

In another embodiment, as shown in FIGS. 59 and 60, a sixth transistor T36 may be further provided in the output circuit 155.

Figure 61:
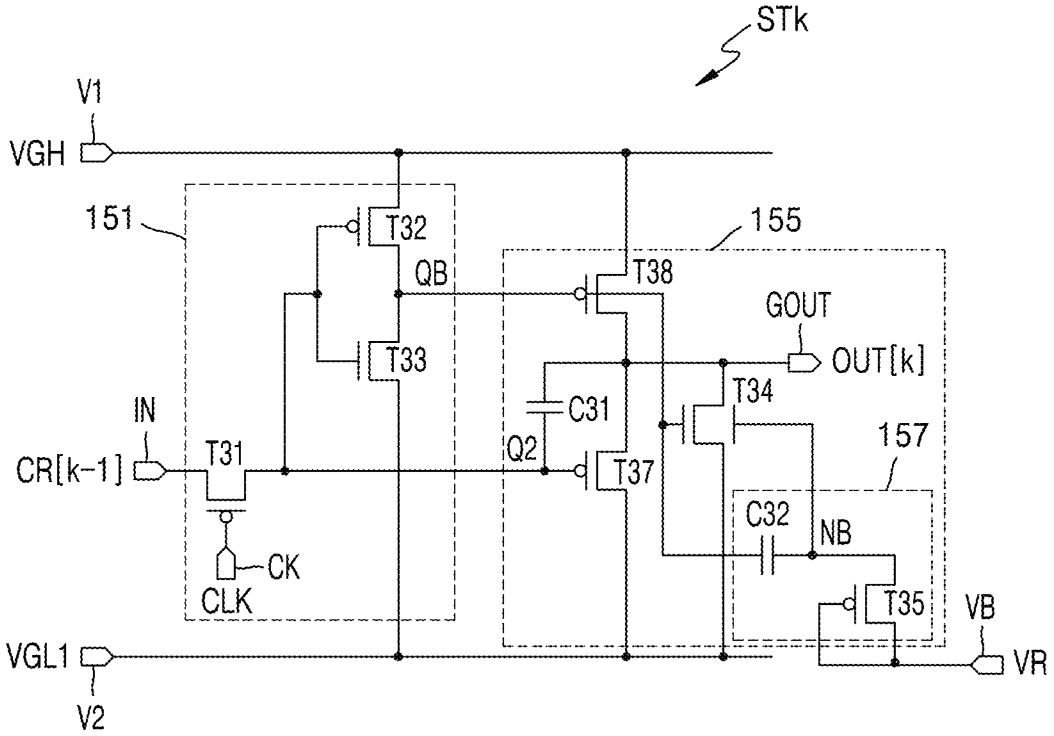
Figure 62:
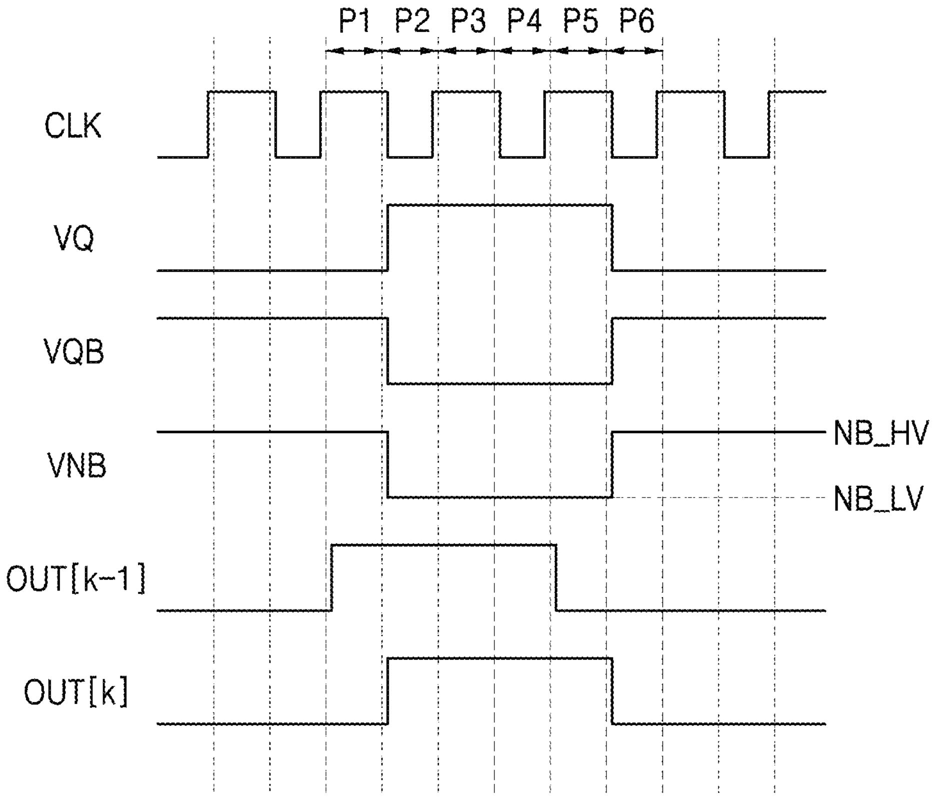
FIG. 62 is a timing diagram for describing an operation of the stage of FIG. 61.

In another embodiment, as shown in FIG. 61, the output circuit 155 may further include a bias input circuit 157 for inputting a low-level voltage to the back gate of the fourth transistor T34. The bias input circuit 157 may include a fifth transistor T35, which is a P-channel transistor, and a capacitor C32. A node to which the back gate of the fourth transistor T34 is connected is referred to as a bias node NB.

The fifth transistor T35 may be connected to the bias node NB and a bias voltage input terminal VB. A gate of the fifth transistor T35 may be connected to the bias voltage input terminal VB. The fifth transistor T35 may be a diode-connected transistor with a gate connected to one terminal. A reference voltage VR may be input to the bias voltage input terminal VB. The reference voltage VR may be the third voltage VGL2 or a ground voltage OV. The third voltage VGL2 may be lower than the second voltage VGL1.

The capacitor C32 may be connected between the third node QB and the bias node NB. The bias node NB may be coupled to the third node QB by the capacitor C32.

FIG. 62 is a timing diagram in which a voltage VNB of the bias node NB is added to the timing diagram of FIG. 54. A difference between a high-level voltage NB_HV and a low-level voltage NB_LV of the bias node NB may be a voltage change amount of the third node QB.

When the reference voltage VR is the ground voltage OV and a voltage of the third node QB is at a high level, the voltage VNB of the bias node NB may be a voltage VR-Vth obtained by subtracting a threshold voltage Vth of the fifth transistor T35 from the reference voltage VR. When the third transistor T33 is turned on and a voltage of the third node QB falls from a high level to a low level, the voltage VNB of the bias node NB may fall by a voltage change amount of the third node QB due to coupling of the capacitor C32.

When a voltage of the third node QB is at a high level, the voltage VNB of the bias node NB may be a voltage VR-Vth obtained by subtracting the threshold voltage Vth of the fifth transistor T35 from the reference voltage VR. When the third transistor T33 is turned on and a voltage of the third node QB falls from a high level to a low level, the voltage VNB of the bias node NB may fall by a voltage change amount of the third node QB due to coupling of the capacitor C32. The low-level voltage NB_LV of the bias node NB may be a voltage lower than the third voltage VGL2.

In an embodiment, the sixth transistor T36 may be further provided in the output circuit 155 of the stage of FIG. 61.

In an embodiment, because the output circuit 155 of the stages described above has a structure in which two or more sub-output circuits are connected in parallel, the output circuit 155 may sequentially output two or more output signals. Each sub-output circuit may include the sixth transistor T36 connected between the first node Q1 and a sub-node, the seventh transistor T37 with the gate connected to a sub-node, and an eighth transistor T38 with the gate connected to the third node QB.

According to embodiments, because switching transistors whose turn-on and turn-off are controlled by a clock signal are not included or the number of the switching transistors is minimized in a control circuit, power consumption of the driving circuit DRV may be effectively reduced. Also, because a difference between a high-level voltage and a low-level voltage is reduced by setting a low-level voltage of a clock signal input to an output circuit to be higher than the second voltage VGL1, power consumption may be effectively reduced.

According to embodiments, because the second node Q2 is implemented as a sharable one by using a transfer transistor so that a plurality of output circuits share a control circuit, the number of control circuits may be reduced, a mounting area of the driving circuit DRV may be reduced, and thus, a non-display area may be reduced.

A display apparatus to which a driving circuit according to an embodiment is applied may reduce the area of a non-display area and may reduce power consumption. The effects of the disclosure are not limited to the above effects, and may vary without departing from the scope of the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope as defined by the following claims.

What is claimed is:

1. A driving circuit comprising a plurality of stages, wherein each of the plurality of stages comprises:
- a first transistor connected between a first node and a first terminal to which a first voltage is input, the first transistor comprising a gate connected to a first input terminal to which a start signal is input;
- a second transistor connected between a second node and a second terminal to which a second voltage lower than the first voltage is input, the second transistor comprising a gate connected to the first node;
- a third transistor connected between the first terminal and the second node and comprising a gate connected to a second input terminal to which a carry signal is input;
- a fourth transistor connected between the first node and the second terminal and comprising a gate connected to the second node; and
- an output circuit configured to be controlled by voltage levels of the first node and the second node and output an output signal.

2. The driving circuit of claim 1, wherein each of the plurality of stages further comprises a fifth transistor connected between the first terminal and the first node and comprising a gate connected to the second node.

3. The driving circuit of claim 1, wherein each of the plurality of stages further comprises a capacitor connected to the first terminal and the first node.

4. The driving circuit of claim 1, wherein each of the plurality of stages further comprises a sixth transistor connected between the first terminal and the second node and comprising a gate connected to the first node.

5. The driving circuit of claim 1, wherein each of the plurality of stages further comprises a reset transistor connected between the first terminal and the second node and comprising a gate configured to receive a reset signal.

6. The driving circuit of claim 1, wherein
- each of the second transistor and the fourth transistor comprises a back gate connected to a third terminal to which a third voltage lower than the second voltage is input.

7. The driving circuit of claim 1, wherein the output circuit comprises:
- a seventh transistor connected between an output terminal and a clock terminal to which a clock signal is input, the seventh transistor comprising a gate connected to a third node;
- an eighth transistor connected between the first terminal and the output terminal and comprising a gate connected to the first node; and
- a transfer transistor connected between the second node and the third node and comprising a gate connected to the second terminal.

8. The driving circuit of claim 7, wherein the output circuit further comprises a capacitor connected to the output terminal and the third node.

9. The driving circuit of claim 1, wherein
- the start signal is an output signal output from a previous stage, and
- the carry signal is an output signal output from a next stage.

10. The driving circuit of claim 1, wherein the output circuit comprises a plurality of sub-output circuits connected in parallel,
- wherein each of the plurality of sub-output circuits comprises:
- a seventh transistor connected between an output terminal and a clock terminal and comprising a gate connected to a sub-node;
- an eighth transistor connected between the first terminal and the output terminal and comprising a gate connected to the first node; and
- a transfer transistor connected between the second node and the sub-node and comprising a gate connected to the second terminal, and
- wherein clock signals input to the clock terminals of the plurality of sub-output circuits, respectively, are sequentially shifted signals, and
- the output terminals of the plurality of sub-output circuits are configured to sequentially output output signals at intervals corresponding to shift intervals of the clock signals.

11. The driving circuit of claim 10, wherein each of the plurality of sub-output circuits further comprises a capacitor connected to the output terminal and the sub-node.

12. The driving circuit of claim 10, wherein
- the start signal is one of output signals output from a previous stage, and
- the carry signal is one of output signals output from a next stage.

13. The driving circuit of claim 1, wherein
- each of the first transistor and the third transistor is a first conductivity-type transistor, and
- each of the second transistor and the fourth transistor is a second conductivity-type transistor.

14. A driving circuit comprising a plurality of stages, wherein each of the plurality of stages comprises:
- a first transistor connected between a first input terminal, to which a start signal is input, and a first node;

a second transistor connected between a first terminal, to which a first voltage is input, and a second node, the second transistor comprising a gate connected to the first node;

a third transistor connected between the second node and a second terminal, to which a second voltage lower than the first voltage is input, or a third terminal, to which a third voltage lower than the first voltage and higher than the second voltage is input, the third transistor comprising a gate connected to the first node; and an output circuit configured to be controlled by voltage levels of the first node and the second node and output an output signal, wherein the third transistor further comprises a back gate connected to a fourth terminal, to which a fourth voltage lower than the second voltage is input, and wherein a signal input to the gate of the second transistor and the gate of the third transistor is a voltage of the first node.

15. The driving circuit of claim 14, wherein each of the plurality of stages further comprises a fourth transistor connected between the first terminal and the first node and comprising a gate connected to a second input terminal to which a carry signal is input, and wherein a gate of the first transistor is connected to the first input terminal.

16. The driving circuit of claim 15, wherein the start signal is an output signal output from a previous stage, and the carry signal is an output signal output from a next stage.

17. The driving circuit of claim 15, wherein the output circuit comprises:

a seventh transistor connected between an output terminal and a clock terminal to which a clock signal is input, the seventh transistor comprising a gate connected to a third node;

an eighth transistor connected between the first terminal and the output terminal and comprising a gate connected to the second node; and a transfer transistor connected between the first node and the third node and comprising a gate connected to the second terminal.

18. The driving circuit of claim 17, wherein the output circuit further comprises a capacitor connected to the output terminal and the third node.

19. The driving circuit of claim 15, wherein the output circuit comprises a plurality of sub-output circuits connected in parallel, wherein each of the plurality of sub-output circuits comprises:

a seventh transistor connected between an output terminal and a clock terminal to which a clock signal is input, the seventh transistor comprising a gate connected to a sub-node;

an eighth transistor connected between the first terminal and the output terminal and comprising a gate connected to the second node; and a transfer transistor connected between the first node and the sub-node and comprising a gate connected to the second terminal, and wherein clock signals input to the clock terminals of the plurality of sub-output circuits, respectively, are sequentially shifted signals, and the output terminals of the plurality of sub-output circuits are configured to sequentially output output signals at intervals corresponding to shift intervals of the clock signals.

20. The driving circuit of claim 19, wherein each of the plurality of sub-output circuits further comprises a capacitor connected to the output terminal and the sub-node.

21. The driving circuit of claim 20, wherein the start signal is one of output signals output from a previous stage, and the carry signal is one of output signals output from a next stage.

22. The driving circuit of claim 14, wherein the output circuit comprises:

a seventh transistor connected between an output terminal and a first clock terminal to which a first clock signal is input, the seventh transistor comprising a gate connected to a third node;

an eighth transistor connected between the first terminal and the output terminal and comprising a gate connected to the second node; and a transfer transistor connected between the first node and the third node and comprising a gate connected to the second terminal, wherein a gate of the first transistor is connected to a second clock terminal to which a second clock signal is input, and the second clock signal is input by shifting the first clock signal.

23. The driving circuit of claim 22, wherein the start signal is an output signal output from a previous stage.

24. The driving circuit of claim 22, wherein the output circuit further comprises a capacitor connected to the output terminal and the third node.

25. The driving circuit of claim 14, wherein the output circuit comprises a plurality of sub-output circuits connected in parallel, wherein each of the plurality of sub-output circuits comprises:

a seventh transistor connected between an output terminal and a first clock terminal to which a first clock signal is input, the seventh transistor comprising a gate connected to a sub-node;

an eighth transistor connected between the first terminal and the output terminal and comprising a gate connected to the second node; and a transfer transistor connected between the first node and the sub-node and comprising a gate connected to the second terminal, wherein a gate of the first transistor is connected to a second clock terminal to which a second clock signal is input, wherein the second clock signal is a signal shifted from the first clock signal, and wherein first clock signals input to the first clock terminals of the plurality of sub-output circuits, respectively, are sequentially shifted signals, and the output terminals of the plurality of sub-output circuits are configured to sequentially output output signals at intervals corresponding to shift intervals of the first clock signals.

26. The driving circuit of claim 25, wherein each of the plurality of sub-output circuits further comprises a capacitor connected to the output terminal and the sub-node.

27. The driving circuit of claim 14, wherein each of the first transistor and the second transistor is a first conductivity-type transistor, and the third transistor is a second conductivity-type transistor.

* * * * *